United States Patent
Zhang et al.

(10) Patent No.: US 11,064,475 B2
(45) Date of Patent: Jul. 13, 2021

(54) METHOD AND DEVICE FOR SENDING CONTROL CHANNEL

(71) Applicant: ZTE CORPORATION, Shenzhen (CN)

(72) Inventors: Shujuan Zhang, Shenzhen (CN); Zhaohua Lu, Shenzhen (CN); Meng Mei, Shenzhen (CN); Yuhong Gong, Shenzhen (CN); Yijian Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 60 days.

(21) Appl. No.: 16/347,685

(22) PCT Filed: Nov. 6, 2017

(86) PCT No.: PCT/CN2017/109607
§ 371 (c)(1),
(2) Date: May 6, 2019

(87) PCT Pub. No.: WO2018/082705
PCT Pub. Date: May 11, 2018

(65) Prior Publication Data
US 2019/0394757 A1    Dec. 26, 2019

(30) Foreign Application Priority Data

Nov. 4, 2016 (CN) .......................... 201610966223.2
Mar. 24, 2017 (CN) .......................... 201710184880.6

(51) Int. Cl.
*H04W 72/04* (2009.01)
*H04B 7/0417* (2017.01)
(Continued)

(52) U.S. Cl.
CPC ........ *H04W 72/042* (2013.01); *H04B 7/0417* (2013.01); *H04B 7/0452* (2013.01); *H04B 7/0456* (2013.01); *H04W 72/044* (2013.01)

(58) Field of Classification Search
CPC .............. H04W 72/042; H04W 72/044; H04B 7/0417; H04B 7/0452; H04B 7/0456
See application file for complete search history.

(56) References Cited

U.S. PATENT DOCUMENTS

2014/0036810 A1    2/2014  Harrison et al.
2014/0078974 A1    3/2014  Falahati et al.
(Continued)

FOREIGN PATENT DOCUMENTS

CN    101472323 A    7/2009
CN    103491042 A    1/2014
(Continued)

OTHER PUBLICATIONS

Huawei et al., "Discussion on Uplink Control Channel Design in NR," 3GPP TSG RAN WG1 Meeting #86bis, R1-1608840, Lisbon, Portugal, Oct. 10, 2016, pp. 1-3. (Year: 2016).*
(Continued)

*Primary Examiner* — Donald L Mills
(74) *Attorney, Agent, or Firm* — Knobbe Martens Olson & Bear LLP

(57) ABSTRACT

Disclosed is a method for sending a control channel. The method includes: a first communication node determining second transmission parameter information about the control channel according to at least one of first control information or first parameter information and sending the control channel to a second communication node according to the second transmission parameter information. The first parameter information includes at least one of the following information: information about a type of second control
(Continued)

information transmitted on the control channel, time resource information of the first control information, or CSI comprised in the first control information. Further disclosed are a device for sending a control channel, a method for receiving a control channel and a device for receiving a control channel.

18 Claims, 21 Drawing Sheets

(51) Int. Cl.
  *H04B 7/0452* (2017.01)
  *H04B 7/0456* (2017.01)

(56) References Cited

U.S. PATENT DOCUMENTS

| | | |
|---|---|---|
| 2015/0249982 A1 | 9/2015 | Falahati et al. |
| 2016/0050632 A1 | 2/2016 | Falahati et al. |
| 2016/0081065 A1 | 3/2016 | Shi et al. |
| 2016/0295577 A1 | 10/2016 | Harrison et al. |
| 2017/0318575 A1* | 11/2017 | Park ................. H04L 1/1896 |
| 2017/0374656 A1 | 12/2017 | Kim et al. |
| 2017/0374658 A1 | 12/2017 | Kim et al. |
| 2018/0027551 A1 | 1/2018 | Harrison et al. |
| 2018/0192397 A1* | 7/2018 | Seo ................... H04W 72/02 |
| 2019/0045500 A1 | 2/2019 | Harrison et al. |
| 2019/0053223 A1* | 2/2019 | Zhou .................. H04L 5/005 |
| 2019/0222389 A1* | 7/2019 | Ko ..................... H04L 5/0057 |
| 2019/0268938 A1* | 8/2019 | Zhao .................. H04L 5/0048 |
| 2020/0077370 A1* | 3/2020 | Qu .................... H04L 5/0007 |
| 2020/0162303 A1* | 5/2020 | Kim ................... H04L 5/10 |

FOREIGN PATENT DOCUMENTS

| | | |
|---|---|---|
| CN | 103929266 A | 7/2014 |
| WO | 2015035910 A1 | 3/2015 |
| WO | 2016/108666 A1 | 7/2016 |

OTHER PUBLICATIONS

CMCC, "Discussion on Uplink Control Channel Design for NR," 3GPP TSG RAN WG1 Meeting #86bis, R1-1609311, Lisbon, Portugal, Oct. 10, 2016, pp. 1-3. (Year: 2016).*
Intel, "Resource Allocation for NR Uplink Control Channel," 3GPP TSG RAN WG1 Meeting #86bis, R1-1609538, Lisbon, Portugal, Oct. 10, 2016, pp. 1-5. (Year: 2016).*
Panasonic, "Discussion on Uplink Control Channel for NR," 3GPP TSG RAN WG1 Meeting #86bis, R1-1609816, Lisbon, Portugal, Oct. 10, 2016, pp. 1-3. (Year: 2016).*
CATT, "DMRS Design for NR," 3GPP TSG RAN WG1 Meeting #86bis, R1-1608778, Lisbon, Portugal, Oct. 10, 2016, pp. 1-3. (Year: 2016).*
Extended European Search Report of corresponding Patent Application No. 17868281.1—13 pages (dated May 18, 2020).
Samsung, "UL Control Channel Design", 3GPP RAN WG1 #86bis, R1-1609129—3 pages (Oct. 9, 2016).
Nokia et al., "On the UL control channel structure for NR", 3GPP TSG-RAN WG1 #86 Bis, R1-1609740—6 pages (Oct. 9, 2016).
International Search Report dated Jan. 29, 2018 for International Application No. PCT/CN2017/109607, 5 pages.
Written Opinion of the International Searching Authority dated Jan. 29, 2018 for International Application No. PCT/CN2017/109607, 4 pages.

* cited by examiner

METHOD AND DEVICE FOR SENDING CONTROL CHANNEL

CROSS REFERENCE TO RELATED APPLICATIONS

This is a National Stage Application, filed under 35 U.S.C. 371, of International Patent Application No. PCT/CN2017/109607, filed on Nov. 6, 2017, which claims priorities to Chinese patent application No. 201610966223.2, filed on Nov. 4, 2016, and Chinese patent application No. 201710184880.6, filed on Mar. 24, 2017, contents of both of which are incorporated herein by reference in their entireties.

TECHNICAL FIELD

The present invention relates to communications and relates to, for example, a method and device for sending a control channel.

BACKGROUND

In the 5$^{th}$ New Radio (5G-NR) RAN1 86b meeting, the following conclusion was reached: an uplink control channel with a long duration and an uplink control channel with a short duration need to be considered. The uplink control channel with the long duration occupies a large number of time-domain symbols, while the uplink control channel with the short duration occupies a small number of time-domain symbols.

In one timeslot, different users or different control channels may require different numbers of time-domain symbols, so that control channels occupying different numbers of time-domain symbols may exist in one timeslot at the same time. The problem needs to be considered and solved is how to allocate the uplink control channel with the long duration and the uplink control channel with the short duration so as to make the quantity of resource fragments left to an uplink data domain as small as possible.

When there is an intersection between frequency-domain resources of the uplink control channel with the long duration and frequency-domain resources of the uplink control channel with the short duration, how to arrange time-domain resources of the two and how to arrange demodulation reference signal resources of the two are also the problems to be solved.

When both an uplink control channel and an uplink data channel are sent by using beams, the following problems are also needed to be solved for the uplink control channel: whether Multi-User Multiple-Input Multiple-Output (MU-MIMO) can be carried out by the two, and how to solve the interference problem of the two or how to ensure that demodulation reference signals of the two are orthogonal to each other when the MU-MIMO scheduling manner is used.

When the uplink control channel is sent by using beams, the following problems need to be taken into account: when a second uplink control information is sent by using multiple transmitted beams, especially multiple time-division transmitted beams, how to arrange time-domain resources occupied by the multiple time-division transmitted beams and how a base station arranges its own received beams according to its own scheduling requirements so as to enable a sending end to send the uplink control channel by using suitable transmitted beams.

SUMMARY

A method for sending a control channel includes the steps as follows. A first communication node determines second transmission parameter information about the control channel according to at least one of first control information or first parameter information and sends the control channel to a second communication node according to the second transmission parameter information.

The first parameter information includes at least one of the following information: demodulation reference signal information corresponding to the first control information, demodulation reference signal information of a data channel corresponding to the control channel, type information of second control information transmitted on the control channel, channel coding rate information corresponding to the first control information, time resource information of the data channel or the first control information, or channel state information (CSI) included in the first control information.

The first control information and the data channel are sent by the second communication node to the first communication node and the second control information is sent by the first communication node to the second communication node, where the second control information is on the control channel.

A method for receiving a control channel includes: sending at least one of first control information or first parameter information to a first communication node; determining second transmission parameter information of the control channel according to the at least one of the first control information or the first parameter information; and receiving, according to the determined second transmission parameter information, the control channel sent by the first communication node.

The first parameter information includes at least one of the following information: demodulation reference signal information corresponding to the first control information, demodulation reference signal information of a data channel corresponding to the control channel, type information of second control information transmitted on the control channel, channel coding rate information corresponding to the first control information, time resource information of the data channel or the first control information, or channel state information (CSI) included in the first control information.

The first control information and the data channel are signals received by the first communication node and the second control information is a signal sent by the first communication node, where the second control information is on the control channel.

A device for sending a control channel includes a receiving unit, a determining unit and a sending unit. The receiving unit is configured to receive at least one of first control information or first parameter information. The determining unit is configured to determine second transmission parameter information about the control channel according to the at least one of the first control information or the first parameter information. The sending unit is configured to send the control channel to a second communication node according to the second transmission parameter information.

The first parameter information includes at least one of the following information: demodulation reference signal information corresponding to the first control information, demodulation reference signal information of a data channel corresponding to the control channel, type information of second control information transmitted on the control channel, or channel coding rate information corresponding to the first control information.

The first control information is sent by the second communication node to the first communication node and the second control information is sent by the first communication node to the second communication node, wherein the second control information is on the control channel.

A device for receiving a control channel includes a sending unit and a receiving unit. The sending unit is configured to send at least one of first control information or first parameter information to a first communication node. The receiving unit is configured to receive the control channel sent by the first communication node according to second transmission parameter information. The second transmission parameter information is second transmission parameter information about the control channel determined by the first communication node according to the at least one of the first control information or the first parameter information.

The first parameter information includes at least one of the following information: demodulation reference signal information corresponding to the first control information, demodulation reference signal information of a data channel corresponding to the control channel, type information of second control information transmitted on the control channel, or channel coding rate information corresponding to the first control information.

The first control information is sent by the second communication node to the first communication node and the second control information is sent by the first communication node to the second communication node, where the second control information is on the control channel.

A method for determining a sending manner of a control channel includes the steps as follows. A first communication node determines the sending manner of the control channel according to a sending manner of a data channel and sends the control channel to a second communication node according to the determined sending manner. Or, the first communication node determines a sending manner of a third type of control channel according to a sending manner of a fourth type of control channel and sends the third type of control channel to the second communication node according to the determined sending manner.

A method for determining a receiving manner of a control channel includes the steps as follows. A second communication node receives, according to the determined receiving manner, the control channel sent by a first communication node.

The determined receiving manner is determined according to a receiving manner used to receive a data channel sent by the first communication node or according to a receiving manner used to receive a fourth type of control channel sent by the first communication node.

A first determining device for determining a sending manner of a control channel includes: a determining unit and a sending unit. The determining unit is configured to determine the sending manner of the control channel according to a sending manner of a data channel or determine a sending manner of a third type of control channel according to a sending manner of a fourth type of control channel. The sending unit is configured to send the control channel to a second communication node according to the determined sending manner or send the third type of control channel to the second communication node according to the determined sending manner.

A second determining device for determining a receiving manner of a control channel includes: a receiving unit. The receiving unit is configured to receive, according to the determined receiving manner, the control channel sent by a first communication node.

The determined receiving manner is determined according to a receiving manner used to receive a data channel sent by the first communication node or according to a receiving manner used to receive a fourth type of control channel sent by the first communication node.

A computer-readable storage medium is configured to store computer-executable instructions for executing the preceding methods.

An electronic device includes: at least one processor; and a memory that is communicatively connected to the at least one memory. The memory stores instructions executable by the at least one processor, and the at least one processor executes the instructions to execute any one of the preceding methods.

DETAILED DESCRIPTION

Figure 1:
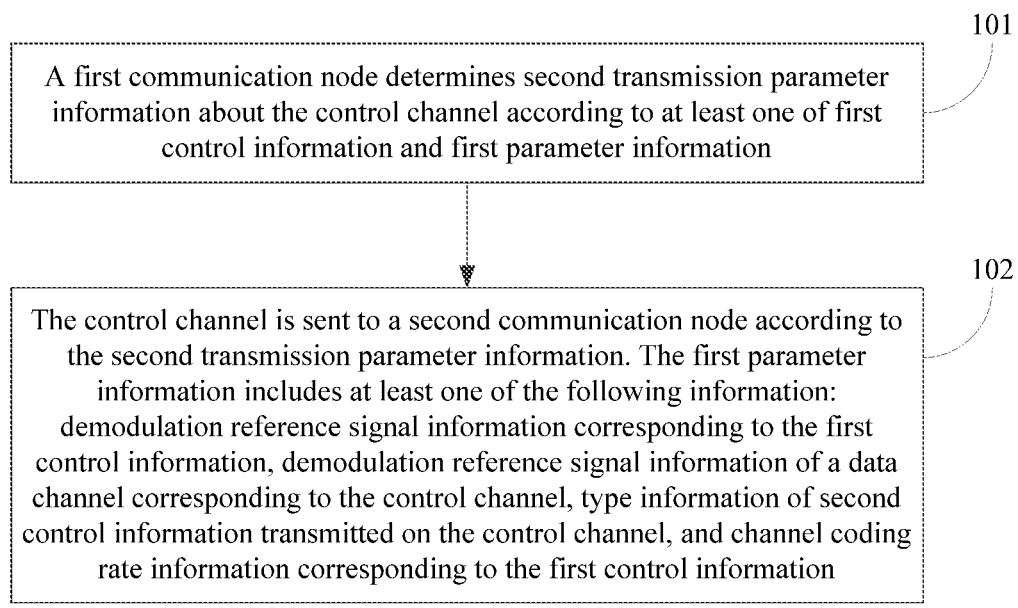
FIG. 1 is a flowchart of a method for sending a control channel according to an embodiment.

FIG. 1 is flowchart one of a method for sending a control channel according to an embodiment. As shown in FIG. 1, the method for sending a control channel includes the steps described below.

In step 101, a first communication node determines second transmission parameter information about the control channel is determined according to at least one of first control information or first parameter information.

In step 102, the control channel is sent to a second communication node according to the second transmission parameter information.

The first parameter information includes at least one of the following information: demodulation reference signal information corresponding to the first control information, demodulation reference signal information of a data channel corresponding to the control channel, type information of second control information transmitted on the control channel, or channel coding rate information corresponding to the first control information.

Alternatively, the first control information is sent by the second communication node to the first communication node and the second control information is sent by the first communication node to the second communication node, where the second control information is on the control channel.

In an embodiment, the second transmission parameter information includes at least one of the following information: information about a control channel region, information about frequency-domain resources occupied by the control channel, information about time-domain symbols occupied by the control channel, information about demodulation reference signals of the control channel, code-domain resources occupied by the control channel, or a multiplexing manner of multiple pieces of second control information.

In an embodiment, the first control information is first control information related to the data channel corresponding to the control channel.

The data channel and the first control information are received by the first communication node from the second communication node.

In an embodiment, the demodulation reference signal information includes at least one of the following information: port index information of a demodulation reference signal; or index information of sequences adopted by the demodulation reference signal.

In an embodiment, the method further includes: obtaining resource information corresponding to the control channel according to the demodulation reference signal information of the data channel and at least one of the following information: frequency-domain resources corresponding to the data channel, index information corresponding to the first control information, or time unit index information corresponding to the data channel.

In an embodiment, the method further includes: obtaining, according to one or more minimum frequency-domain resource indexes corresponding to the data channel, a second frequency-domain resource occupied by the control channel; obtaining, according to one or more maximum frequency-domain resource indexes corresponding to the data channel, the second frequency-domain resource occupied by the control channel; obtaining third resource information of the control channel in the second frequency-domain resource according to the demodulation reference signal information corresponding to the data channel.

In an embodiment, the third resource information includes at least one of the following information: a time-frequency resource group index of the control channel in the second frequency-domain resource, where the second frequency-domain resource includes multiple time-frequency resource groups; a code-domain resource index of the control channel in the second frequency-domain resource; or demodulation reference signal resource information corresponding to the control channel.

In an embodiment, the method further includes: obtaining third transmission parameter information of the control channel according to the demodulation reference signal information corresponding to the first control information and index information corresponding to the first control information.

In an embodiment, the third transmission parameter information includes at least one of the following resource information: a time-domain resource corresponding to the control channel, the frequency-domain resource corresponding to the control channel, a code resource corresponding to the control channel, or a time-frequency-code resource corresponding to a demodulation reference signal of the control channel.

In an embodiment, the method further includes: sending another signal according to the information about the control channel region; or when a frequency-domain resource allocated for another signal in a current time unit intersects with a frequency-domain resource where the control channel region is located, not sending the another signal on the control channel region; wherein the another signal includes at least one of the following signals: a data channel signal, a measurement reference signal, a demodulation reference signal, an access request signal or a scheduling request signal.

Alternatively, a resource occupied by the control channel is a subset of a resource occupied by the control channel region. The control channel region may also be referred to as a control channel resource set. One of control channel resources may be at least one of the following resources: a time-domain resource, a frequency-domain resource or a code-domain resource. Besides, the resource(s) occupied by the control channel in the control channel region may be notified by a dynamic signaling.

In an embodiment, the information about the control channel region includes at least one of the following information: a number of sub-regions included in the control channel region, information about frequency-domain resources of each of the sub-regions, or information about a number of time-domain symbols corresponding to each of the sub-regions.

In an embodiment, the control channel region satisfies one of the following features: the control channel region occupies two sides of a predetermined bandwidth; on an upper side of the predetermined bandwidth, the greater a number of time-domain symbols corresponding to a sub-region is, the higher an occupied frequency-domain position is, where the higher the frequency-domain position is, the greater a subcarrier number of a subcarrier at which the sub-region is located is; on a lower side of the predetermined bandwidth, the greater the number of the symbols corresponding to the sub-region is, the lower the occupied frequency-domain position is, where the lower the frequency-domain position is, the smaller the subcarrier number of the subcarrier at which the sub-region is located is; when the sub-region includes N time-domain symbols, an ending symbol of the N time-domain symbols is an ending symbol of a second transmission domain; and when the sub-region includes the N time-domain symbols, a starting symbol of the N time-domain symbols is a starting time-domain symbol of the second transmission domain. The second transmission domain corresponds to a region of the second communication node receiving a signal.

In an embodiment, indication information indicating information about the number of time-domain symbols of the control channel in the first control information includes at least one of the following information: whether a duration of the control channel is a long duration or a short duration; a starting symbol index of the control channel; an ending symbol index of the control channel; the number of the time-domain symbols of the control channel; or an index of the number of the time-domain symbols of the control channel in an agreed set of numbers of time-domain symbols.

In an embodiment, when obtaining that a duration of the control channel is a long duration, a number of time-domain symbols of the control channel is equal to a number of time-domain symbols of a corresponding transmission domain. The corresponding transmission domain and the control channel have a same transmission direction.

In an embodiment, the control channels with the long duration in different time units correspond to different numbers of time-domain symbols.

In an embodiment, the method further includes at least one of the following: determining information about the number of time-domain symbols occupied by the control channel or information about the number of frequency domains of the control channel according to a type of the second control information transmitted on the control channel; determining the information about the number of the time-domain symbols of the control channel or the information about the number of the frequency domains of the control channel according to information about a channel quality level or a capability level of the first communication node, where the first communication node feeds back the capability level information or the channel quality level information to the second communication node; determining the information about the number of the time-domain symbols occupied by the control channel or the information about the number of the frequency domains of the control channel according to a channel coding rate corresponding to the first control information; determining the information about the number of the time-domain symbols occupied by the control channel or the information about the number of the frequency domains of the control channel according to a channel coding rate of a first data channel corresponding to the second control information; or determining the information about the number of the time-domain symbols occupied by the control channel or the information about the number of the frequency domains of the control channel according to a channel coding rate of a second data channel.

Different types of the control channel are distinguished from each other by at least one of the following information: whether the second control information is Channel State Information (CSI) or Acknowledgement/Negative-Acknowledgement (ACK/NACK) information, an information length of the second control information, the first data channel being a data channel sent by the second communication node to the first communication node, the second data channel being a data channel sent by the first communication node to the second communication node in a current time unit, or the current time unit being a time unit where the control channel is located.

In an embodiment, multiple pieces of second control information having the same number of time-domain symbols are sent on one control channel. In an embodiment, multiple pieces of second control information of the same type are sent on one control channel. Different types of second control information are distinguished from each other by at least one of the following information: whether the second control information is CSI information or ACK/NACK information, an information length of the second control information, or a service type of the data corresponding to the second control information. The multiple pieces of second control information are multiple pieces of second control information needed to be fed back in the current time unit.

In an embodiment, the method further includes at least one of the following. When multiple pieces of second control information needed to be fed back in a current time unit are sent on one control channel, obtaining resource information of the control channel according to first control information corresponding to a highest time unit index among multiple pieces of first control information related to the multiple pieces of second control information. For example, the highest time unit index of the time unit represents the last time unit. When the multiple pieces of second control information needed to be fed back in the current time unit are sent on the one control channel, obtaining the resource information of the control channel according to control channel resource information corresponding to the multiple pieces of second control information.

In an embodiment, a time-frequency-domain position of a demodulation reference signal of the control channel is obtained in one of the following manners: whether the demodulation reference signal is on a starting symbol or an ending symbol of the control channel is obtained according to the first control information; whether frequency-domain resources occupied by the demodulation reference signal in one time-domain symbol are continuous or discrete is obtained according to the first control information; parameters related to the demodulation reference signal are determined according to information about the number of time-domain symbols of the control channel; the parameters related to the demodulation reference signal are determined according to whether the control channel and a second data channel are allowed to be in code division multiplexing mode; the parameters related to the demodulation reference signal are determined according to the number of sending manner sets; and the parameters related to the demodulation reference signal are determined according to a sending mode of the control channel, where the sending mode includes a single-layer transmission, a transmission diversity mode and a repeated transmission. The second data channel is a data channel sent by the first communication node to the second communication node or by a third communication node to the second communication node.

In an embodiment, the first control information satisfies at least one of the following features: the first control information is high-layer semi-static control information; or the first control information is physical-layer dynamic control information.

In an embodiment, frequency-domain resource information of the control channel is obtained in the following manner: physical-layer dynamic information to notify the frequency-domain resource.

In an embodiment, the frequency domain resource may occupy any one or more frequency-domain resources within a predetermined bandwidth. In an exemplary embodiment, one frequency-domain resource is one PRB, one sub-band, one control channel element (CCE) or one resource element group (REG).

In an embodiment, resources occupied by the control channel satisfy the following feature: obtaining an ending time-domain symbol position and a starting frequency-domain resource corresponding to the control channel, as well as information about a number of resource elements of the control channel; and for the multiple resource elements of the control channel, first mapping in a frequency domain and then mapping in a time domain.

In an embodiment, the first parameter information further includes index information of a time unit at which the data channel or the first control information is located.

In an embodiment, time resource information of one of the data channel and the first control information includes at least one of the following information: index information of a time unit at which the data channel or the first control information is located; index information of a time-domain symbol at which the data channel or the first control information is located; index information of a time unit at which a time-domain ending position of one of the data channel or the first control information is located; or index information of a time-domain symbol at which the time-domain ending position of one of the data channel or the first control information is located.

In an embodiment, demodulation reference signal resource information of the second control information is determined according to the CSI in the first control information.

In an embodiment, CSI information fed back by the first communication node includes a transmission resource corresponding to the first communication node. The transmission resource includes one or more of the following types of resources: a transmitting beam resource, a transmission port resource, a transmission precoding matrix resource, a transmission time resource, a transmission frequency-domain resource and a transmission sequence resource.

In an embodiment, the first control information satisfies at least one of the following: the first control information is common control information, where the common control information may be a group common physical downlink control channel; the first control information includes information that notifies a control channel resource set of a current time unit; the first control information includes information that notifies a sending sequence of multiple sending manners used by the first communication node to send the control channel; the first control information includes information that notifies a correspondence between time-domain regions of the control channel and the multiple sending manners or sending manner sets used to send the control channel; the first control information includes at least one of information for notifying time-domain resource corresponding to each sending manner in the multiple sending manners or information for notifying frequency-domain resource corresponding to each sending manner in the multiple sending manners, wherein the multiple sending manners are used by the first communication node to send the control channel; the first control information includes at least one of information for notifying time-domain resource corresponding to each sending manner set in the multiple sending manner sets or information for notifying frequency-domain resource corresponding to each sending manner set in the multiple sending manner sets, wherein the multiple sending manner sets are used by the first communication node to send the control channel; the first control information includes information that notifies a sending manner used by the first communication node to send the control channel, where information about the sending manners may also be referred to as beam information or precoding information; the first control information includes information that notifies a control channel format used by the first communication node to send the control channel, where different control channels are distinguished from each other in at least one of the following manners: a frequency-domain spreading manner, a time-domain spreading manner, the maximum number of bits that can be transmitted, or a multiplexing manner of multiple pieces of second control information; the first control information includes information that notifies a modulation manner used by the first communication node to send the control channel; or the first control information includes information that notifies a coding rate used by the first communication node to send the control channel.

In an embodiment, the method further includes: randomly selecting, by the first communication node, one or more control channel resources from the control channel resource set and sending the control channel on the one or more control channel resources; or selecting, by the first communication node, one or more control channel resources from the control channel resource set according to a predetermined rule and sending the control channel on the one or more control channel resources. The predetermined rule is identification information of the first communication node.

In an embodiment, the sending manners are indicated by at least one of the following information: information about a port set of a first reference signal, where when a first reference signal port set includes only one reference signal port, port information of the first reference signal is directly notified; information about a resource index of the first reference signal;

time-domain information corresponding to the first reference signal; frequency-domain information corresponding to the first reference signal; sequence information corresponding to the first reference signal; information about a transmitting beam logical number; information about a precoding codeword or codeword set; a or nd information about a quasi-co-location relationship between the demodulation reference signal of the control channel and a second reference signal port.

The second reference signal port may also be at least one of a second reference signal port set or a second reference signal resource. The quasi-co-location relationship can be interpreted as: if two reference signals satisfy the quasi-co-location relationship, the channel characteristic parameters of one reference signal may be obtained from the channel characteristic parameters of the two reference signals. The channel characteristic parameters include at least one of the following parameters: delay spread, Doppler spread, Doppler shift, average delay, average gain, average vertical transmission angle, average horizontal transmission angle, average vertical angle of arrival, average horizontal angle of arrival, central vertical transmission angle, central horizontal transmission angle, central vertical angle of arrival, or central horizontal angle of arrival.

The first reference signal and the second reference signal are reference signals sent by the first communication node, the first reference signal and the second reference signal are reference signals received by the first communication node, or the first reference signal and the second reference signal are reference signals sent and received by the first communication node.

In an embodiment, when the first reference signal and the second reference signal are the reference signals received by the first communication node, at least one of the first reference signal and the second reference signal indicates one of the following information: information about a sending manner used by the first communication node to send a signal; the information about the sending manner used by the first communication node to send the signal and information about a receiving manner used by a receiving end to receive the signal; the information about the receiving manner used by the receiving end to receive the signal after the first communication node sends the signal; or the information about the sending manner used by the first communication node to send the signal and information about a receiving manner used by the first communication node to receive the signal.

Figure 9:
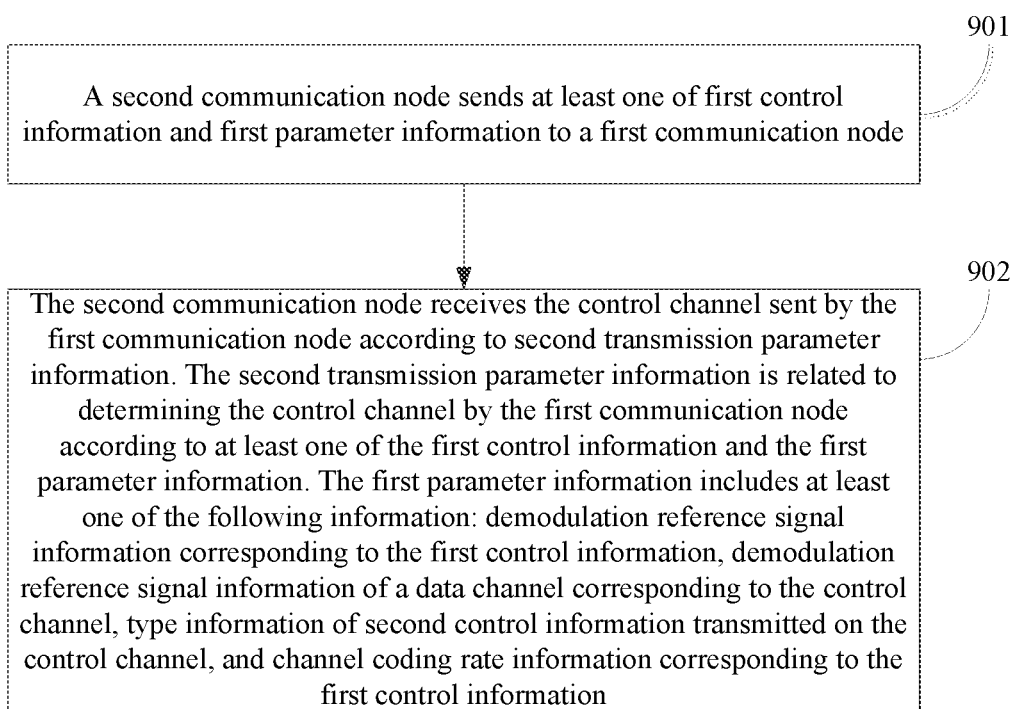
FIG. 9 is a flowchart of a method for receiving a control channel according to an embodiment.

FIG. 9 is flowchart two of a method for receiving a control channel according to an embodiment. As shown in FIG. 9, the method for receiving a control channel includes the steps described below.

In step 901, a second communication node sends at least one of first control information or first parameter information to a first communication node.

In step 902, the second communication node receives the control channel sent by the first communication node according to second transmission parameter information. The second transmission parameter information is the second transmission parameter information for determining the control channel by the first communication node according to at least one of the first control information or the first parameter information.

The first parameter information includes at least one of the following information: demodulation reference signal information corresponding to the first control information, demodulation reference signal information of a data channel corresponding to the control channel, type information of second control information transmitted on the control channel, or channel coding rate information corresponding to the first control information.

Alternatively, the first control information is sent by the second communication node to the first communication node and the second control information is sent by the first communication node to the second communication node, where the second control information is on the control channel.

In an embodiment, the second transmission parameter information includes at least one of the following information: information about a control channel region, information about frequency-domain resources occupied by the control channel, information about time-domain symbols occupied by the control channel, information about demodulation reference signals of the control channel, information about code-domain resources occupied by the control channel, or a multiplexing manner of multiple pieces of second control information.

In an embodiment, the first control information is the first control information related to the data channel corresponding to the control channel.

Alternatively, the data channel and the first control information are received by the first communication node from the second communication node.

In an embodiment, the demodulation reference signal information includes at least one of the following information: port index information of a demodulation reference signal; or index information of sequences adopted by the demodulation reference signal.

In an embodiment, the method further includes: obtaining resource information of the control channel according to the demodulation reference signal information of the data channel and at least one of the following information: frequency-domain resources corresponding to the data channel, index information corresponding to the first control information, or time unit index information corresponding to the data channel.

In an embodiment, the method further includes: obtaining, according to one or more minimum frequency-domain resource indexes corresponding to the data channel, a second frequency-domain resource occupied by the control channel; obtaining, according to one or more maximum frequency-domain resource indexes corresponding to the data channel, the second frequency-domain resource occupied by the control channel; obtaining third resource information of the control channel in the second frequency-domain resource according to the demodulation reference signal information corresponding to the data channel.

In an embodiment, the third resource information includes at least one of the following information: a time-frequency resource group index of the control channel in the second frequency-domain resource, wherein the second frequency-domain resource includes multiple time-frequency resource groups; a code-domain resource index of the control channel in the second frequency-domain resource; or demodulation reference signal resource information corresponding to the control channel.

In an embodiment, the method further includes: obtaining third transmission parameter information of the control channel according to the demodulation reference signal information corresponding to the first control information and index information corresponding to the first control information.

In an embodiment, the third transmission parameter information includes at least one of the following resource information: a time-domain resource corresponding to the control channel, the frequency-domain resource corresponding to the control channel, a code resource corresponding to the control channel, or a time-frequency-code resource corresponding to a demodulation reference signal of the control channel.

In an embodiment, the method further includes: receiving another signal according to the information about the control channel region; or when a frequency-domain resource allocated for another signal in a current time unit intersects with a frequency-domain resource where the control channel region is located, not receiving the another signal on the control channel region; wherein the another signal includes at least one of the following signals: a data channel signal, a measurement reference signal, a demodulation reference signal, an access request signal and a scheduling request signal; or a resource occupied by the control channel being a subset of resources occupied by the control channel region, where the control channel region may also be referred to as a control channel resource set. One control channel resource may be at least one of the following resources: a time-domain resource, a frequency-domain resource or a code-domain resource. The resources occupied by the control channel in the control channel region may be notified by a dynamic signaling.

In an embodiment, the information about the control channel region includes at least one of the following information: the number of sub-regions included in the control channel region, information about frequency-domain resources of each of the sub-regions, or information about the number of time-domain symbols corresponding to each of the sub-regions.

In an embodiment, the control channel region satisfies one of the following features: the control channel region occupies two sides of a predetermined bandwidth; on an upper side of the predetermined bandwidth, the greater a number of time-domain symbols corresponding to a sub-region is, the higher an occupied frequency-domain position is, wherein the higher the frequency-domain position is, the greater a number of a subcarrier at which the sub-region is located is; on a lower side of the predetermined bandwidth, the greater the number of the symbols corresponding to the sub-region is, the lower the occupied frequency-domain position is, wherein the lower the frequency-domain position is, the smaller a number of a subcarrier at which the sub-region is located is; when the sub-region includes N time-domain symbols, an ending symbol of the N time-domain symbols is an ending symbol of a second transmission domain; and when the sub-region includes the N time-domain symbols, a starting symbol of the N time-domain symbols is a starting time-domain symbol of the second transmission domain. The second transmission domain corresponds to a signal receiving region of the second communication node.

In an embodiment, indication information which is in the first control information and indicates information about a number of time-domain symbols of the control channel includes at least one of the following information: whether a duration of the control channel is a long duration or a short duration; a starting symbol index of the control channel; an ending symbol index of the control channel; the number of the time-domain symbols of the control channel; or an index of the number of the time-domain symbols of the control channel in an agreed set of numbers of time-domain symbols.

In an embodiment, when obtaining that a duration of the control channel is a long duration, a number of time-domain symbols of the control channel is equal to a number of time-domain symbols of a corresponding transmission domain, wherein the corresponding transmission domain and the control channel have a same transmission direction.

In an embodiment, the control channels with the long duration in different time units correspond to different numbers of time-domain symbols.

In an embodiment, the method further includes at least one of the following: determining information about a number of time-domain symbols occupied by the control channel or information about a number of frequency domains of the control channel according to a type of the second control information transmitted on the control channel; determining the information about the number of the time-domain symbols of the control channel or the information about the number of the frequency domains of the control channel according to information about a channel quality level or a capability level fed back by the first communication node, where the first communication node feeds back the capability level information or the channel quality level information to the second communication node; determining the information about the number of the time-domain symbols occupied by the control channel or the information about the number of the frequency domains of the control channel according to a channel coding rate corresponding to the first control information; determining the information about the number of the time-domain symbols occupied by the control channel or the information about the number of the frequency domains of the control channel according to a channel coding rate of a first data channel corresponding to the second control information; or determining the information about the number of the time-domain symbols occupied by the control channel or the information about the number of the frequency domains of the control channel according to a channel coding rate of a second data channel.

Different types of the control channel are distinguished from each other by at least one of the following information: whether the second control information is CSI information or ACK/NACK information, an information length of the second control information, the first data channel being sent by the second communication node to the first communication node, the second data channel being a data channel sent by the first communication node to the second communication node in a current time unit, or the current time unit being a time unit where the control channel is located.

In an embodiment, multiple pieces of second control information having the same number of time-domain symbols are received on one control channel; and multiple pieces of second control information of the same type are received on one control channel.

The different types of second control information are distinguished from each other by at least one of the following information: whether the second control information is CSI information or ACK/NACK information, an information length of the second control information, or a service type of the data corresponding to the second control information. The multiple pieces of second control information are the multiple pieces of second control information needed to be received in a current time unit.

In an embodiment, the method further includes at least one of the following: when multiple pieces of second control information needed to be received in a current time unit are sent on one control channel, obtaining resource information of the control channel according to first control information corresponding to a highest time unit index among multiple pieces of first control information related to the multiple pieces of second control information; or when the multiple pieces of second control information needed to be received in the current time unit are sent on the one control channel, obtaining the resource information of the control channel according to control channel resource information corresponding to the multiple pieces of second control information.

In an embodiment, a time-frequency-domain position of a demodulation reference signal of the control channel is obtained in one of the following manners: whether the demodulation reference signal is on a starting symbol or an ending symbol of the control channel is obtained according to the first control information; whether frequency-domain resources occupied by the demodulation reference signal in one time-domain symbol are continuous or discrete is indicated according to the first control information; parameters related to the demodulation reference signal are determined according to information about a number of time-domain symbols of the control channel; the parameters related to the demodulation reference signal are determined according to whether the control channel and a second data channel are allowed to be in code division multiplexing mode; the parameters related to the demodulation reference signal are determined according to a number of sending manner sets; and the parameters related to the demodulation reference signal are determined according to a sending mode of the control channel, where the sending mode includes a single-layer transmission, a transmission diversity mode and a repeated transmission.

The second data channel is a data channel sent by the first communication node to the second communication node or by a third communication node to the second communication node.

In an embodiment, the first control information satisfies at least one of the following features: the first control information is high-layer semi-static control information; or the first control information is physical-layer dynamic control information.

In an embodiment, frequency-domain resource information of the control channel is obtained in the following manner: physical-layer dynamic information to notify the frequency-domain resource.

Alternatively, the frequency domain resource may occupy any one or more frequency-domain resources within a predetermined bandwidth. In an exemplary embodiment, one frequency-domain resource is one PRB, one sub-band, one CCE or one REG In an embodiment, a resource occupied by the control channel satisfies the following feature: obtaining an ending time-domain symbol position and a starting frequency-domain resource corresponding to the control channel, as well as information about a number of resource elements of the control channel; and for the multiple resource elements of the control channel, first mapping in a frequency domain and then mapping in a time domain.

In an embodiment, the first parameter information further includes index information of a time unit at which the data channel or the first control information is located.

In an embodiment, time resource information of one of the data channel and the first control information includes at least one of the following information: index information of a time unit at which the data channel or the first control information is located; index information of a time-domain symbol at which the data channel or the first control information is located; index information of a time unit at which a time-domain ending position of one of the data channel or the first control information is located; or index information of a time-domain symbol at which the time-domain ending position of one of the data channel or the first control information is located.

In an embodiment, demodulation reference signal resource information of the second control information is determined according to CSI information in the first control information.

In an embodiment, CSI information fed back by the first communication node includes a transmission resource corresponding to the first communication node. The transmission resource includes one or more of the following types of resources: a transmitting beam resource, a transmission port resource, a transmission precoding matrix resource, a transmission time resource, a transmission frequency-domain resource and a transmission sequence resource.

In an embodiment, the first control information satisfies that at least one of the followings. The first control information is common control information, where the common control information may be a group common physical downlink control channel. The first control information includes information that notifies a control channel resource set of a current time unit. The first control information includes information that notifies a sending sequence of multiple sending manners used by the first communication node to send the control channel. The first control information includes information that notifies a correspondence between time-domain regions of the control channel and the multiple sending manners or sending manner sets used to send the control channel. The first control information includes at least one of information for notifying time-domain resource corresponding to each sending manner in the multiple sending manners or information for notifying frequency-domain resource corresponding to each sending manner in the multiple sending manners, wherein the multiple sending manners are used by the first communication node to send the control channel; the first control information includes at least one of information for notifying time-domain resource corresponding to each sending manner set in the multiple sending manner sets or information for notifying frequency-domain resource corresponding to each sending manner set in the multiple sending manner sets, wherein the multiple sending manner sets are used by the first communication node to send the control channel. The first control information includes information that notifies a sending manner used by the first communication node to send the control channel, where information about the sending manners may also be referred to as beam information or precoding information. The first control information includes information that notifies a control channel format used by the first communication node to send the control channel, where different control channels are distinguished from each other in at least one of the following manners: a frequency-domain spreading manner, a time-domain spreading manner, information about the maximum number of bits that can be transmitted, or a multiplexing manner of multiple pieces of second control information. The first control information includes information that notifies a modulation manner used by the first communication node to send the control channel. The first control information includes information that notifies a coding rate used by the first communication node to send the control channel.

In an embodiment, the method further includes: detecting, on all resource sets of the control channel resource set, the control channel sent by the first communication node; and detecting, on a subset of the control channel resource set according to a predetermined rule, the control channel sent by the first communication node. The predetermined rule is identification information of the first communication node.

In an embodiment, the sending manners are indicated by at least one of the following information: information about a port set of a first reference signal, where port information of the first reference signal is directly notified when a first reference signal port set includes only one reference signal port; information about a resource index of the first reference signal; time-domain information corresponding to the first reference signal; frequency-domain information corresponding to the first reference signal; sequence information corresponding to the first reference signal; information about a transmitting beam logical number; information about a precoding codeword or codeword set; or information about a quasi-co-location relationship between the demodulation reference signal of the control channel and a second reference signal port. The second reference signal port may also be at least one of a second reference signal port set or a second reference signal resource.

The quasi-co-location relationship can be interpreted as: if two reference signals satisfy the quasi-co-location relationship, the channel characteristic parameters of one reference signal can be obtained from the channel characteristic parameters of the two reference signals. The channel characteristic parameters include at least one of the following parameters: delay spread, Doppler spread, Doppler shift, average delay, average gain, average vertical transmission angle, average horizontal transmission angle, average vertical angle of arrival, average horizontal angle of arrival, central vertical transmission angle, central horizontal transmission angle, central vertical angle of arrival, or central horizontal angle of arrival.

The first reference signal and the second reference signal are reference signals sent by the first communication node, the first reference signal and the second reference signal are reference signals received by the first communication node, or the first reference signal and the second reference signal are reference signals sent and received by the first communication node.

In an embodiment, when the first reference signal and the second reference signal are the reference signals received by the first communication node, at least one of the first reference signal and the second reference signal indicates one of the following information: information about a sending manner used by the first communication node to send a signal; the information about the sending manner used by the first communication node to send the signal and information about a receiving manner used by a receiving end to receive the signal; the information about the receiving manner used by the receiving end to receive the signal after the first communication node sends the signal; or the information about the sending manner used by the first communication node to send the signal and information about a receiving manner used by the first communication node to receive the signal.

Embodiment One

In this embodiment, a notification manner of uplink control channel region information is described. On the one hand, the uplink control channel region information is for resource mapping of an uplink control channel, and the uplink control channel is in the uplink control channel region. On the other hand, the uplink control channel region information may also serve as information about rate matching of other uplink signals. For example, when frequency-domain resources allocated to other uplink signals in a current time unit intersect frequency-domain resources where the uplink control channel region is located, the other uplink signals are not sent on the uplink control channel region. The other uplink signals include at least one of the following signals: an uplink data channel signal, an uplink measurement reference signal, an uplink demodulation reference signal, an uplink access request signal, or an uplink scheduling request signal.

The uplink control channel region information includes at least one of the following information: information about the number of sub-regions included in the uplink control channel region, information about frequency-domain resources of each sub-region, or information about the number of time-domain symbols corresponding to each sub-region. The information about frequency-domain resources of the sub-region includes a minimum resource index of frequency-domain resources where the sub-region is located, or an offset, where the offset is an offset from an upper side of a predetermined bandwidth, or may also be an offset from an upper sub-region. Alternatively, the information about frequency-domain resources of the sub-region includes a maximum resource index of frequency-domain resources where the sub-region is located, or an offset, where the offset is an offset from a lower side of a predetermined bandwidth, or may also be an offset from a lower sub-region. The predetermined bandwidth is from bottom to top in a direction from a small subcarrier number to a large subcarrier number.

The first notification manner of the information about the number of time-domain symbols corresponding to each sub-region is to notify long duration information or short duration information and then to obtain the number of time-domain symbols according to an agreed value or an agreed rule. For example, the number of time-domain symbols corresponding to the long duration and the number of time-domain symbols corresponding to the short duration are fixed, or the number of time-domain symbols of the long duration is the number of time-domain symbols of the uplink transmission domain included in the current time unit. The number of time-domain symbols of the uplink transmission domain may be different corresponding to different time units, so that the numbers of time-domain symbols corresponding to the long duration are different in different time units. The second notification manner of the information about the number of time-domain symbols corresponding to each sub-region is to notify only the long duration and not notify the number of time-domain symbols for a long-duration sub-region, and to notify information about the number of time-domain symbols for a short-duration sub-region. The third notification manner of the information about the number of time-domain symbols corresponding to each sub-region is to notify a starting time-domain symbol index corresponding to the sub-region, where the ending symbol is an ending symbol of the uplink transmission domain by default. The fourth notification manner of the information about the number of time-domain symbols corresponding to each sub-region is to notify an ending time-domain symbol index corresponding to the sub-region, where a starting symbol is a starting symbol of the uplink transmission domain by default. The fifth notification manner of the information about the number of time-domain symbols corresponding to each sub-region is to notify the starting time-domain symbol index and the number of time-domain symbols corresponding to the sub-region. The sixth notification manner of the information about the number of time-domain symbols corresponding to each sub-region is to notify the ending time-domain symbol index and the number of time-domain symbols corresponding to the sub-region. In an exemplary embodiment, first a length set is configured fixedly or by a high layer, and then an element index of a length in the length set is notified.

The uplink control channel region satisfies one of the following features: the uplink control channel region occupies two sides of the predetermined bandwidth; on the upper side of the predetermined bandwidth, the greater the number of symbols corresponding to a sub-region is, the higher an occupied frequency-domain position is, where a higher frequency-domain position indicates a greater number of the located subcarrier; on the lower side of the predetermined bandwidth, the greater the number of the symbols corresponding to the sub-region is, the lower the occupied frequency-domain position is, where a higher frequency-domain position indicates a greater number of the located subcarrier; when the sub-region includes N time-domain symbols, an ending symbol of the N time-domain symbols is an ending symbol of an uplink transmission domain; and when the sub-region includes the N time-domain symbols, a starting symbol of the N time-domain symbols is a starting time-domain symbol of the uplink transmission domain. Here, the predetermined bandwidth may be a system bandwidth, and it is needed to confirm whether the center carrier frequency of a narrowband user can be freely changed.

Figure 2A:
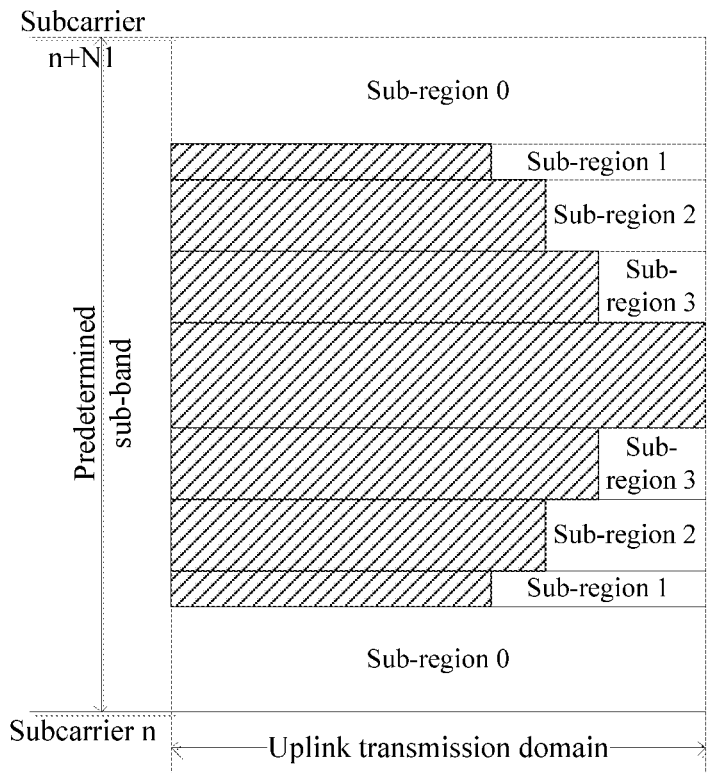
FIGS. 2a-2h are schematic diagrams illustrating different structures of an uplink control channel region according to an embodiment.
Figure 2B:
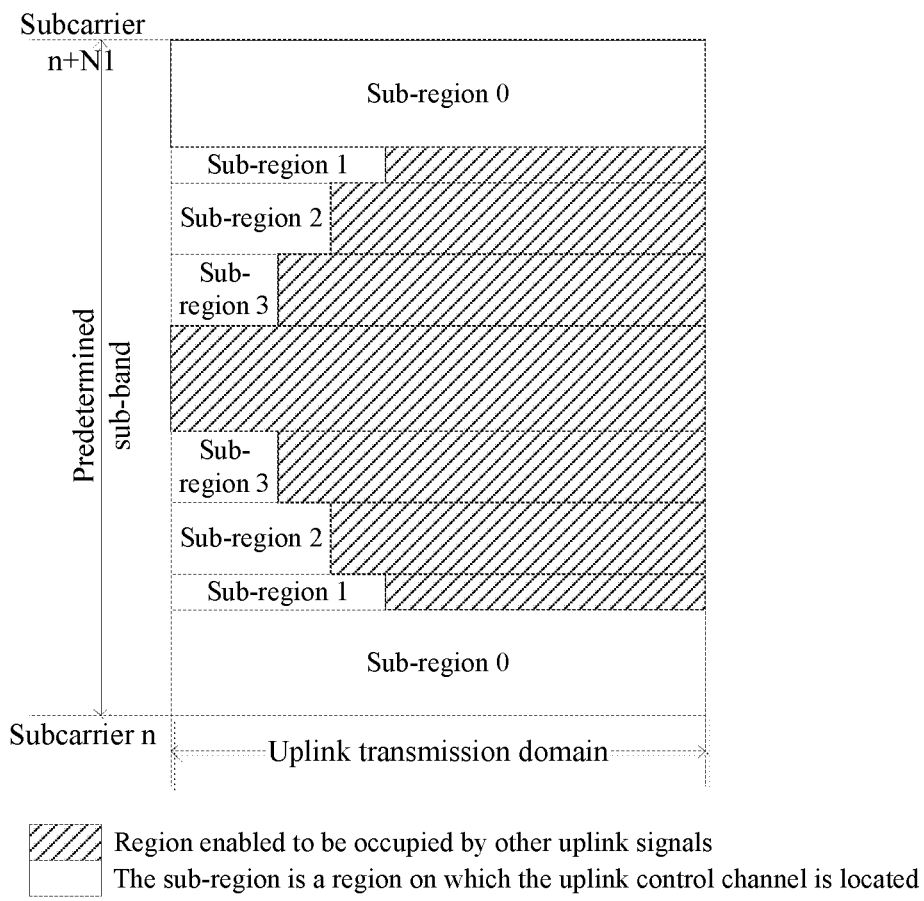
Figure 2C:
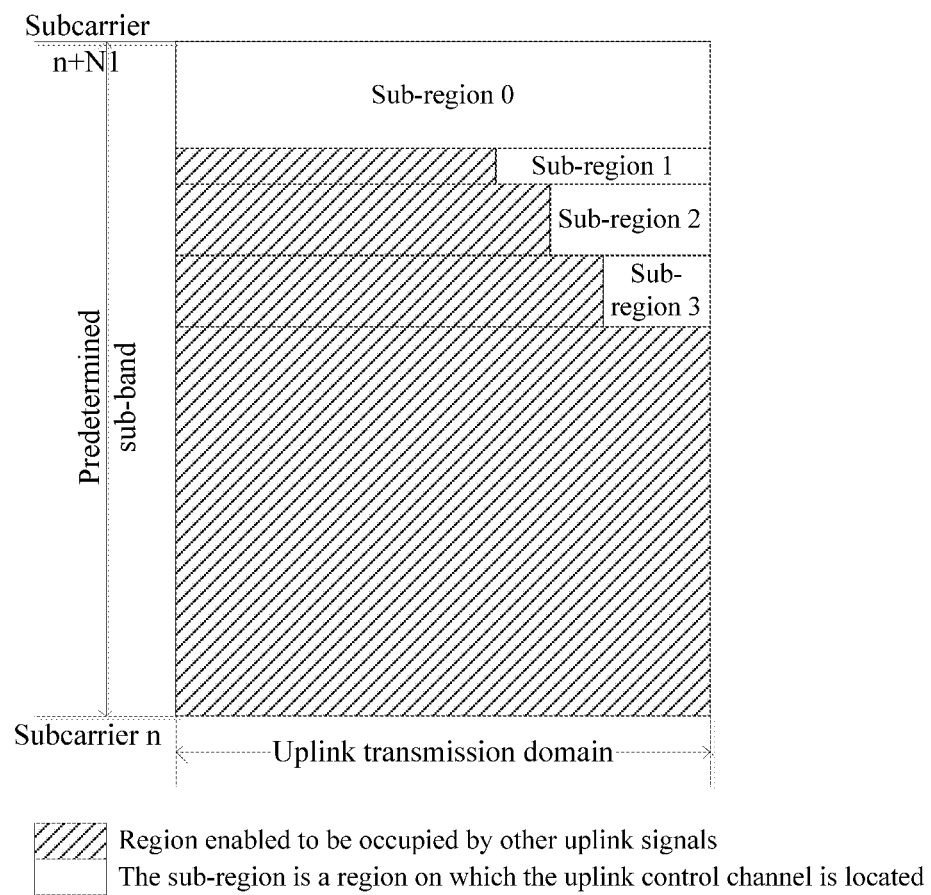
Figure 2D:
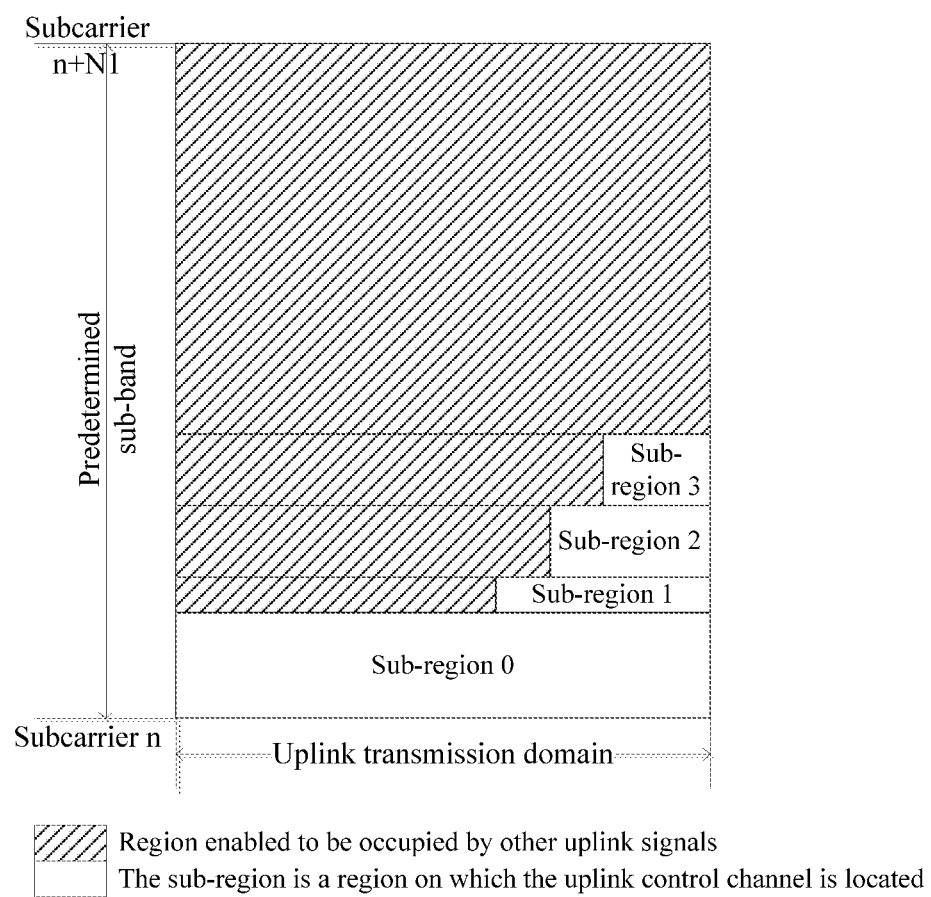
Figure 2E:
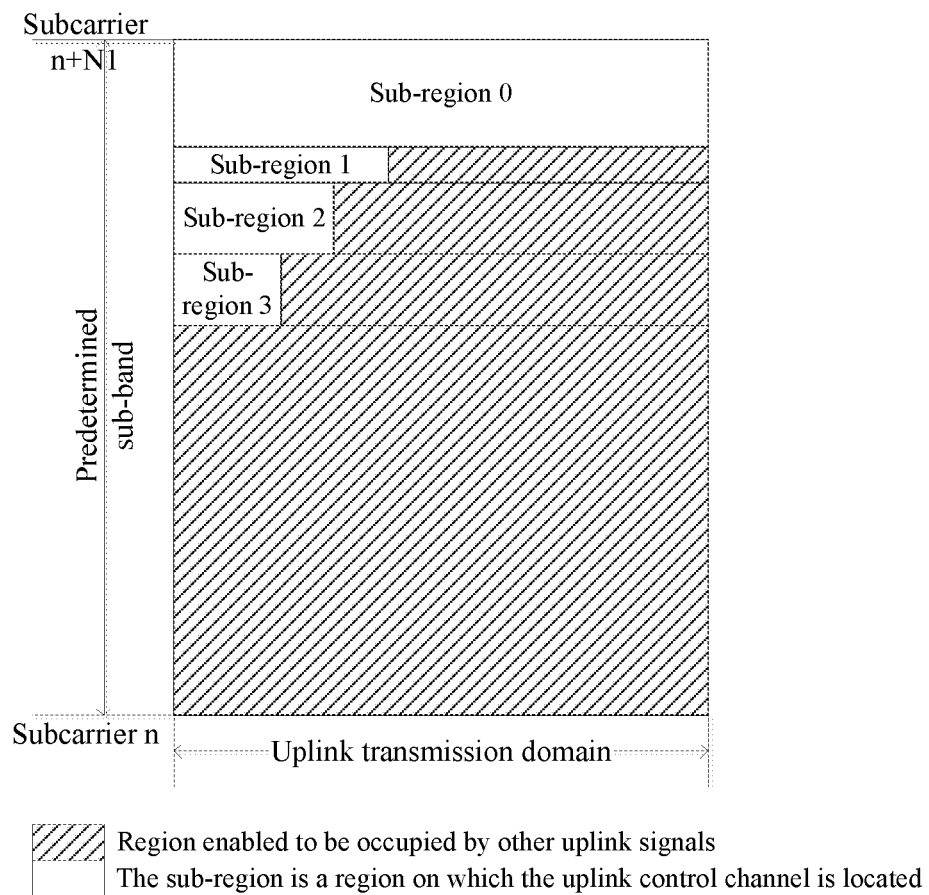
Figure 2F:
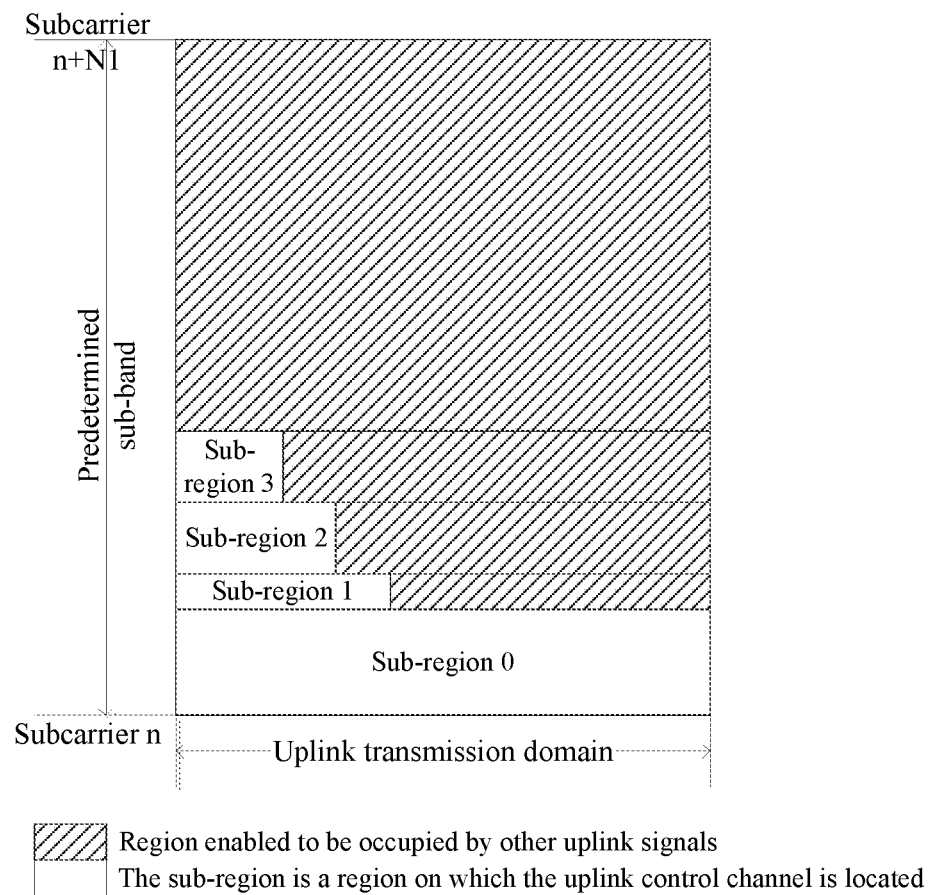
Figure 2G:
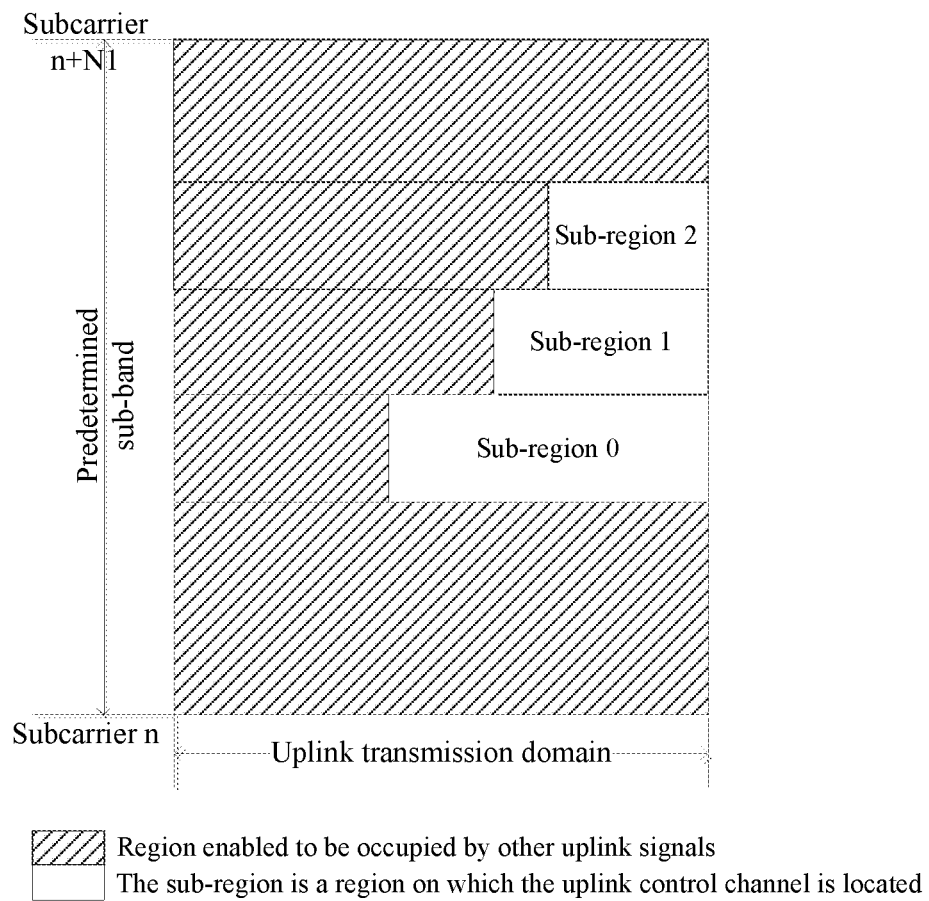

Referring to FIGS. 2a to 2g, FIG. 2a shows that the uplink control channel region is symmetrically located on both sides of the predetermined bandwidth, the uplink control sub-regions are located at the end of the uplink transmission domain, and the sub-regions in the uplink control channel region are arranged in the order of the number of time-domain symbols. FIG. 2b shows that the uplink control channel region is symmetrically located on both sides of the predetermined bandwidth, and the sub-regions of the uplink control channel are located at the beginning positions of the uplink transmission domain. FIG. 2c shows that the sub-regions of the uplink control channel are located on the upper side, and the uplink control sub-regions are located at the end of the uplink transmission domain. FIG. 2d shows that the sub-regions of the uplink control channel are located on the lower side, and the uplink control sub-regions are located at the end of the uplink transmission domain. FIG. 2e shows that the sub-regions of the uplink control channel are on the upper side, and the uplink control sub-regions are located at the beginning of the uplink transmission domain. FIG. 2f shows that the sub-regions of the uplink control channel are located on the lower side, and the uplink control sub-regions are located at the beginning of the uplink transmission domain. FIG. 2g shows that the sub-regions of the uplink control channel are located in the middle.

Figure 2H:
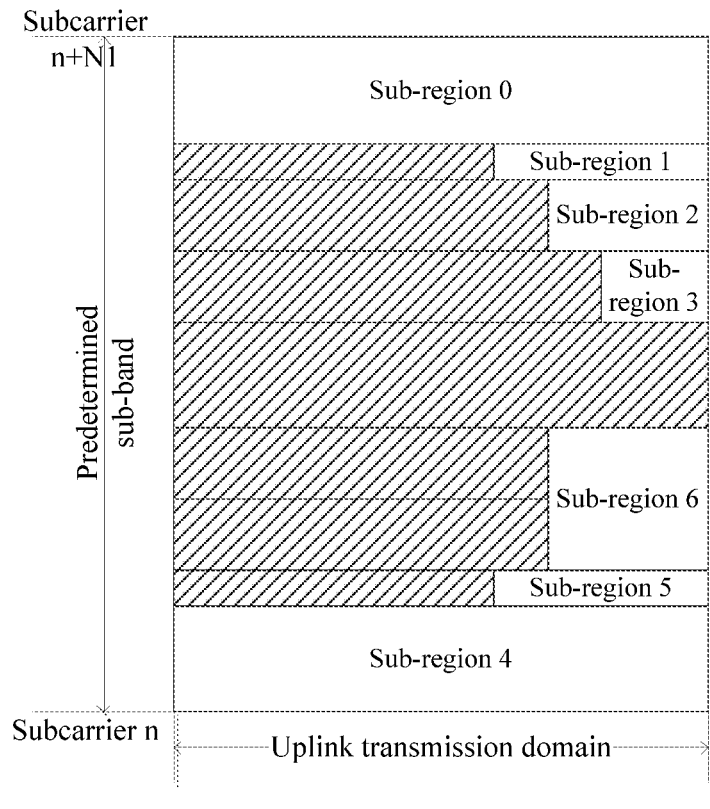

In the preceding FIGS. 2a to 2b, one uplink control channel may symmetrically occupy frequency-domain resources on the upper and lower sides, or one uplink control channel may also occupy only the upper side or the lower side. In an exemplary embodiment, when one control channel occupies two side of the uplink control region, the uplink control channel region may also be asymmetric on the upper and lower sides. As shown in FIG. 2h, on the upper side, the number of time-domain symbols occupied by the uplink control channel region is {14, 7, 2, 1}, and on the lower side, the number of occupied time-domain symbols is {1, 2, 14}. In the embodiment, the number of sub-regions included in the uplink control channel, the number of time-domain symbols in each sub-region, and the frequency-domain resources are merely examples.

In this embodiment, the predetermined system bandwidth may be the system bandwidth allocated to the terminal.

The first notification manner of the uplink control channel region information is to notify the information by a semi-static high-layer signaling. The second notification manner of the uplink control channel region information is to semi-statically notify multiple sets of control channel region information, and then to notify, by using a physical-layer dynamic signaling, which of the multiple sets the uplink control channel region information of the current time unit may be. The physical-layer dynamic signaling may be a dedicated control signaling or a dynamic common control signaling. The third notification manner of the uplink control channel region information is to semi-statically notify the information, and then to notify, by using a dynamic signaling, an uplink control channel region outside the uplink control channel region of the semi-static signaling.

Figure 2I:
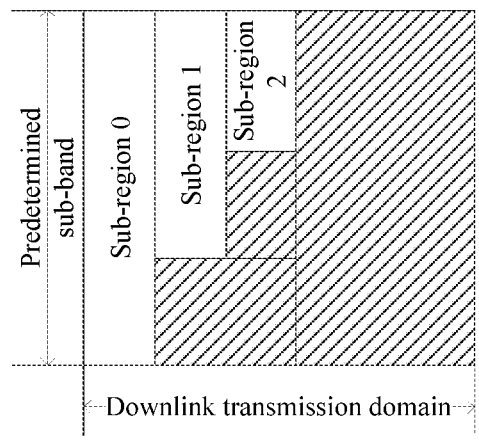
FIG. 2I is a structure diagram of a downlink control channel region according to an embodiment.

The preceding manner may also be used for a downlink control channel. The base station configures downlink control channel region information by a semi-static signaling or a dynamic signaling, so that the terminal may perform a blind detection of control signaling in the control channel region or perform rate matching of a PDSCH region according to the downlink control channel region information. In an exemplary embodiment, the downlink control domain is located in the first few symbols of the downlink transmission domain, and the occupied frequency-domain bandwidth is sequentially decreased from the beginning to the end. As shown in FIG. 2I, in an exemplary embodiment, one downlink control channel may occupy resources in multiple sub-regions while, in the transmission of the uplink control channel, one uplink control channel may occupy resources in only one sub-region.

In the embodiment, the uplink control channel region may be referred to as an uplink control resource set in which one control channel resource may be at least one of the following resources: a time-domain resource, a frequency-domain resource or a code-domain resource. The resource(s) occupied by the control channel in the control channel region may be notified by a dynamic signaling.

When the uplink control channel region information is for resource mapping of the uplink control channel, in an exemplary embodiment, the uplink control channel region information is notified in a high-layer signaling, and the dynamic signaling is used to indicate the resources occupied by the uplink control channel in the uplink control channel region.

Resources occupied by an uplink control channel belong to one region of the uplink control channel. In this case, the uplink control channel and the region occupy the same number of time-domain symbols, or the time-domain symbols of the uplink control channel are a subset of the time-domain symbols occupied by the region. Similarly, the uplink control channel and the region occupy the same frequency-domain resources, or the frequency-domain resources of the uplink control channel are a subset of the frequency-domain resources occupied by the region.

Embodiment Two

In the embodiment, one of the followings is determined according to the type of the uplink control information transmitted on the uplink control channel: the number of time-domain symbols of the uplink control channel, or the number of frequency-domain resources, or the number of uplink control resources (UCCE). One UCCE is the smallest resource element for mapping uplink control information. Different uplink control channel types are distinguished from each other by at least one of the following information: whether the uplink control information is CSI information or ACK/NACK information, or the information length of the uplink control information. The information length of the uplink control information may be a bit length before channel coding of the uplink control information, or may be the number of symbols after modulating the uplink control information. Here, the information length is the number of bits after channel coding, or the number of modulation symbols, or the number of bits before channel coding.

It can be assumed that the minimum resource mapping unit of the uplink control channel is a UCCE (such as one PRB resource on one time-domain symbol or one PRB resource on one OFDM symbol with a reference of 15 kHz subcarrier interval). The base station and the terminal agree: X UCCEs corresponding to one uplink control channel when the uplink control information is ACK/NACK, and Y UCCEs corresponding to one uplink control channel when the uplink control information is CSI (where the CSI information includes information about channel measurement). X and Y are natural numbers. In an exemplary embodiment, X and Y are two different natural numbers, where X and Y may be agreed values.

The number of time-domain symbols or the number of frequency-domain resources of the uplink control channel may be determined according to the information length of the uplink control information. For example, it is agreed that in one UCCE Ln modulation symbols may be transmitted and LN modulation symbols need to be transmitted on one control channel, then the number of UCCEs required by the control channel is [LN/Ln].

It can be agreed that Ln modulation symbols that may be transmitted on one UCCE for the ACK/NACK information are different from Ln modulation symbols that may be transmitted on one UCCE for the CSI information. In an exemplary embodiment, the number Ln corresponding to the ACK/NACK information is less than or equal to the number Ln corresponding to the CSI information.

Figure 3A:
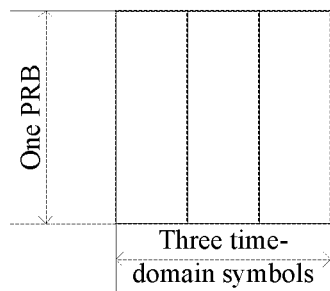
FIG. 3a is a schematic diagram of multiple UCCEs located on different time-domain symbols.
Figure 3B:
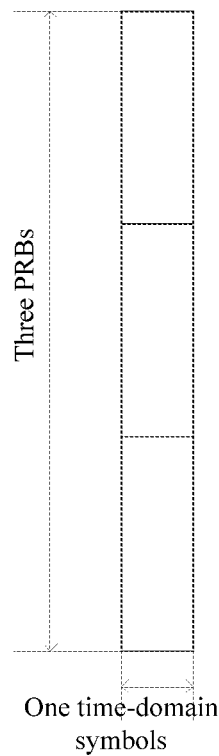
FIG. 3b is a schematic diagram of multiple UCCEs located on different frequency-domain positions of the same time-domain symbol.

In the embodiment, multiple UCCEs may be composed of multiple frequency-domain units located in the same time-domain OFDM symbol. FIG. 3b is an example diagram of three UCCEs in three frequency-domain resources. The multiple UCCEs may also be composed of multiple time-domain symbols located in the same frequency-domain resource. FIG. 3a is an example diagram of three UCCEs in three time-domain symbols. The multiple UCCEs required by the control channel may also be obtained according to other rules, such as a frequency hopping rule.

In the embodiment, the number of time-domain symbols or the number of frequency-domain resources of the uplink control channel may be determined according to a capability level. For example, the greater the level of the maximum power corresponding to the terminal is, the smaller the number of time-domain symbols is, or the greater the level of the maximum power corresponding to the terminal is, the smaller the number of frequency-domain resources is. The greater the power level is, the greater the maximum power is.

In the embodiment, the number of time-domain symbols or the number of frequency-domain resources of the uplink control channel may be determined according to a channel quality level. The better the channel quality is, the smaller the number of corresponding time-domain symbols is, or the better the channel quality is, the smaller the number of corresponding frequency-domain resources is.

The first obtaining manner of the channel quality is to obtain the channel quality according to path loss information. For example, the corresponding path loss information is obtained according to the downlink measurement reference signal, and the downlink channel quality is obtained according to the path loss information. The smaller the path loss is, the better the channel quality is. And then, the smaller the number of time-domain symbols corresponding to the uplink control channel is, or the smaller the number of frequency-domain resources corresponding to the uplink control channel is, or the smaller the number of time-domain symbols corresponding to the uplink control channel and the smaller the number of frequency-domain resources are.

The second obtaining manner of the channel quality is to obtain the channel quality according to a channel quality indicator (CQI) of the downlink channel fed back by the terminal to the base station. The better the CQI quality is, the better the corresponding channel quality is. And then, the smaller the number of time-domain symbols corresponding to the uplink control channel is, or the smaller the number of frequency-domain resources corresponding to the uplink control channel is, or the smaller the number of time-domain symbols corresponding to the uplink control channel and the smaller the number of frequency-domain resources are.

The third obtaining manner of the channel quality is to obtain the channel quality according to the channel coding rate of the second downlink control information corresponding to the downlink data corresponding to the second uplink control information. For example, the second uplink control information is ACK/NACK information and corresponds to an acknowledgment response of a physical downlink shared channel (PDSCH) of a downlink data channel, and the PDSCH has corresponding DCI information (second downlink control information). The lower the channel coding rate of the Downlink Control Information (DCI) is, the worse the channel quality is, and then the greater the number of time-domain symbols corresponding to the uplink control channel is or the greater the number of frequency-domain resources corresponding to the uplink control channel is or the greater the number of time-domain symbols corresponding to the uplink control channel and the greater the number of the frequency-domain resources are. Alternatively, the channel quality is determined according to a Modulation and Coding Scheme (MCS) of the allocated PDSCH.

The fourth obtaining manner of the channel quality is to send the channel quality by the base station to the terminal. For example, the base station obtains the uplink channel quality by measuring the uplink measurement reference signal and feeds the uplink channel quality back to the terminal.

Embodiment Three

In the embodiment, the uplink control channel and the uplink data channel may be transmitted by MU-MIMO, so that frequency-domain fragments caused by the uplink control channel with a short duration may be effectively used.

A demodulation reference signal of the uplink data channel and a demodulation reference signal of the uplink control channel may be located on the same time-domain symbol set, or a time-domain symbol position of the demodulation reference signal of the uplink data channel is located in a time-domain symbol set occupied by the uplink control channel, or a port set of the demodulation reference signal of the uplink data channel intersects a port set of the demodulation reference signal of the uplink control channel, or the uplink data information is not transmitted on the time-frequency resources occupied by the demodulation reference signal of the uplink control channel. Therefore, the transmission in the MU-MIMO mode may use the fragments effectively between the uplink control channel and the uplink data channel.

Figure 4A:
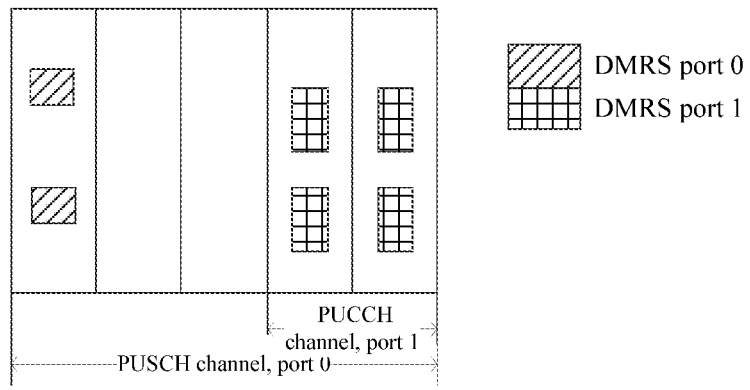
FIG. 4a is schematic diagram one of a demodulation reference signal port of a PUCCH and a demodulation reference signal port of a PUSCH that are orthogonal to each other.
Figure 4B:
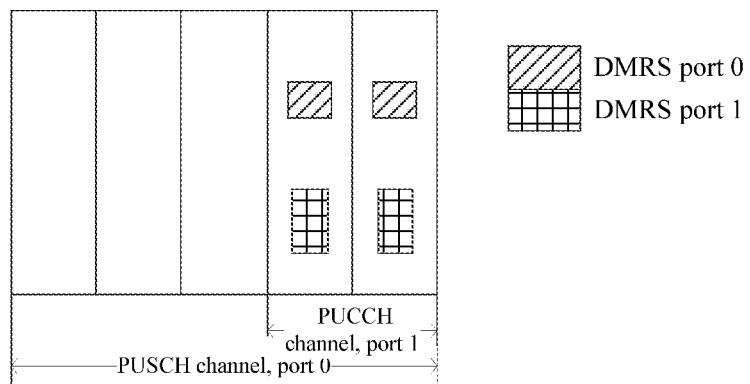
FIG. 4b is schematic diagram two of a demodulation reference signal port of a PUCCH and a demodulation reference signal port of a PUSCH that are orthogonal to each other.
Figure 4C:
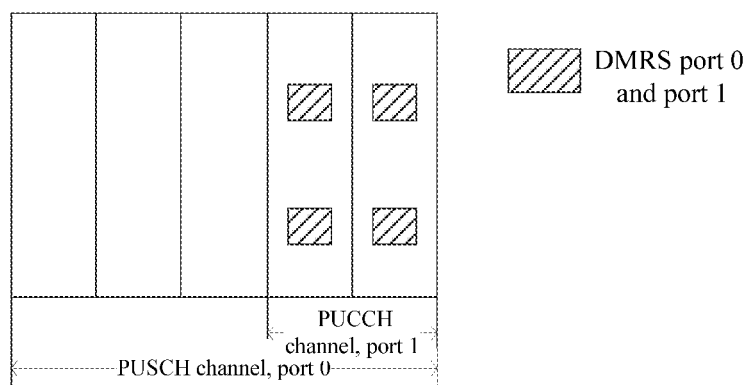
FIG. 4c is schematic diagram three of a demodulation reference signal port of a PUCCH and a demodulation reference signal port of a PUSCH that are orthogonal to each other.
Figure 4D:
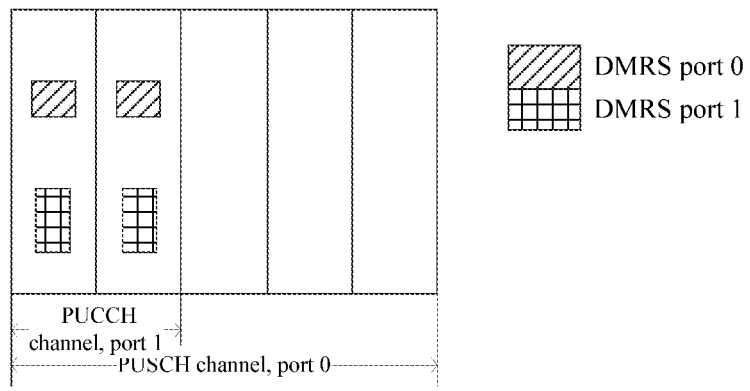
FIG. 4d is schematic diagram four of a demodulation reference signal port of a PUCCH and a demodulation reference signal port of a PUSCH that are orthogonal to each other.
Figure 4E:
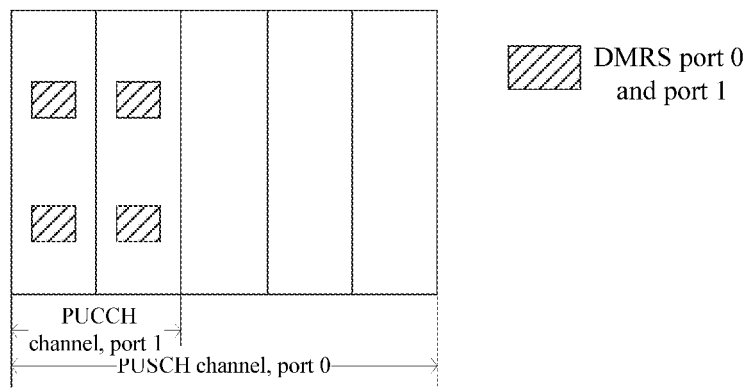
FIG. 4e is schematic diagram five of a demodulation reference signal port of a PUCCH and a demodulation reference signal port of a PUSCH that are orthogonal to each other.

As shown in FIGS. 4a to 4e, the DMRS ports of the above uplink control channel (physical uplink control channel (PUCCH)) and the uplink data channel (physical uplink shared channel (PUSCH)) are orthogonal. In FIG. 4a, the PUSCH cannot be used to send signals on time-frequency resources occupied by a port 1 but can be used to send signals on PUCCH-occupied resources excluding the demodulation reference signal (i.e., port 1 in the figure). In FIG. 4b, the PUCCH cannot be used to transmit information on resources occupied by the port 1, and the PUSCH cannot be used to transmit information on resources occupied by the port 0. In an exemplary embodiment, the port 0 and the port 1 may be orthogonal through OCC, as shown in FIG. 4c, so that the PUSCH and the PUCCH occupy the same time-frequency resources. In particular, in response to determining that the PUCCH and the PUSCH are sent through beams, the related interference between the two is small. Alternatively, as shown in FIG. 4d to FIG. 4e, the uplink control channel is located on several OFDM symbols in the front of the PUSCH. In FIGS. 4a to 4e, resources occupied by DMRS ports are only exemplary and other cases are not excluded, as long as it is ensured that the port of the PUCCH and the port of the PUSCH are orthogonal or pseudo-orthogonal. The PUSCH is not used to send signals on time-frequency resources occupied by the demodulation reference signal of the PUCCH. The demodulation reference signal of the PUCCH may be a time-frequency resource occupied by a demodulation reference signal of one PUCCH channel or may be demodulation reference signal resources corresponding to all PUCCH channels.

Figure 4F:
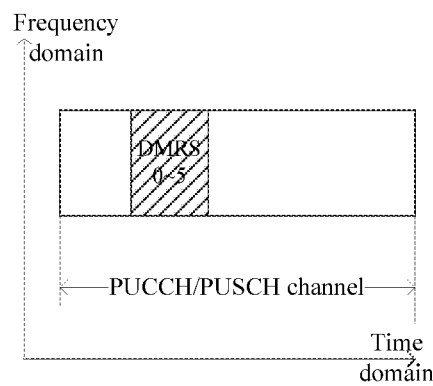
FIG. 4f is a schematic diagram of time-frequency resources occupied by a PUCCH and a PUSCH.

Alternatively, as shown in FIG. 4f, the PUCCH and the PUSCH may occupy the same time-frequency resource. For example, one PRB can be multiplexed for six users by code division multiplexing of DMRS. Moreover, there is one PUCCH user on this PRB according to an implicit or explicit notification. In this case, since ports of the PUCCH and PUSCH are orthogonal, one or more of the remaining five ports that are not utilized can be allocated to one PUSCH user. The resources occupied by the DMRS in FIG. 4f are only exemplary. Other occupation manners are not excluded as long as ports of the PUCCH and PUSCH may be orthogonal.

In an exemplary embodiment, the uplink control channel and the uplink data channel belong to different terminals. Alternatively, the uplink control channel and the uplink data channel belong to the same terminal, however, the terminal uses different beams for sending the uplink control channel and the uplink data channel, thereby reducing interference between each other.

Embodiment Four

In this embodiment, the resource information of the PUCCH is obtained according to the frequency-domain resource information of the PDSCH and the demodulation reference information corresponding to the PDSCH.

If the ACK/NACK information corresponding to the PDSCH is transmitted on the PUCCH, the frequency-domain resource information corresponding to the PUCCH in the uplink transmission domain is obtained according to a maximum PRB index or a minimum PRB index of the frequency-domain resource occupied by the PDSCH.

Figure 5A:
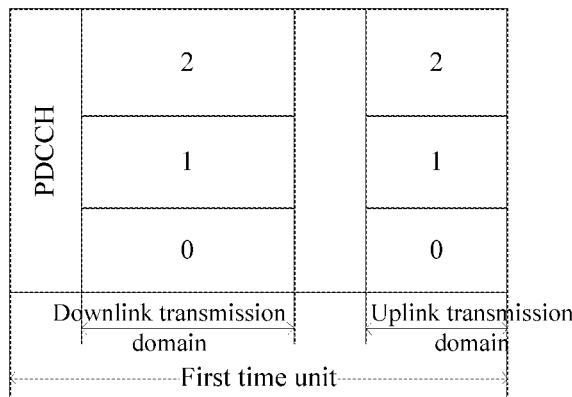
FIG. 5a is schematic diagram one of a mapping relationship between downlink physical channel resources and uplink control channel resources.

Alternatively, as shown in FIG. 5a, the PUCCH corresponding to the downlink PRB0~2 (downlink PRB, hereinafter referred to as DPRB) is on the PRB0~2 of the uplink transmission domain (uplink PRB, hereinafter referred to as UPRB). Due to MU-MIMO transmission, DPRB0 may be occupied by multiple users. In this case, the PUCCHs of multiple users may be mapped to UPRB0. The first manner of distinguishing multiple PUCCH channels in the same UPRB0 from each other is to obtain the code-domain resource of the PUCCH in UPRB0 through the port of the demodulation reference signal corresponding to the PDSCH. In an exemplary embodiment, a one-to-one correspondence exists between ports of the demodulation reference signals of the PDSCHs and the code-domain resources of the UPRB0. Alternatively, a many-to-one correspondence exists between ports of the demodulation reference signals of the PDSCHs and the code-domain resources of the UPRB0, and in this case, the PUCCHs corresponding to the same code-domain resource can only be scheduled in time division. Since the time-domain resource of the PUCCH can be indicated by the base station, this conflict may be resolved by means of base station scheduling. Alternatively, a one-to-many correspondence exists between ports of the demodulation reference signals of the PDSCHs and the code-domain resources of the UPRB0, and in this case, one PUCCH channel can be transmitted on multiple code-domain resources. For example, one PUCCH channel can be transmitted through different antennas by using different code-domain resources.

It is insufficient to depend on only the port of the demodulation reference signal of the PDSCH in the preceding implementation. The sequences corresponding to the same port of the demodulation reference signal are different, such as a port 7 in LTE which corresponds to nscid=0 and nscid=1. In an exemplary embodiment, in this case, the regions of the demodulation reference signal port information need to be distinguished by both a port index and a sequence index. In this way, multiple PUCCHs on UPRB0 corresponding to multiple PDSCHs scheduled on multiple DPRB0s can be distinguished from each other. For example, a correspondence is established between ports of the demodulation reference signals, the sequences used by the ports and the code-domain resources of the UPRB0. Alternatively, for example, there are DN orthogonal ports used for MU-MIMO, each orthogonal port corresponds to DM sequences, and multiple sequences corresponding to the same port are pseudo-orthogonal. In this case, it is needed to establish DN*DM correspondences between the demodulation reference signal port resources of the PDSCHs and the code-domain resources of the uplink control channel resources on the UPRB0.

Figure 5B:
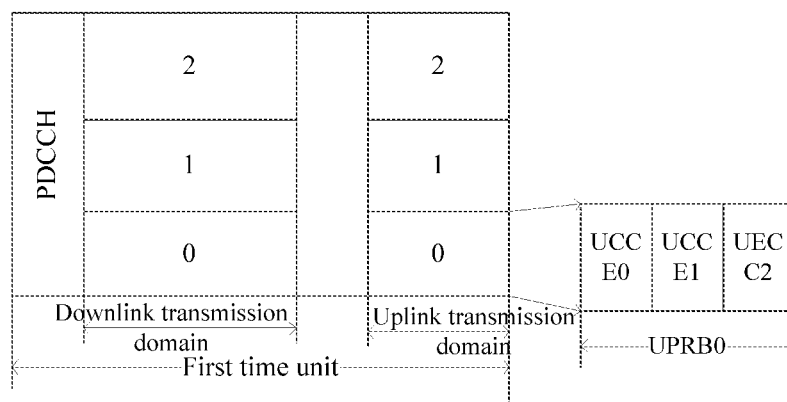
FIG. 5b is an example diagram of one uplink PRB including multiple uplink control channel resource groups.

In the above embodiment, the multiple PUCCHs in one UPRB0 are distinguished from each other only by means of code division multiplexing. In the embodiment, it does not exclude that multiple PUCCHs in one UPRB0 are distinguished from each other by time-frequency resources. That is, one uplink PRB resource includes multiple time-frequency resource groups, and each resource group is a minimum resource element mapped to one PUCCH. In this way, multiple PUCCH resources mapped to the same uplink PRB resource may be distinguished from each other by different resource groups. As shown in FIG. 5b, one UPRB0 has multiple UCCE resources. One UCCE is the minimum element mapped to one PUCCH, i.e., is the time-frequency resource group. In some embodiments, other equivalent names are not excluded. The division of the time-domain resources of the multiple UCCEs in the same uplink resource in FIG. 5b is only an example, and other division manners are not excluded.

Figure 5C:
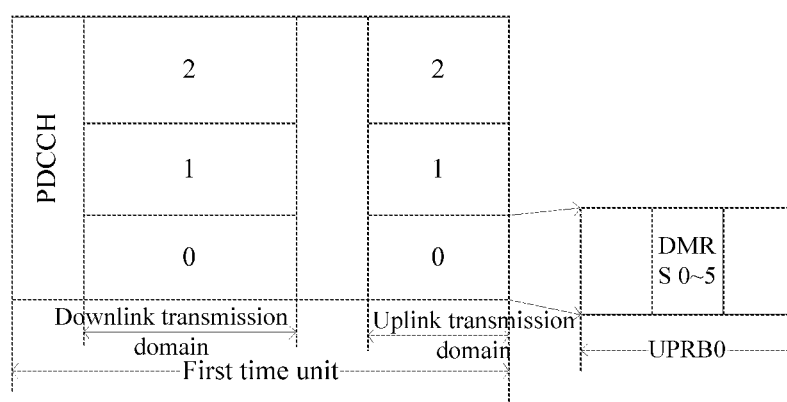
FIG. 5c is an example diagram of one uplink PRB including multiple orthogonal or non-orthogonal demodulation reference signal ports.

In the preceding implementation, multiple PUCCH resources mapped into the same uplink PRB are distinguished from each other by code division or time-frequency resources. In this implementation, multiple PUCCH resources in the same uplink PRB are distinguished from each other by different demodulation reference signal resources of the PUCCHs. As shown in FIG. 5c, multiple PUCCHs mapped to one UPRB0 are sent on different PUCCH demodulation reference signal ports. As long as it is ensured that these PUCCH demodulation reference channels are orthogonal, multiple PUCCHs may occupy the same time-frequency resources. In this case, it is assumed that the interference between multiple PUCCHs is relatively small, and it is also reasonable in a beam transmission scenario.

Figure 5D:
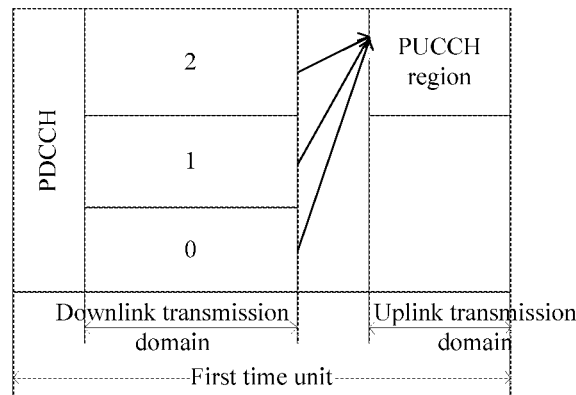
FIG. 5d is schematic diagram two of a mapping relationship between downlink physical channel resources and uplink control channel resources.

In the above implementations, first the frequency-domain resource corresponding to the PUCCH is obtained according to the frequency-domain resource information corresponding to the PDSCH, and then at least one of the time-frequency resource index, the code-domain resource or the demodulation reference signal resource of the PUCCH in the corresponding PRB resource is obtained according to the demodulation reference signal resource information corresponding to the PDSCH. In another implementation of the embodiment, one piece of logical PUCCH resource information is obtained by using the frequency-domain resource corresponding to the PDSCH and the demodulation reference signal resource information corresponding to the PDSCH, and then information about the PUCCH is obtained according to the logical resource information. Different logical PUCCH resources are distinguished by one or more of frequency-domain resources, time-frequency resource groups in the frequency-domain resources, code-domain resources, and demodulation reference signal port resources. As shown in FIG. 5d, multiple logical PUCCHs are arranged into the uplink control channel region.

Figure 5E:
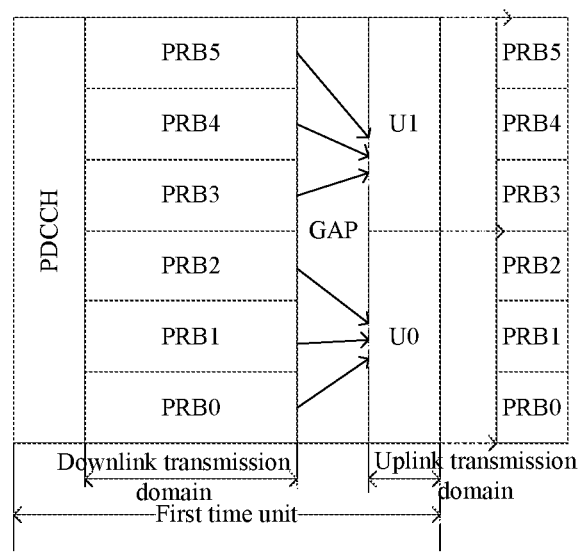
FIG. 5e is schematic diagram three of a mapping relationship between downlink physical channel resources and uplink control channel resources.

In the embodiment, when one PUCCH corresponds to multiple PRB resources, multiple DPRBs are needed to be mapped into the same group of UPRBs. As shown in FIG. 5e, DPRB0~DPRB2 correspond to the uplink control channel resource U0, DPRB3~DPRB5 correspond to the uplink control channel resource U1. Alternatively, the mapping relation between the PRB indexes and the UPRB is $$UPRBi = \left\lfloor \frac{DPRBi}{L} \right\rfloor,$$

in which a starting resource index (or an ending resource index) of the UPRB are obtained first and then other frequency-domain resources occupied by the PUCCH are determined according to the number of frequency-domain resources occupied by the UPRBs.

Figure 5F:
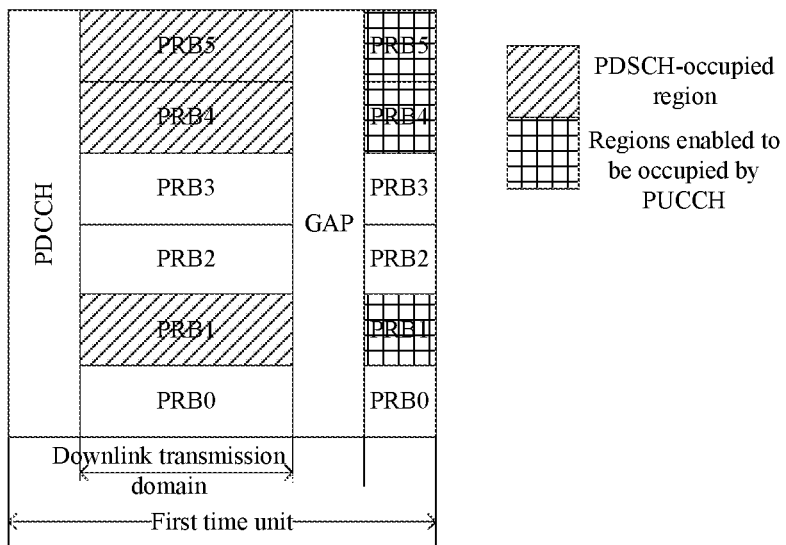
FIG. 5f is schematic diagram four of a mapping relationship between downlink physical channel resources and uplink control channel resources.

When one PUCCH occupies multiple PRB resources, one implementation is to obtain the starting resource index as described above, and then obtain multiple PRBs having consecutive starting indexes as frequency-domain resources occupied by the PUCCH. In another implementation, multiple UPRBs occupied by the PUCCH are preferentially selected from UPRBs corresponding to multiple PRBs occupied by the PDSCH. For example, the selected UPRBs are multiple ones having the minimum index in the corresponding UPRBs. When the number of the corresponding UPRBs is less than the number of UPRBs occupied by the PUCCH, the remaining PRBs are searched for in sequence starting from the maximum value of the corresponding UPRBs. Using FIG. 5f as an example, the PUCCH of the ACK/NACK corresponding to the PDSCH is preferentially in the {PRB0, PRB4, PRB5} of the uplink transmission domain. The PUCCH is sent in {PRB0, PRB4} when the PUCCH requires two PRBs. The PUCCH is sent in {PRB0, PRB4, PRB5} when the PUCCH requires three PRBs. The PUCCH is sent in {PRB0, PRB4, PRB5, PRB6~8} when the PUCCH requires six PRBs. The DMRS demodulation reference signal may also determine an offset. As shown in FIG. 5a, UPRB0 is obtained according to a starting DPRB0 occupied by the PDSCH, and then the offset is obtained according to a minimum demodulation reference signal port (or a maximum demodulation reference signal port) used by the PDSCH. For example, if the obtained offset is 1, the starting PRB used by the PUCCH is UPRB1.

The DPRB is a PRB of the downlink transmission domain, and the UPRB is a PRB of the uplink transmission domain.

Whether the frequency-domain offset determined by the DMRS port or the logical PRB index in the corresponding UPRB may be indicated by signaling.

Similarly, a downlink ACK/NACK has the corresponding uplink PUSCH. In this case, the downlink control channel resource corresponding to the downlink ACK/NACK may be obtained by using the frequency-domain resource corresponding to the PUSCH and the demodulation reference signal port information corresponding to the PUSCH.

Embodiment Five

In the embodiment, if the PUCCH is the ACK/NACK information of the PDSCH, the mapping of the PUCCH resources may be obtained by using index information corresponding to DCI information (that is, the first control information) corresponding to the PDSCH and demodulation reference signal port information corresponding to the DCI information.

The first manner is to use the lowest frequency-domain index corresponding to the DCI. For example, in response to determining that the PRB is the minimum resource element of DCI mapping, first the frequency-domain resource index corresponding to the PUCCH in the uplink transmission domain is obtained according to the lowest (or highest) PRB index corresponding to the DCI, and then at least one of a time-frequency resource index, a code-domain resource or a demodulation reference signal resource of the PUCCH in the corresponding PRB resource is obtained according to the demodulation reference signal information corresponding to the DCI.

The second manner is to use the CCE index corresponding to the DCI. CCE is the smallest mapping element of DCI information mapping, and CCE may be a logical index. An uplink PRB resource where the PUCCH is located is obtained according to the CCE index. Then at least one of a time-frequency resource index, a code-domain resource or a demodulation reference signal resource of the PUCCH in the corresponding PRB resource is obtained according to the demodulation reference signal information corresponding to the DCI.

In the preceding implementations, the frequency-domain resource corresponding to the PUCCH is obtained first according to the index information corresponding to the DCI, and then the time-frequency resource index, the code-domain resource and the demodulation reference signal resource of the PUCCH in the corresponding PRB resource is obtained according to the demodulation reference signal resource information corresponding to the DCI. In another implementation of this embodiment, one piece of logical PUCCH resource information is obtained by using the index information corresponding to the DCI and the demodulation reference signal resource information corresponding to the DCI, and then information about the PUCCH is obtained according to the logical resource information. Different logical PUCCH resources are distinguished by one or more of frequency-domain resources, time-frequency resource groups in the frequency-domain resources, code-domain resources, and demodulation reference signal port resources.

Figure 6:
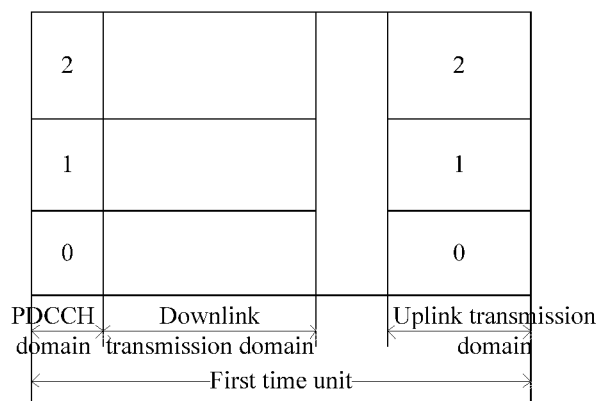
FIG. 6 is a schematic diagram of a mapping relationship between downlink control channel resources and uplink control channel resources.

Referring to FIG. 6, for example, in one time unit (such as one slot), there are NC PRB resources or NC CCEs, each CCE corresponds to NCM demodulation reference signal resources, and a mapping relation between NC×NCM downlink resources and PUCCH logical resources needs to be established. This mapping may be a one-to-one correspondence. Alternatively, this mapping may be a one-to-many correspondence, and in this case, one downlink resource can be transmitted in multiple uplink transmission resources, such as a manner of transmission diversity. Alternatively, this mapping may be a many-to-one relationship, and in this case, the PUCCHs corresponding to multiple downlink resources are mapped to the same one logical PUCCH resource; and if a conflict occurs, the conflict may be avoided by means of base station resource scheduling, for example, a time division is performed for the multiple conflicting PUCCH resources.

Embodiment Six

For the embodiment four, aperiodically triggered CSI reporting does not have a corresponding PDSCH signal, which causes that the mapping relation in the embodiment four cannot be applied to the mapping of the PUCCH resources of the CSI that is aperiodically triggered.

The first implementation is to semi-statically configure the PUCCH resource corresponding to the aperiodically triggered CSI. In an exemplary embodiment, the aperiodic CSI reporting and the periodic CSI reporting share the PUCCH resource. If aperiodic reporting and periodic reporting on the same time unit conflict with each other, the aperiodic CSI is preferentially reported. If the PUCCH corresponding to the CSI and the PUCCH corresponding to the ACK/NACK conflict with each other, that is, when the ACK/NACK and the CSI need to be reported on the same PUCCH, one manner is to report the ACK/NACK and the CSI on the PUCCH resource simultaneously and another manner is to report the ACK/NACK preferentially.

The second implementation is that the PUCCH of the CSI obtains PUCCH resource information according to a DCI index corresponding to a trigger signaling corresponding to the CSI, and this implementation is similar to the embodiment five. However, when the ACK/NACK uses the method shown in the embodiment four, the conflict problem in which the ACK/NACK and CSI information occupy the same PUCCH resource also occurs. The base station may perform time division for the ACK/NACK and CSI information by scheduling, or the ACK/NACK may be sent preferentially and the CSI is discarded.

The third implementation is to notify the PUCCH resource in the aperiodic CSI. In this case, the base station knows which PUCCHs are not occupied by other users and allocates the resources to the aperiodic CSI for reporting, which is similar to the allocation of the PUSCH resources for the aperiodic PUCCH reporting.

The manner of using priority when conflict occurs is applicable to the case where ACK/NACK and CSI of the same user conflict with each other. The manner of base station scheduling is applicable to the case where ACK/NACK and CSI belong to different users. For example, if ACK/NACK is reported by a user 1 and CSI is reported by a user 2, the conflict can be solved only by the base station scheduling.

When the base station needs to feed back the CSI information to the terminal, the similar manner can also be used for a downlink control channel for CSI information feedback or used for a downlink PDSCH channel for CSI feedback.

Embodiment Seven

In the embodiment, the terminal first acquires a time-domain symbol ending position and a frequency-domain starting position corresponding to the PUCCH, as well as information about the number UCCEN of uplink control channel resources. The uplink control channel resource UCCE is the minimum resource element used by an uplink control channel.

In the embodiment, the demodulation reference signal information of the downlink control channel (or the downlink data channel) is determined according to the sending manner information fed back by the terminal. The sending manner is information about the relevant downlink transmitting beam. Different sending manners are distinguished from each other by at least one of the following information: a transmitting beam, port information of a measurement reference signal, a time-domain resource where the measurement reference signal is located, a frequency-domain resource where the measurement reference signal is located, or a sequence resource used by the measurement reference signal. For example, the sending manners are logically numbered by at least one of the preceding information. In the embodiment, the sending manner may also be determined by establishing a quasi-co-location (QCL) relationship between different reference signals. For example, it is indicated that the sending manner used by the terminal is determined according to a measurement reference signal port, which is to establish a quasi-co-location relationship between a demodulation reference signal of the control channel and the measurement reference signal. The measurement reference signal may be a downlink measurement reference signal, and in this case, reciprocity is used to obtain transmitting beams of the control channel. Alternatively, the measurement reference signal may also be an uplink measurement reference signal, and in this case, the transmit beams of the control channel and transmit beams of the uplink measurement reference signal are the same.

Figure 7A:
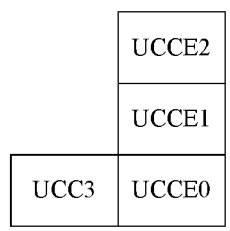
FIG. 7a is schematic diagram one of an uplink control channel first mapped in a frequency domain and then mapped in a time domain.
Figure 7B:
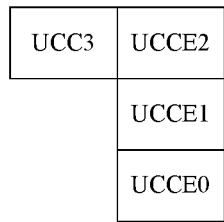
FIG. 7b is schematic diagram two of an uplink control channel first mapped in a frequency domain and then mapped in a time domain.
Figure 7C:
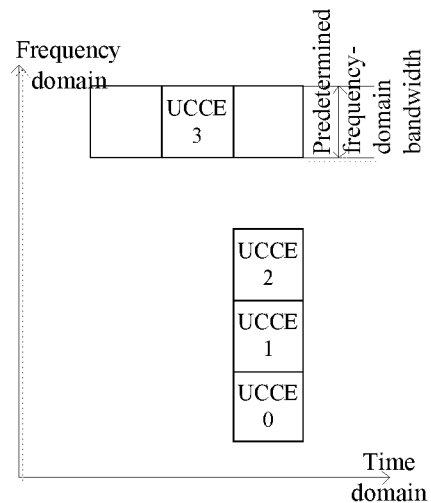
FIG. 7c is schematic diagram three of an uplink control channel first mapped in a frequency domain and then mapped in a time domain.
Figure 7D:
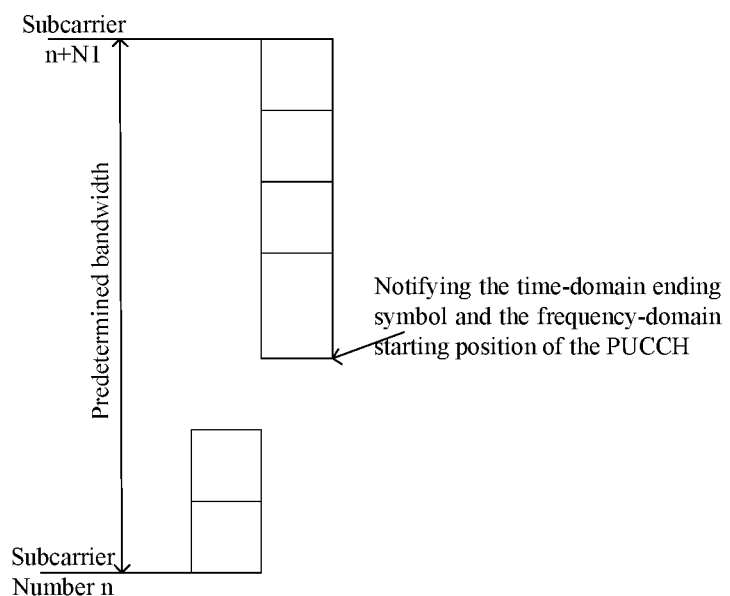
FIG. 7d is schematic diagram four of an uplink control channel first mapped in a frequency domain and then mapped in a time domain.

The first acquisition manner of the resources corresponding to the PUCCH is that: the number UCCE-OFDM-N of UCCEs occupied by the PUCCH in each time-domain symbol is specified, and when UCCEN is greater than UCCE-OFDM-N, the remaining UCCEs occupy resources at the front symbol. That is, the number of time-domain symbols occupied in this case is [UCCEN/UCCE-OFDM-N]. FIG. 7a shows an example of resources occupied by the PUCCH when UCCEN=4 and UCCE-OFDM-N=3. In FIG. 7a, the frequency-domain position of UCCE3 at the front symbol is the same as the frequency-domain starting position at the ending symbol. In FIG. 7b, the frequency-domain position of UCCE3 at the front symbol is the same as the frequency-domain ending position at the rear symbol. In the embodiment, it is not excluded that UCCE3 occupies the same position as the maximum frequency-domain position at the ending symbol, as shown in FIG. 7c. Alternatively, the frequency-domain position of UCCE3 in the front symbol is mapped according to a certain frequency hopping principle which such as a difference between the frequency-domain positions of UCCE3 and UCCE2 is agreed frequency-domain resources. Alternatively, UCCE3 is mapped into the agreed frequency-domain bandwidth, and the agreed frequency-domain bandwidth is notified by semi-static signaling.

The second acquisition manner of the resources corresponding to the PUCCH is to first perform frequency-domain resource mapping on the ending symbol, and then perform the mapping from the bottom of the predetermined bandwidth of the front symbol in response to mapping to the top of the predetermined system bandwidth of the ending symbol.

In the preceding implementations, the frequency-domain starting position and the time-domain ending position of the PUCCH are notified by signaling, or the time-domain ending position is the ending position of the uplink transmission domain by default.

A first manner for notifying the number UCCEN of UCCEs occupied by one PUCCH is to notify by a dynamic signaling. Another manner for notifying the number UCCEN is to first notify semi-statically a number set, for example, {1, 4, 8, 16}, to which UCCEN belongs, and then, to notify the index information of the number in the number set by the dynamic signaling. For example, if the notified index is 1, the corresponding UCCEN is 4. Another manner of obtaining the number of UCCEs that one PUCCH may occupy is an obtaining manner similar to that in the embodiment two, that is, the number of UCCEs corresponding to one PUCCH is determined according to the type of the second control information transmitted on the control channel.

In the embodiment, one UCCE may be composed of one time-domain symbol, and one or more PRB resources occupied by the frequency domain. Alternatively, for one UCCE, the frequency domain is formed by frequency-domain groups in one PRB.

In the embodiment, the notification manner is to notify the ending time-domain symbol position and the starting frequency-domain position. In another implementation of the embodiment, it is to notify at least one of the starting time-domain symbol position or the starting frequency-domain position, however, when the current multiple UCCEs cannot be carried on the notified symbol, the UCCEs are placed on the subsequent symbol(s).

Embodiment Eight

In the embodiment, the base station determines the demodulation reference signal according to the CSI information fed back by the first communication node (for example, the terminal) and sends a signal to the first communication node by using the determined demodulation reference signal. The sent signal satisfies one or more of the following features: the sent signal is a data signal and the demodulation reference signal is a demodulation reference signal of the data channel; the sent signal is a control signal and the demodulation reference signal is a demodulation reference signal of the control channel. The CSI information fed back by the first communication node (for example, the terminal) includes transmission resources corresponding to the first communication node. The transmission resources include one or more of the following resources: transmitting beam resources, transmission port resources, transmission precoding matrix resources, transmission time resources, transmission frequency-domain resources and transmission sequence resources. The base station and the terminal agree on a correspondence between the transmission resources and the demodulation reference signal ports. The correspondence satisfies one or more of the following features: a one-to-one correspondence existing between the transmission resources and the demodulation reference ports, a one-to-one correspondence existing between the transmission resources and the demodulation reference port sets, and multiple transmission resources corresponding to the same demodulation reference port.

The CSI information fed back by the first communication node may further include channel rank indication (RI), and a correspondence existing between the number of demodulation reference signal ports and the RI.

In the embodiment, the demodulation reference signal information of the downlink control channel (or the downlink data channel) is determined according to the sending manner information fed back by the terminal. The sending manner is information about the relevant downlink transmitting beam. Different sending manners are distinguished from each other by at least one of the following information: a transmitting beam, port information of a measurement reference signal, a time-domain resource where the measurement reference signal is located, a frequency-domain resource where the measurement reference signal is located, or a sequence resource used by the measurement reference signal. For example, the sending manners are logically numbered by at least one of the preceding information. In the embodiment, the sending manner may also be determined by establishing a quasi-co-location (QCL) relationship between different reference signals. For example, it is indicated that the sending manner used by the terminal is determined according to a measurement reference signal port, which is to establish a quasi-co-location relationship between a demodulation reference signal of the control channel and the measurement reference signal. The measurement reference signal may be a downlink measurement reference signal, and in this case, reciprocity is used to obtain transmitting beams of the control channel. Alternatively, the measurement reference signal may also be an uplink measurement reference signal, and in this case, the transmit beams of the control channel and transmit beams of the uplink measurement reference signal.

Embodiment Nine

In the embodiment, when the number of time-domain symbols occupied by the PUCCH is more than one, the demodulation reference signal of the PUCCH satisfies the following feature: the multiple time-domain symbols are divided into multiple time-domain units, each time-domain unit carries the demodulation reference signal for demodulating this time-domain unit, and demodulation reference signals of different time-domain units cannot be interpolated with each other.

For example, the number of time-domain symbols occupied by the PUCCH is X9, where X9 is a natural number larger than 1, then the X9 time-domain symbol numbers are divided into Y9 time-domain sub-units, and each time-domain sub-unit includes [X9/Y9] time-domain symbols at most, where Y9 is a natural number less than or equal to X9.

Figure 8A:
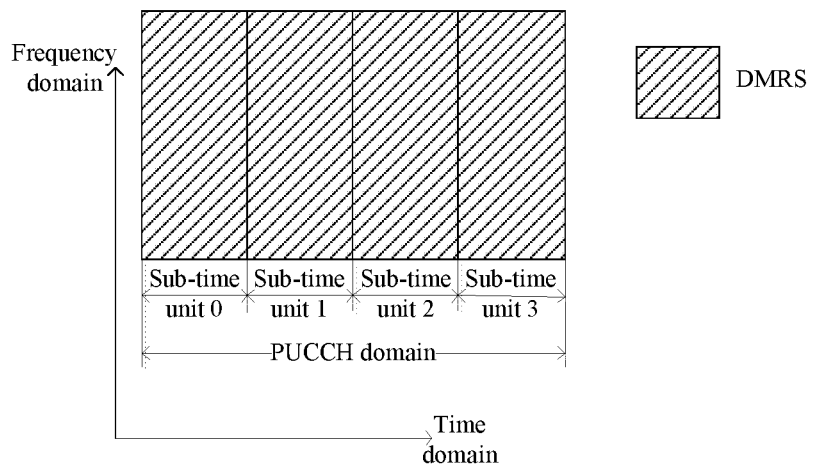
FIG. 8a is schematic diagram one of multiple time-domain symbols divided into multiple subunits each of which has a demodulation reference signal.
Figure 8B:
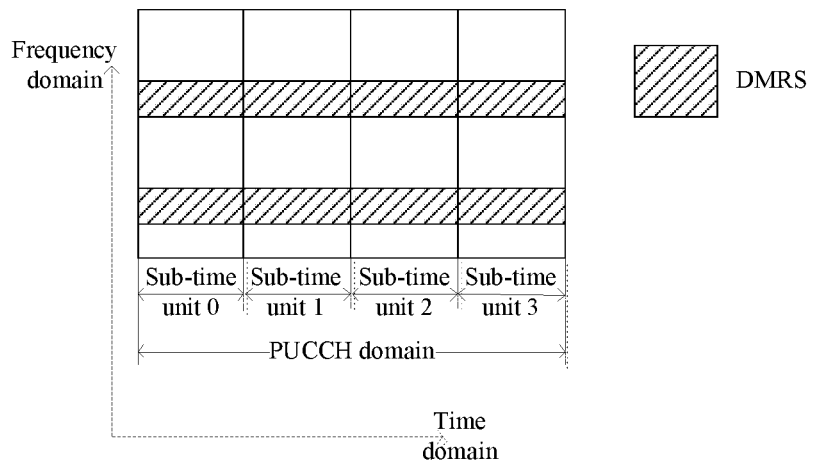
FIG. 8b is schematic diagram two of multiple time-domain symbols divided into multiple subunits each of which has a demodulation reference signal.

Alternatively, as shown in FIGS. 8a-8b, the PUCCH occupies four OFDM symbols, each symbol is a time sub-unit, and there is a demodulation reference signal on each OFDM symbol. The demodulation reference signal on each symbol may be used for demodulation of the second control information of the current unit and not used for demodulation of the second control information on other symbols. This allows the first communication node to send the second control information on different symbols by using different sending manners (for example, transmitting beams). Transmission diversity or repeated transmission may be used also. Complete second control information can be transmitted via the signal on each time-sub-unit. The patterns occupied by the demodulation reference signals shown in FIGS. 8a-8b are merely examples, and other patterns are not excluded in the embodiment.

Figure 8C:
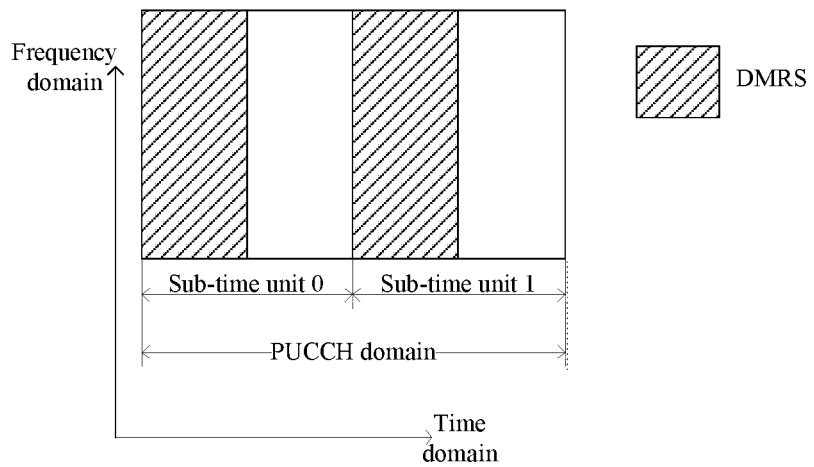
FIG. 8c is schematic diagram three of multiple time-domain symbols divided into multiple subunits each of which has a demodulation reference signal.
Figure 8D:
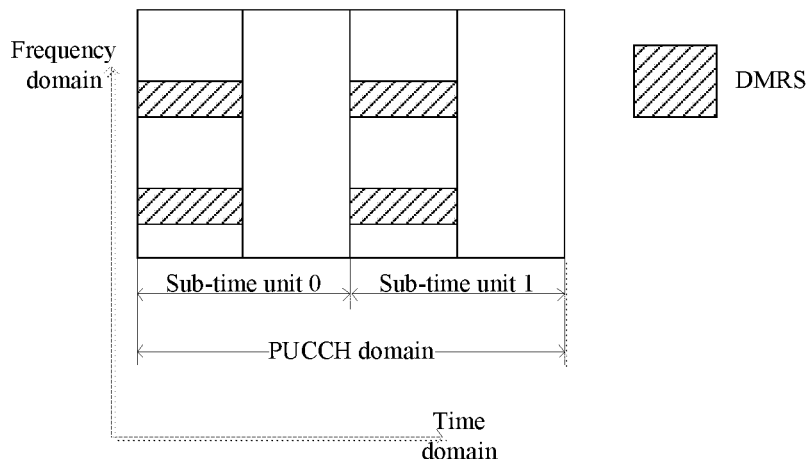
FIG. 8d is schematic diagram four of multiple time-domain symbols divided into multiple subunits each of which has a demodulation reference signal.

Alternatively, as shown in FIGS. 8c-8d, the four OFDM symbols occupied by the PUCCH are divided into two time sub-units, and two consecutive time-domain symbols form one time sub-unit. Patterns occupied by the demodulation reference signals shown in FIGS. 8c-8d are merely examples, and other patterns are not excluded in the embodiment.

The division manners for the time sub-units in FIGS. 8a-8d are merely examples, and other implementations are not excluded in the embodiment.

How many time sub-units the symbols are divided into is fixed, notified by signaling or determined according to the number (which is agreed by the base station and the terminal) of transmitting beam sets used to send the PUCCH. The number of transmitting beam sets used to send the PUCCH is the value of Y9.

The preceding modes of the demodulation reference signal can allow that, on different time sub-units, the transmitting beams of the terminal are different, and the receiving beams of the base station are also different.

Embodiment Ten

In the embodiment, when the number of time-domain symbols of the PUCCH is more than one, the demodulation reference signal of the PUCCH has two modes.

Figure 12A:
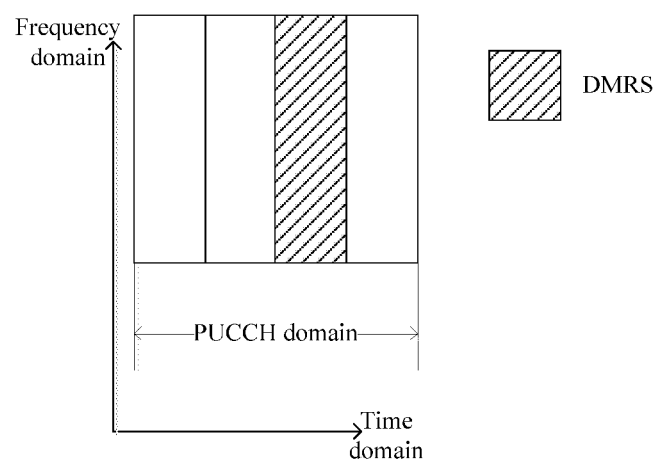
FIG. 12a is example diagram one of a first mode of a demodulation reference signal according to an embodiment ten.
Figure 12B:
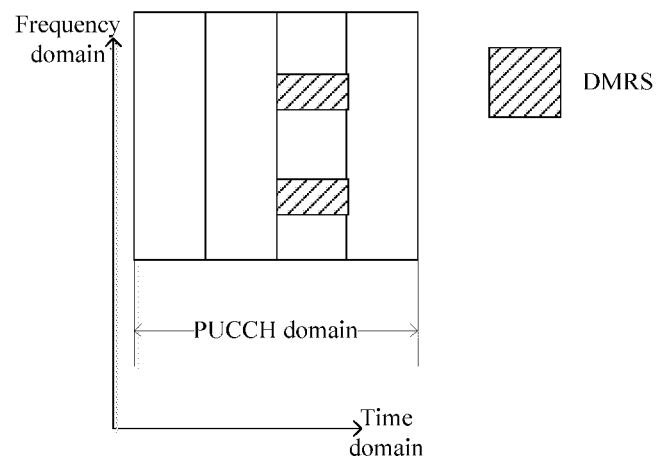
FIG. 12b is example diagram two of a first mode of a demodulation reference signal according to an embodiment ten.

The first mode is as shown in FIGS. 12a~12b. The multiple time-domain symbols of the PUCCH share one demodulation reference signal resource and are not divided into multiple time sub-units. As illustrated in the embodiment nine, one demodulation reference signal can be used for decoding of control information on all time-domain symbols corresponding to one PUCCH. The patterns of the demodulation reference signal shown in FIGS. 12a~12b are merely examples, and other patterns of the demodulation reference signal are not excluded.

The second mode is as illustrated in the embodiment nine in which the PUCCH is divided into multiple time sub-units, and the demodulation reference signals between the multiple time sub-units are independent of each other.

For the two pattern modes of the demodulation reference signal, a first manner for indicating is to indicate which mode to be adopted through base station signaling (a dynamic signaling or a semi-static signaling), and a second manner is based on the number of time-domain symbols occupied by the PUCCH. As for the second manner, in response to determining that the number of time-domain symbols is less than a predetermined threshold, the second mode is adopted; otherwise, the first mode is adopted. A third manner is that the terminal determines, according to the transmission modes used by the terminal to send the PUCCH, which mode is to be adopted. For the third manner, if the transmission diversity or repeated transmission is adopted, the second mode is adopted, otherwise, the first mode is adopted. The four manner is based on the number of transmitting beam sets used by the terminal to send the PUCCH; and, if the number of transmitting beams is 1, the first mode is adopted, otherwise, the second mode is adopted.

The above first mode allows that, on one PUCCH, the transmitting beams of the terminal are unchanged, and the receiving beams of the base station are also unchanged.

Embodiment Eleven

In the example, the resources of the PUCCH are determined according to the time-domain resources of the downlink PDSCH. The resources of the PUCCH include at least one of the following resources: time-domain resources, frequency-domain resources or code-domain resources.

For example, the resources of the PUCCH are determined according to the ending time-domain resource of the PDSCH. The according to the ending time-domain resource of the PDSCH includes at least one of: time unit index information corresponding to the ending time-domain resource or time-domain symbol index information corresponding to the ending time-domain resource in the time unit.

Embodiment Twelve

In the embodiment, the PUCCH is divided into multiple control channel resource elements. The control resource elements have X12 time-domain symbols and Y12 subcarriers. In an exemplary embodiment, X12=1 and Y12 is the number of subcarriers included in one PRB or a fixed number of PRB s.

Each control channel resource element includes multiple DMRS ports, and these DMRS ports are orthogonal or pseudo-orthogonal through sequences. Thus, different users can occupy different numbers of control resource elements and they can be orthogonal or pseudo-orthogonal to each other through the DMRS ports, thereby achieving that multiplexing is performed between terminals with different numbers of control channel resources.

Figure 12C:
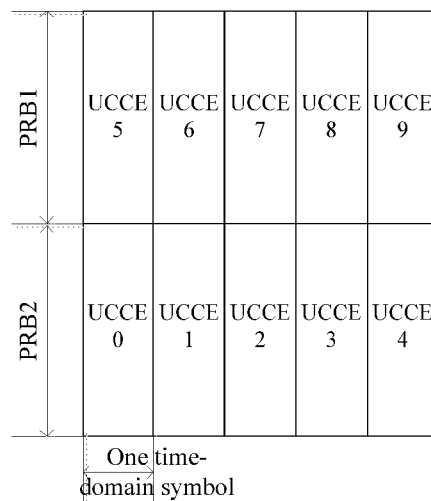
FIG. 12c is a schematic diagram of a multiplexing manner of UCCEs and PUCCHs of terminals occupying different numbers of UCCEs according to an embodiment twelve.

As shown in FIG. 12c, it is assumed that X12=1 and Y12 is the number of subcarriers occupied by one PRB. As shown in FIG. 12c, there are a total of 10 control channel resource elements (UCCEs): UCCE0~UCCE9. Since there are multiple orthogonal DMRS ports on each UCCE, the terminal 1 may occupy the time-frequency resources in UCCE0~UCCE9 and occupy the first DMRS port on each UCCE, while the terminal 2 may occupy any one or more of the control channel resources in UCCE0~UCCE9. However, the terminal 2 occupies the second DMRS port on each occupied UCCE. Since the first DMRS port and the second DMRS port are orthogonal, the PUCCH of the terminal 1 and the PUCCH of the terminal 2 are orthogonal. In an exemplary embodiment, the DMRS ports in each UCCE are orthogonal by means of code division mode.

The number of UCCEs, X12 and Y12, in FIG. 12c are merely an example, and other cases of numbers are not excluded.

Embodiment Thirteen

In the embodiment, the second communication node sends the first control information to the first communication node. The first control information includes a sending manner used by the second communication node to send the control channel.

The different sending manners are distinguished from each other by at least one of the following information: a transmitting beam, transmission precoding information, transmission time, or a transmission frequency-domain resource.

The first control information includes information of notifying a sending manner used by the first communication node to send the control channel, which satisfies at least one of the features described below.

The codebook index information used by the control channel is notified in the first control information. For example, the base station notifies PMI used by the terminal to send the uplink control information.

The measurement reference signal information is notified in the first control information, and the information about the sending manner used to send the control channel is obtained by the first communication node according to port information of the measurement reference signal. The measurement reference signal information includes at least one of the following information: measurement reference set information, resource index information of the measurement reference signal, time-domain information corresponding to the measurement reference signal, frequency-domain information corresponding to the measurement reference signal, or sequence information corresponding to the measurement reference signal. The measurement reference signal satisfies at least one of the following: the measurement reference signal is the signal sent by the first communication node to the second communication node before, or the measurement reference signal is the signal sent by the second communication node to the first communication node before. For example, the base station (the second communication node), by using the first control information, notifies the terminal (the first communication node) of at least one of information about an SRS resource ID or an SRS port, while the terminal sends at least one of the SRS resource or the SRS port to the base station before (or in the same time unit as the control channel). The terminal sends the uplink control information to the base station by using precoding or a beam corresponding to at least one of the SRS resource or the SRS port; while the base station may also send at least one of a downlink reference signal resource or a downlink reference signal port to the terminal in the first control information, so that the terminal sends the control information to the base station by using a transmitting beam corresponding to at least one of the downlink reference signal resource or the downlink reference signal port. For example, in the case where the uplink and downlink reciprocity exists on the terminal side, the terminal may obtain the uplink transmitting beam for sending the uplink control channel according to the receiving beam for receiving the downlink reference signal. The downlink reference signal includes at least one of a downlink measurement reference signal or a downlink demodulation reference signal.

Logical beam information is notified in the first control information. Different logical beams are distinguished from each other by at least one of the information described below. Different logically numbered beams are distinguished from each other by at least one of the following features: information about a reference signal port, information about a reference signal resource, time-domain information of a reference signal, frequency-domain information of a reference signal, or sequence information of a reference signal.

When the time-domain information of the signal is included in the logical number of a beam, one reference signal port corresponds to different logical beams when the one reference signal port at different time-domain regions.

When the frequency-domain information of the signal is included in the logical number of a beam, one reference signal port corresponds to different logical beams when the one reference signal port at different frequency-domain regions.

The manner that the base station sends the first control information may be at least one of the following ways: a high-level signaling (such as an RRC signaling, or a MAC CE signaling) or a physical-layer dynamic signaling.

In the embodiment, the terminal may need to adopt multiple sending manners (or multiple sending manner sets) to send the PUCCH to the base station, and the base station needs to notify a correspondence between the multiple sending manners (the multiple sending manner sets) and time-domain resources of the control channel. In an exemplary embodiment, the multiple sending manners (or multiple sending manner sets) may only be generated by the terminal in a time division manner. The first notification manner of the correspondence is to notify only an order of the sending manners, while the time-domain resources occupied in each sending manner are divided according to an agreed rule. For example, the time-domain resources of the control channel are basically divided into equal proportions according to the number of sending manners (or sending manner sets). For example, the terminal needs to send the PUCCH in four slots and use two sending manners (or two sending manner sets), and then the base station notifies the terminal that the sending manner 1 (or the first sending manner set) is used in the first two slots and the sending manner 2 (or the second sending manner set) is used in the last two slots. In the embodiment, the correspondence between the sending manners and the slots is merely an example and other relationships are not excluded. Of course, in the embodiment, the PUCCH resources may be on multiple time-domain symbols of one slot, and the base station notifies the time-domain resources of the PUCCH corresponding to each sending manner. As shown in FIGS. 8c-8d, the PUCCH with a length of four time-domain symbols is divided into two time-domain regions, and each time-domain region corresponds to information about one transmitting beam (or transmitting beam set). The second notification manner of the correspondence is that the base station notifies the terminal of uplink control channel resources corresponding to each sending manner (or sending manner set) and then notifies that the multiple uplink control channel resources are used to transmit one piece of uplink control information repeatedly.

The preceding sending manners are in time division. Of course, the embodiment does not exclude the sending manners in frequency division, and the base station notifies the correspondence between the multiple sending manners and multiple frequency-domain resources in a similar manner.

Embodiment Fourteen

In the embodiment, the base station notifies information about uplink control channel resource sets through a physical-layer common signaling, so that the terminal may select one or more resource sets from the uplink control channel resource set randomly or according to a predetermined rule to send the control channel.

For example, the base station sends, through the common signaling, the uplink control channel resources that are not occupied in the current time unit. The terminal having a beam recovery request or a resource request may randomly select one or more uplink control resources from an idle uplink control channel resource set to send the beam recovery request or the resource request information. Alternatively, other burst request information is sent on the selected resources.

Alternatively, the terminal selects one or more uplink control resources from the idle uplink control channel resource set according to the predetermined rule to send the beam recovery request or the resource request information. Alternatively, other burst request information is sent on the selected resources.

The physical-layer common control signaling may be a Cell-Specific control signaling or a group common control signaling.

In an exemplary embodiment, the terminal may select the uplink control channel resources from the idle control channel resource set only in a predetermined time unit to perform reporting but cannot perform the selection when not in the predetermined time unit. The predetermined time unit may be agreed by the base station and the terminal in advance or notified to the terminal through the control signaling. For example, the predetermined time unit is a time unit that satisfies a certain periodicity. Since the request information is the burst request, the terminal selects the control channel resources in the predetermined time unit only when the burst request is required.

One control channel resource includes at least one of the following resources: a time-domain resource, a frequency-domain resource, a code-domain resource or a transmitting beam resource.

In the embodiment, the terminal may also send other control information, such as ACK/NACK and CSI information, etc., on the selected uplink control channel resources.

In the embodiment, a manner of notifying the uplink control channel resource set on the common control channel is to notify an uplink control channel resource pool. For example, the uplink control channel resources available in the current time unit are logically numbered 0 to N, K is notified on the common control channel, and it is agreed with the terminal that the uplink control channel resource set is composed of control channel resources logically numbered {K, K+1, . . . , N}.

Embodiment Fifteen

In the embodiment, the base station notifies uplink control channel resources by using two-level signaling. The time unit (or time unit set) where the uplink control channel is located is notified in the first level signaling. At least one of a time-domain resource, a frequency-domain resource or a code-domain resource occupied by the uplink control channel in the notified time unit is notified by the second level signaling.

For example, the uplink control channel is used for sending CSI information. The CSI information is sent periodically or semi-periodically. For example, the terminal sends the CSI information every 5 slots (this is notified in the first level signaling information, and in an exemplary embodiment, the first level signaling information may be high-layer signaling information), and the terminal detects the PDCCH on each slot unit that needs to send and notifies the PUCCH resources occupied for sending the CSI information in the PDCCH. The PDCCH may be a dedicated PDCCH or a group PDCCH. In the group PDCCH, PUCCH resources are notified to multiple terminals, which is similar to the DCI format 3/DCI format 3A manner in LTE used to notify the TPC command.

Alternatively, for example, the ACK/NACK is sent on the PUCCH, the time unit where the PUCCH is located is notified in the control signaling (the first level control signaling) for notifying the PDSCH, and then the resources occupied by the PUCCH are notified in the control signaling (the second level control signaling) in the notified time unit. The resource includes at least one of the following resources: the time-domain resource, the frequency-domain resource or the code-domain resource. The second control signaling may be a common control signaling or a dedicated control information.

Embodiment Sixteen

In the embodiment, the base station (the second communication node) notifies, in a dynamic control signaling, information about a control channel format used by the terminal (the first communication node) to send the control channel. The information about the control channel format is distinguished in at least one of the following manners: a time-domain spreading manner, a frequency-domain spreading manner, the maximum number of bits that can be transmitted, a multiplexing manner of multiple pieces of second control information, or the type of the second control information that can be carried on the control channel, which is similar to PUCCH format 1/format 1a/format 1b/format 2a/format 2b/format 3/format 4 in LTE.

Embodiment Seventeen

In the embodiment, the base station (the second communication node) notifies in the first control information at least one of a modulation manner or a coding rate, which is used by the terminal (the first communication node) to send the control channel, of the control channel. The first control information may be at least one of the following signaling: an RRC signaling, a MAC CE signaling or a physical dynamic signaling.

Embodiment Eighteen

In the embodiment, the base station notifies the terminal of one SRS port group. Different SRS ports in the SRS port group correspond to different transmitting beams and the same receiving beams reaching the base station. The terminal may freely select a transmitting beam corresponding to one SRS port in the SRS group. For example, the transmitting beam information of the uplink control channel includes one SRS port group, and the terminal selects transmit beams corresponding to one or more ports from the SRS group to send the uplink control channel. Alternatively, the one SRS port group may be associated with one downlink reference signal port or downlink reference signal resource, and the terminal may, according to the receiving beam response of the downlink reference signal, select transmitting beams corresponding to one or more ports from the SRS group to send the uplink control channel.

The SRS port group may be replaced with an SRS resource group. The SRS port group may also be replaced with an SRS port group and an SRS resource group.

Embodiment Nineteen

In the embodiment, the base station notifies uplink transmitting beam information by a downlink reference signal. In this case, the implementation of the terminal is one of the following.

Implementation one: after the terminal obtains an uplink transmitting beam according to a receiving beam of the downlink reference signal in a first time unit, the uplink transmitting beam is kept being unchanged.

Implementation two: after the terminal obtains an uplink transmitting beam according to a receiving beam of the downlink reference signal in a first time unit, the terminal changes the uplink transmitting beam according to the receiving beam of the downlink reference signal in a second time unit. The base station sends the downlink reference signal in the first time unit and the second time unit.

Alternatively, the uplink control channel is a PUCCH, the second uplink control information is UCI, and the downlink control channel is a PDCCH (or a downlink control channel that feeds back CSI).

The sending manner of the uplink control channel in the preceding embodiments can also be used to send the downlink control channel.

Figure 10:
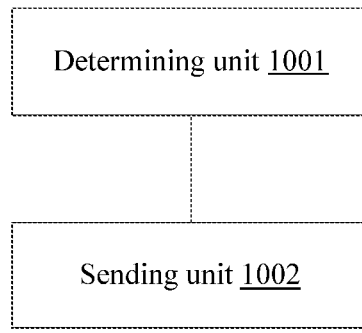
FIG. 10 is a structure diagram of a device for sending a control channel according to an embodiment.

FIG. 10 is a structure diagram of a device for sending a control channel according to an embodiment. The device is applied to a first communication node. As shown in FIG. 10, the device includes: a determining unit 1001 and a sending unit 1002.

The determining unit 1001 is configured to determine second transmission parameter information about the control channel according to at least one of first control information or first parameter information.

The sending unit 1002 is configured to send the control channel to a second communication node according to the second transmission parameter information.

The first parameter information includes at least one of the following information: demodulation reference signal information corresponding to the first control information, demodulation reference signal information of a data channel corresponding to the control channel, type information of second control information transmitted on the control channel, or channel coding rate information corresponding to the first control information.

Alternatively, the first control information is sent by the second communication node to the first communication node and the second control information is sent by the first communication node to the first second communication node, where the second control information is on the control channel.

Alternatively, the second transmission parameter information includes at least one of the following information: information about a control channel region, information about frequency-domain resources occupied by the control channel, information about time-domain symbols occupied by the control channel, information about demodulation reference signals of the control channel, code-domain resources occupied by the control channel, or a multiplexing manner of multiple pieces of second control information.

In an embodiment, the first control information is first control information related to the data channel corresponding to the control channel.

The data channel and the first control information are received by the first communication node from the second communication node.

In an embodiment, the demodulation reference signal information includes at least one of the following information: port index information of a demodulation reference signal; or index information of sequences adopted by the demodulation reference signal.

In an embodiment, the device further includes a means for obtaining resource information corresponding to the control channel according to the demodulation reference signal information of the data channel and at least one of the following information: frequency-domain resources corresponding to the data channel, index information corresponding to the first control information, or time unit index information corresponding to the data channel.

In an embodiment, the device further includes a means for: obtaining, according to one or more minimum frequency-domain resource indexes corresponding to the data channel, a second frequency-domain resource occupied by the control channel; obtaining, according to one or more maximum frequency-domain resource indexes corresponding to the data channel, the second frequency-domain resource occupied by the control channel; obtaining third resource information of the control channel in the second frequency-domain resource according to the demodulation reference signal information corresponding to the data channel.

In an embodiment, the third resource information includes at least one of the following information: a time-frequency resource group index of the control channel in the second frequency-domain resource, where the second frequency-domain resource includes multiple time-frequency resource groups; a code-domain resource index of the control channel in the second frequency-domain resource; or demodulation reference signal resource information corresponding to the control channel.

In an embodiment, the device further includes a means for obtaining third transmission parameter information of the control channel according to the demodulation reference signal information corresponding to the first control information and index information corresponding to the first control information.

In an embodiment, the third transmission parameter information includes at least one of the following resource information: a time-domain resource corresponding to the control channel, the frequency-domain resource corresponding to the control channel, a code resource corresponding to the control channel, or a time-frequency-code resource corresponding to a demodulation reference signal of the control channel.

In an embodiment, the device further includes a means for: sending another signal according to the information about the control channel region; or when a frequency-domain resource allocated for another signal in a current time unit intersects with a frequency-domain resource where the control channel region is located, not sending the another signal on the control channel region; wherein the another signal includes at least one of the following signals: a data channel signal, a measurement reference signal, a demodulation reference signal, an access request signal or a scheduling request signal.

Alternatively, a resource occupied by the control channel is a subset of a resource occupied by the control channel region.

In an embodiment, the information about the control channel region includes at least one of the following information: a number of sub-regions included in the control channel region, information about frequency-domain resources of each of the sub-regions, or information about a number of time-domain symbols corresponding to each of the sub-regions.

In an embodiment, the control channel region satisfies one of the following features: the control channel region occupies two sides of a predetermined bandwidth; on an upper side of the predetermined bandwidth, the greater a number of time-domain symbols corresponding to a sub-region is, the higher an occupied frequency-domain position is, where the higher the frequency-domain position is, the greater a subcarrier number of a subcarrier at which the sub-region is located is; on a lower side of the predetermined bandwidth, the greater the number of the symbols corresponding to the sub-region is, the lower the occupied frequency-domain position is, where the lower the frequency-domain position is, the smaller the subcarrier number of the subcarrier at which the sub-region is located is; when the sub-region includes N time-domain symbols, an ending symbol of the N time-domain symbols is an ending symbol of a second transmission domain; and when the sub-region includes the N time-domain symbols, a starting symbol of the N time-domain symbols is a starting time-domain symbol of the second transmission domain. The second transmission domain corresponds to a region of the second communication node receiving a signal.

In an embodiment, indication information indicating information about the number of time-domain symbols of the control channel in the first control information includes at least one of the following information: whether a duration of the control channel is a long duration or a short duration; a starting symbol index of the control channel; an ending symbol index of the control channel; the number of the time-domain symbols of the control channel; or an index of the number of the time-domain symbols of the control channel in an agreed set of numbers of time-domain symbols.

In an embodiment, when obtaining that a duration of the control channel is a long duration, a number of time-domain symbols of the control channel is equal to a number of time-domain symbols of a corresponding transmission domain. The corresponding transmission domain and the control channel have a same transmission direction.

In an embodiment, the control channels with the long duration in different time units correspond to different numbers of time-domain symbols.

In an embodiment, the device further includes a means for performing at least one of the following: determining information about the number of time-domain symbols occupied by the control channel or information about the number of frequency domains of the control channel according to a type of the second control information transmitted on the control channel; determining the information about the number of the time-domain symbols of the control channel or the information about the number of the frequency domains of the control channel according to information about a channel quality level or a capability level of the first communication node, where the first communication node feeds back the capability level information or the channel quality level information to the second communication node; determining the information about the number of the time-domain symbols occupied by the control channel or the information about the number of the frequency domains of the control channel according to a channel coding rate corresponding to the first control information; determining the information about the number of the time-domain symbols occupied by the control channel or the information about the number of the frequency domains of the control channel according to a channel coding rate of a first data channel corresponding to the second control information; or determining the information about the number of the time-domain symbols occupied by the control channel or the information about the number of the frequency domains of the control channel according to a channel coding rate of a second data channel.

Different types of the control channel are distinguished from each other by at least one of the following information: whether the second control information is Channel State Information (CSI) or Acknowledgement/Negative-Acknowledgement (ACK/NACK) information, an information length of the second control information, the first data channel being a data channel sent by the second communication node to the first communication node, the second data channel being a data channel sent by the first communication node to the second communication node in a current time unit, or the current time unit being a time unit where the control channel is located.

In an embodiment, multiple pieces of second control information having the same number of time-domain symbols are sent on one control channel. In an embodiment, multiple pieces of second control information of the same type are sent on one control channel. Different types of second control information are distinguished from each other by at least one of the following information: whether the second control information is CSI information or ACK/NACK information, an information length of the second control information, or a service type of the data corresponding to the second control information. The multiple pieces of second control information are multiple pieces of second control information needed to be fed back in the current time unit.

In an embodiment, the device further includes a means for performing at least one of: when multiple pieces of second control information needed to be fed back in a current time unit are sent on one control channel, obtaining resource information of the control channel according to first control information corresponding to a highest time unit index among multiple pieces of first control information related to the multiple pieces of second control information; or when the multiple pieces of second control information needed to be fed back in the current time unit are sent on the one control channel, obtaining the resource information of the control channel according to control channel resource information corresponding to the multiple pieces of second control information.

In an embodiment, a time-frequency-domain position of a demodulation reference signal of the control channel is obtained in one of the following manners: whether the demodulation reference signal is on a starting symbol or an ending symbol of the control channel is obtained according to the first control information; whether frequency-domain resources occupied by the demodulation reference signal in one time-domain symbol are continuous or discrete is obtained according to the first control information; parameters related to the demodulation reference signal are determined according to information about the number of time-domain symbols of the control channel; the parameters related to the demodulation reference signal are determined according to whether the control channel and a second data channel are allowed to be in code division multiplexing mode; the parameters related to the demodulation reference signal are determined according to the number of sending manner sets; and the parameters related to the demodulation reference signal are determined according to a sending mode of the control channel, where the sending mode includes a single-layer transmission, a transmission diversity mode and a repeated transmission. The second data channel is a data channel sent by the first communication node to the second communication node or by a third communication node to the second communication node.

In an embodiment, the first control information satisfies at least one of the following features: the first control information is high-layer semi-static control information; or the first control information is physical-layer dynamic control information.

In an embodiment, frequency-domain resource information of the control channel is obtained in the following manner: physical-layer dynamic information to notify the frequency-domain resource.

Alternatively, the frequency domain resource may occupy any one or more frequency-domain resources within a predetermined bandwidth. In an exemplary embodiment, one frequency-domain resource is one PRB, one sub-band, one CCE or one REG In an embodiment, resources occupied by the control channel satisfy the following feature: obtaining an ending time-domain symbol position and a starting frequency-domain resource corresponding to the control channel, as well as information about a number of resource elements of the control channel; and for the multiple resource elements of the control channel, first mapping in a frequency domain and then mapping in a time domain.

In an embodiment, the first parameter information further includes index information of a time unit at which the data channel or the first control information is located.

In an embodiment, time resource information of one of the data channel and the first control information includes at least one of the following information: index information of a time unit at which the data channel or the first control information is located; index information of a time-domain symbol at which the data channel or the first control information is located; index information of a time unit at which a time-domain ending position of one of the data channel or the first control information is located; or index information of a time-domain symbol at which the time-domain ending position of one of the data channel or the first control information is located.

In an embodiment, demodulation reference signal resource information of the second control information is determined according to the CSI in the first control information.

In an embodiment, CSI information fed back by the first communication node includes a transmission resource corresponding to the first communication node. The transmission resource includes one or more of the following types of resources: a transmitting beam resource, a transmission port resource, a transmission precoding matrix resource, a transmission time resource, a transmission frequency-domain resource and a transmission sequence resource.

In an embodiment, the first control information satisfies at least one of the following: the first control information is common control information, where the common control information may be a group common physical downlink control channel (Group common PDCCH); the first control information includes information that notifies a control channel resource set of a current time unit; the first control information includes information that notifies a sending sequence of multiple sending manners used by the first communication node to send the control channel; the first control information includes information that notifies a correspondence between time-domain regions of the control channel and the multiple sending manners or sending manner sets used to send the control channel; the first control information includes at least one of information for notifying time-domain resource corresponding to each sending manner in the multiple sending manners or information for notifying frequency-domain resource corresponding to each sending manner in the multiple sending manners, wherein the multiple sending manners are used by the first communication node to send the control channel; the first control information includes at least one of information for notifying time-domain resource corresponding to each sending manner set in the multiple sending manner sets or information for notifying frequency-domain resource corresponding to each sending manner set in the multiple sending manner sets, wherein the multiple sending manner sets are used by the first communication node to send the control channel; the first control information includes information that notifies a sending manner used by the first communication node to send the control channel, where information about the sending manners may also be referred to as beam information or precoding information; the first control information includes information that notifies a control channel format used by the first communication node to send the control channel, where different control channels are distinguished from each other in at least one of the following manners: a frequency-domain spreading manner, a time-domain spreading manner, the maximum number of bits that can be transmitted, or a multiplexing manner of multiple pieces of second control information; the first control information includes information that notifies a modulation manner used by the first communication node to send the control channel; or the first control information includes information that notifies a coding rate used by the first communication node to send the control channel.

In an embodiment, the sending unit 1002 is further configured to: randomly select one or more control channel resources from the control channel resource set and send the control channel on the one or more control channel resources; or select one or more control channel resources from the control channel resource set according to a predetermined rule and send the control channel on the one or more control channel resources. The predetermined rule is identification information of the first communication node.

In an embodiment, the sending manners are indicated by at least one of the following information: information about a port set of a first reference signal, where when a first reference signal port set includes only one reference signal port, port information of the first reference signal is directly notified; information about a resource index of the first reference signal; time-domain information corresponding to the first reference signal; frequency-domain information corresponding to the first reference signal; sequence information corresponding to the first reference signal; information about a transmitting beam logical number; information about a precoding codeword or codeword set; or information about a quasi-co-location relationship between the demodulation reference signal of the control channel and a second reference signal port.

The second reference signal port may also be at least one of a second reference signal port set or a second reference signal resource. The quasi-co-location relationship can be interpreted as: if two reference signals satisfy the quasi-co-location relationship, the channel characteristic parameters of one reference signal may be obtained from the channel characteristic parameters of the two reference signals. The channel characteristic parameters include at least one of the following parameters: delay spread, Doppler spread, Doppler shift, average delay, average gain, average vertical transmission angle, average horizontal transmission angle, average vertical angle of arrival, average horizontal angle of arrival, central vertical transmission angle, central horizontal transmission angle, central vertical angle of arrival, or central horizontal angle of arrival.

The first reference signal and the second reference signal are reference signals sent by the first communication node, the first reference signal and the second reference signal are reference signals received by the first communication node, or the first reference signal and the second reference signal are reference signals sent and received by the first communication node.

In an embodiment, when the first reference signal and the second reference signal are the reference signals received by the first communication node, at least one of the first reference signal and the second reference signal indicates one of the following information: information about a sending manner used by the first communication node to send a signal; the information about the sending manner used by the first communication node to send the signal and information about a receiving manner used by a receiving end to receive the signal; the information about the receiving manner used by the receiving end to receive the signal after the first communication node sends the signal; or the information about the sending manner used by the first communication node to send the signal and information about a receiving manner used by the first communication node to receive the signal.

Figure 11:
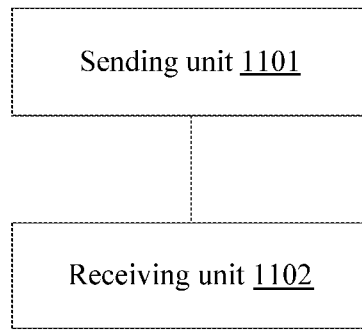
FIG. 11 is a structure diagram of a device for receiving a control channel according to an embodiment.

FIG. 11 is a structure diagram of a device for receiving a control channel according to an embodiment. The device is applied to a second communication node. As shown in FIG. 11, the device includes: a sending unit 1101 and a receiving unit 1102.

The sending unit 1101 is configured to send at least one of first control information or first parameter information to a first communication node.

The receiving unit 1102 is configured to receive the control channel sent by the first communication node according to second transmission parameter information. The second transmission parameter information is the second transmission parameter information for determining the control channel by the first communication node according to at least one of the first control information or the first parameter information.

Alternatively, the first parameter information includes at least one of the following information: demodulation reference signal information corresponding to the first control information, demodulation reference signal information of a data channel corresponding to the control channel, type information of second control information transmitted on the control channel, or channel coding rate information corresponding to the first control information.

Alternatively, the first control information is sent by the second communication node to the first communication node and the second control information is sent by the first communication node to the second communication node, where the second control information is on the control channel.

In an embodiment, the second transmission parameter information includes at least one of the following information: information about a control channel region, information about frequency-domain resources occupied by the control channel, information about time-domain symbols occupied by the control channel, information about demodulation reference signals of the control channel, information about code-domain resources occupied by the control channel, or a multiplexing manner of multiple pieces of second control information.

In an embodiment, the first control information is the first control information related to the data channel corresponding to the control channel.

The data channel and the first control information are received by the first communication node from the second communication node.

In an embodiment, the demodulation reference signal information includes at least one of the following information: port index information of a demodulation reference signal; or index information of sequences adopted by the demodulation reference signal.

In an embodiment, the device further includes a means for obtaining resource information of the control channel according to the demodulation reference signal information of the data channel and at least one of the following information: frequency-domain resources corresponding to the data channel, index information corresponding to the first control information, or time unit index information corresponding to the data channel.

In an embodiment, the device further includes a means for: obtaining, according to one or more minimum frequency-domain resource indexes corresponding to the data channel, a second frequency-domain resource occupied by the control channel; obtaining, according to one or more maximum frequency-domain resource indexes corresponding to the data channel, the second frequency-domain resource occupied by the control channel; obtaining third resource information of the control channel in the second frequency-domain resource according to the demodulation reference signal information corresponding to the data channel.

In an embodiment, the third resource information includes at least one of the following information: a time-frequency resource group index of the control channel in the second frequency-domain resource, wherein the second frequency-domain resource includes multiple time-frequency resource groups; a code-domain resource index of the control channel in the second frequency-domain resource; or demodulation reference signal resource information corresponding to the control channel.

In an embodiment, the device further includes a means for obtaining third transmission parameter information of the control channel according to the demodulation reference signal information corresponding to the first control information and index information corresponding to the first control information.

In an embodiment, the third transmission parameter information includes at least one of the following resource information: a time-domain resource corresponding to the control channel, the frequency-domain resource corresponding to the control channel, a code resource corresponding to the control channel, or a time-frequency-code resource corresponding to a demodulation reference signal of the control channel.

In an embodiment, the device further includes a means for: receiving another signal according to the information about the control channel region; or when a frequency-domain resource allocated for another signal in a current time unit intersects with a frequency-domain resource where the control channel region is located, not receiving the another signal on the control channel region; wherein the another signal includes at least one of the following signals: a data channel signal, a measurement reference signal, a demodulation reference signal, an access request signal and a scheduling request signal; or a resource occupied by the control channel being a subset of resources occupied by the control channel region, where the control channel region may also be referred to as a control channel resource set. One control channel resource may be at least one of the following resources: a time-domain resource, a frequency-domain resource and a code-domain resource. In addition, the resources occupied by the control channel in the control channel region may be notified by a dynamic signaling.

In an embodiment, the information about the control channel region includes at least one of the following information: the number of sub-regions included in the control channel region, information about frequency-domain resources of each of the sub-regions, or information about the number of time-domain symbols corresponding to each of the sub-regions.

In an embodiment, the control channel region satisfies one of the following features: the control channel region occupies two sides of a predetermined bandwidth; on an upper side of the predetermined bandwidth, the greater a number of time-domain symbols corresponding to a sub-region is, the higher an occupied frequency-domain position is, wherein the higher the frequency-domain position is, the greater a number of a subcarrier at which the sub-region is located is; on a lower side of the predetermined bandwidth, the greater the number of the symbols corresponding to the sub-region is, the lower the occupied frequency-domain position is, wherein the lower the frequency-domain position is, the smaller a number of a subcarrier at which the sub-region is located is; when the sub-region includes N time-domain symbols, an ending symbol of the N time-domain symbols is an ending symbol of a second transmission domain; and when the sub-region includes the N time-domain symbols, a starting symbol of the N time-domain symbols is a starting time-domain symbol of the second transmission domain. The second transmission domain corresponds to a signal receiving region of the second communication node.

In an embodiment, indication information which is in the first control information and indicates information about a number of time-domain symbols of the control channel includes at least one of the following information: whether a duration of the control channel is a long duration or a short duration; a starting symbol index of the control channel; an ending symbol index of the control channel; the number of the time-domain symbols of the control channel; or an index of the number of the time-domain symbols of the control channel in an agreed set of numbers of time-domain symbols.

In an embodiment, when obtaining that a duration of the control channel is a long duration, a number of time-domain symbols of the control channel is equal to a number of time-domain symbols of a corresponding transmission domain, wherein the corresponding transmission domain and the control channel have a same transmission direction.

In an embodiment, the control channels with the long duration in different time units correspond to different numbers of time-domain symbols.

In an embodiment, the device further includes a means for performing at least one of the following: determining information about a number of time-domain symbols occupied by the control channel or information about a number of frequency domains of the control channel according to a type of the second control information transmitted on the control channel; determining the information about the number of the time-domain symbols of the control channel or the information about the number of the frequency domains of the control channel according to information about a channel quality level or a capability level fed back by the first communication node, where the first communication node feeds back the capability level information or the channel quality level information to the second communication node; determining the information about the number of the time-domain symbols occupied by the control channel or the information about the number of the frequency domains of the control channel according to a channel coding rate corresponding to the first control information; determining the information about the number of the time-domain symbols occupied by the control channel or the information about the number of the frequency domains of the control channel according to a channel coding rate of a first data channel corresponding to the second control information; or determining the information about the number of the time-domain symbols occupied by the control channel or the information about the number of the frequency domains of the control channel according to a channel coding rate of a second data channel.

Different types of the control channel are distinguished from each other by at least one of the following information: whether the second control information is CSI information or ACK/NACK information, an information length of the second control information, the first data channel being sent by the second communication node to the first communication node, the second data channel being a data channel sent by the first communication node to the second communication node in a current time unit, or the current time unit being a time unit where the control channel is located.

In an embodiment, multiple pieces of second control information having the same number of time-domain symbols are sent receiving on one control channel; and multiple pieces of second control information of the same type are sent receiving on one control channel.

The different types of second control information are distinguished from each other by at least one of the following information: whether the second control information is CSI information or ACK/NACK information, an information length of the second control information, or a service type of the data corresponding to the second control information. The multiple pieces of second control information are the multiple pieces of second control information needed to be received in a current time unit.

In an embodiment, the device further includes a means for performing at least one of the following: when multiple pieces of second control information needed to be received in a current time unit are sent on one control channel, obtaining resource information of the control channel according to first control information corresponding to a highest time unit index among multiple pieces of first control information related to the multiple pieces of second control information; or when the multiple pieces of second control information needed to be received in the current time unit are sent on the one control channel, obtaining the resource information of the control channel according to control channel resource information corresponding to the multiple pieces of second control information.

In an embodiment, a time-frequency-domain position of a demodulation reference signal of the control channel is obtained in one of the following manners: whether the demodulation reference signal is on a starting symbol or an ending symbol of the control channel is obtained according to the first control information; whether frequency-domain resources occupied by the demodulation reference signal in one time-domain symbol are continuous or discrete is indicated according to the first control information; parameters related to the demodulation reference signal are determined according to information about a number of time-domain symbols of the control channel; the parameters related to the demodulation reference signal are determined according to whether the control channel and a second data channel are allowed to be in code division multiplexing mode; the parameters related to the demodulation reference signal are determined according to a number of sending manner sets; and the parameters related to the demodulation reference signal are determined according to a sending mode of the control channel, where the sending mode includes a single-layer transmission, a transmission diversity mode and a repeated transmission.

The second data channel is a data channel sent by the first communication node to the second communication node or by a third communication node to the second communication node.

In an embodiment, the first control information satisfies at least one of the following features: the first control information is high-layer semi-static control information, or the first control information is physical-layer dynamic control information.

In an embodiment, frequency-domain resource information of the control channel is obtained in the following manner: physical-layer dynamic information to notify the frequency-domain resource.

Alternatively, the frequency domain resource may occupy any one or more frequency-domain resources within a predetermined bandwidth. In an exemplary embodiment, one frequency-domain resource is one PRB, one sub-band, one CCE or one REG In an embodiment, a resource occupied by the control channel satisfies the following feature: obtaining an ending time-domain symbol position and a starting frequency-domain resource corresponding to the control channel, as well as information about a number of resource elements of the control channel; and for the multiple resource elements of the control channel, first mapping in a frequency domain and then mapping in a time domain.

In an embodiment, the first parameter information further includes index information of a time unit at which the data channel or the first control information is located.

In an embodiment, time resource information of one of the data channel and the first control information includes at least one of the following information: index information of a time unit at which the data channel or the first control information is located; index information of a time-domain symbol at which the data channel or the first control information is located; index information of a time unit at which a time-domain ending position of one of the data channel or the first control information is located; or index information of a time-domain symbol at which the time-domain ending position of one of the data channel or the first control information is located.

In an embodiment, demodulation reference signal resource information of the second control information is determined according to CSI information in the first control information.

In an embodiment, CSI information fed back by the first communication node includes a transmission resource corresponding to the first communication node. The transmission resource includes one or more of the following types of resources: a transmitting beam resource, a transmission port resource, a transmission precoding matrix resource, a transmission time resource, a transmission frequency-domain resource and a transmission sequence resource.

In an embodiment, the first control information satisfies that at least one of the followings. The first control information is common control information, where the common control information may be a group common physical downlink control channel. The first control information includes information that notifies a control channel resource set of a current time unit. The first control information includes information that notifies a sending sequence of multiple sending manners used by the first communication node to send the control channel. The first control information includes information that notifies a correspondence between time-domain regions of the control channel and the multiple sending manners or sending manner sets used to send the control channel. The first control information includes at least one of information for notifying time-domain resource corresponding to each sending manner in the multiple sending manners or information for notifying frequency-domain resource corresponding to each sending manner in the multiple sending manners, wherein the multiple sending manners are used by the first communication node to send the control channel; the first control information includes at least one of information for notifying time-domain resource corresponding to each sending manner set in the multiple sending manner sets or information for notifying frequency-domain resource corresponding to each sending manner set in the multiple sending manner sets, wherein the multiple sending manner sets are used by the first communication node to send the control channel. The first control information includes information that notifies a sending manner used by the first communication node to send the control channel, where information about the sending manners may also be referred to as beam information or precoding information. The first control information includes information that notifies a control channel format used by the first communication node to send the control channel, where different control channels are distinguished from each other in at least one of the following manners: a frequency-domain spreading manner, a time-domain spreading manner, information about the maximum number of bits that can be transmitted, or a multiplexing manner of multiple pieces of second control information. The first control information includes information that notifies a modulation manner used by the first communication node to send the control channel. The first control information includes information that notifies a coding rate used by the first communication node to send the control channel.

In an embodiment, the receiving unit 1102 is further configured to: detect, on all resource sets of the control channel resource set, the control channel sent by the first communication node; and detect, on a subset of the control channel resource set according to a predetermined rule, the control channel sent by the first communication node. The predetermined rule is identification information of the first communication node.

In an embodiment, the sending manners are indicated by at least one of the following information: information about a port set of a first reference signal, where port information of the first reference signal is directly notified when a first reference signal port set includes only one reference signal port; information about a resource index of the first reference signal; time-domain information corresponding to the first reference signal; frequency-domain information corresponding to the first reference signal; sequence information corresponding to the first reference signal; information about a transmitting beam logical number; information about a precoding codeword or codeword set; or information about a quasi-co-location relationship between the demodulation reference signal of the control channel and a second reference signal port.

The second reference signal port may also be at least one of a second reference signal port set or a second reference signal resource. The quasi-co-location relationship can be interpreted as: if two reference signals satisfy the quasi-co-location relationship, the channel characteristic parameters of one reference signal can be obtained from the channel characteristic parameters of the two reference signals. The channel characteristic parameters include at least one of the following parameters: delay spread, Doppler spread, Doppler shift, average delay, average gain, average vertical transmission angle, average horizontal transmission angle, average vertical angle of arrival, average horizontal angle of arrival, central vertical transmission angle, central horizontal transmission angle, central vertical angle of arrival, or central horizontal angle of arrival.

The first reference signal and the second reference signal are reference signals sent by the first communication node, the first reference signal and the second reference signal are reference signals received by the first communication node, or the first reference signal and the second reference signal are reference signals sent and received by the first communication node.

In an embodiment, when the first reference signal and the second reference signal are the reference signals received by the first communication node, at least one of the first reference signal or the second reference signal indicates one of the following information: information about a sending manner used by the first communication node to send a signal; the information about the sending manner used by the first communication node to send the signal and information about a receiving manner used by a receiving end to receive the signal; the information about the receiving manner used by the receiving end to receive the signal after the first communication node sends the signal; or the information about the sending manner used by the first communication node to send the signal and information about a receiving manner used by the first communication node to receive the signal.

Figure 13:
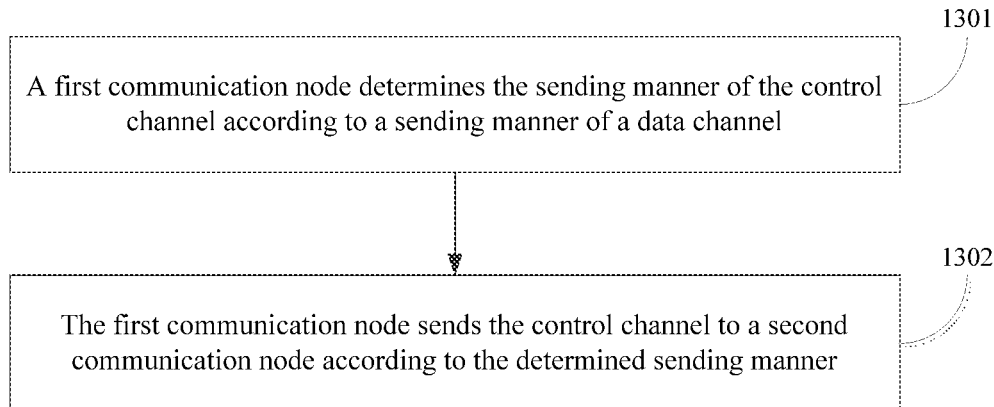
FIG. 13 is flowchart one of a method for determining a sending manner of a control channel according to an embodiment.

FIG. 13 is flowchart one of a method for determining a sending manner of a control channel according to an embodiment. As shown in FIG. 13, the method for determining a sending manner of a control channel includes the steps described below.

In step 1301, a first communication node determines the sending manner of the control channel according to a sending manner of a data channel.

In step 1302, the first communication node sends the control channel to a second communication node according to the determined sending manner.

In an embodiment, the sending manner is distinguished from another by at least one of the following features: a frequency-domain resource on which a reference signal is located, a time-domain resource on which the reference signal is located, a sequence resource used by the reference signal, a beam resource used by the reference signal, a precoding matrix resource used by the reference signal, an index of the reference signal resource on which the reference signal is located, or a quasi-co-location relationship between reference signals. The quasi-co-location relationship can be interpreted as: if two reference signals satisfy the quasi-co-location relationship, the channel characteristic parameters of one reference signal may be obtained from the channel characteristic parameters of the two reference signals. The channel characteristic parameters include at least one of the following parameters: delay spread, Doppler spread, Doppler shift, average delay, average gain, average vertical transmission angle, average horizontal transmission angle, average vertical angle of arrival, average horizontal angle of arrival, central vertical transmission angle, central horizontal transmission angle, central vertical angle of arrival, or central horizontal angle of arrival.

The reference signal is sent by the first communication node or the reference signal is received by the first communication node, or the reference signal is sent and received by the first communication node.

In an embodiment, determining the sending manner of the control channel satisfies at least one of the following features: determining the sending manner of the control channel according to the sending manner of the data channel when a sending time interval between the control channel and the data channel is less than a predetermined threshold; keeping the sending manner of the control channel unchanged until a new notification signaling is received after changing the sending manner of the control channel according to the sending manner of the data channel; determining the sending manner of a third type of control channel according to the sending manner of a fourth type of control channel when a sending time interval between the third type of control channel and the fourth type of control channel is less than a predetermined threshold; keeping the sending manner of the third type of control channel unchanged until a new notification signaling is received after changing the sending manner of the third type of control channel according to the sending manner of the fourth type of control channel; changing the sending manner of the control channel according to the sending manner of the data channel when the control channel belongs to a first type of control channel; not changing the sending manner of the control channel according to the sending manner of the data channel when the control channel belongs to a second type of control channel; receiving signaling information sent by the second communication node, and determining, according to the signaling information, whether the sending manner of the control channel changes according to the sending manner of the data channel; receiving the signaling information sent by the second communication node, and determining, according to the signaling information, whether the sending manner of the third type of control channel changes according to the sending manner of the fourth type of control channel; or changing in only one time window the sending manner of the control channel according to the sending manner of the data channel or the sending manner of the fourth type of control channel, and restoring the sending manner of the control channel to an original sending manner outside the time window.

In an embodiment, different types of control channels are distinguished from each other by at least one of the following features: a type of control information carried by the control channel; the number of time-domain symbols occupied by the control channel; the number of frequency-domain resources used by the control channel; the number of sending manners used by the control channel; or the number of sending manner sets used by the control channel.

Figure 14:
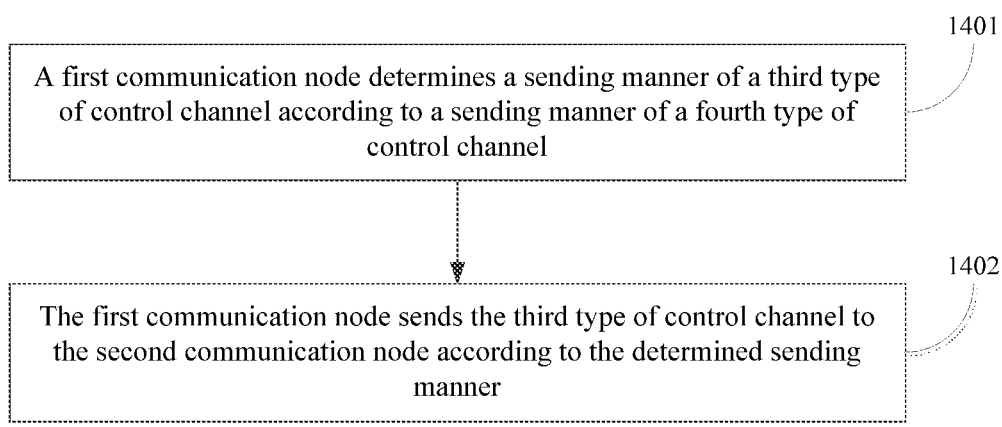
FIG. 14 is flowchart two of a method for determining a sending manner of a control channel according to an embodiment.

FIG. 14 is flowchart two of a method for determining a sending manner of a control channel according to an embodiment. As shown in FIG. 14, the method for determining a sending manner of a control channel includes the steps described below.

In step 1401, a first communication node determines a sending manner of a third type of control channel according to a sending manner of a fourth type of control channel.

In step 1402, the first communication node sends the third type of control channel to the second communication node according to the determined sending manner.

In an embodiment, the sending manner is distinguished from another by at least one of the following features: a frequency-domain resource on which a reference signal is located, a time-domain resource on which the reference signal is located, a sequence resource used by the reference signal, a beam resource used by the reference signal, a precoding matrix resource used by the reference signal, an index of the reference signal resource on which the reference signal is located, or a quasi-co-location relationship between reference signals. The quasi-co-location relationship can be interpreted as: if two reference signals satisfy the quasi-co-location relationship, the channel characteristic parameters of one reference signal may be obtained from the channel characteristic parameters of the two reference signals. The channel characteristic parameters include at least one of the following parameters: delay spread, Doppler spread, Doppler shift, average delay, average gain, average vertical transmission angle, average horizontal transmission angle, average vertical angle of arrival, average horizontal angle of arrival, central vertical transmission angle, central horizontal transmission angle, central vertical angle of arrival, or central horizontal angle of arrival.

The reference signal is sent by the first communication node or the reference signal is received by the first communication node, or the reference signal is sent and received by the first communication node.

In an embodiment, determining the sending manner of the control channel satisfies at least one of the following features: determining the sending manner of the control channel according to the sending manner of the data channel when a sending time interval between the control channel and the data channel is less than a predetermined threshold; keeping the sending manner of the control channel unchanged until a new notification signaling is received after changing the sending manner of the control channel according to the sending manner of the data channel; determining the sending manner of a third type of control channel according to the sending manner of a fourth type of control channel when a sending time interval between the third type of control channel and the fourth type of control channel is less than a predetermined threshold; keeping the sending manner of the third type of control channel unchanged until a new notification signaling is received after changing the sending manner of the third type of control channel according to the sending manner of the fourth type of control channel; changing the sending manner of the control channel according to the sending manner of the data channel when the control channel belongs to a first type of control channel; not changing the sending manner of the control channel according to the sending manner of the data channel when the control channel belongs to a second type of control channel; receiving signaling information sent by the second communication node, and determining, according to the signaling information, whether the sending manner of the control channel changes according to the sending manner of the data channel; receiving the signaling information sent by the second communication node, and determining, according to the signaling information, whether the sending manner of the third type of control channel changes according to the sending manner of the fourth type of control channel; or changing in only one time window the sending manner of the control channel according to the sending manner of the data channel or the sending manner of the fourth type of control channel, and restoring the sending manner of the control channel to an original sending manner outside the time window.

In an embodiment, different types of control channels are distinguished from each other by at least one of the following features: a type of control information carried by the control channel; the number of time-domain symbols occupied by the control channel; the number of frequency-domain resources used by the control channel; the number of sending manners used by the control channel; or the number of sending manner sets used by the control channel.

Figure 15:
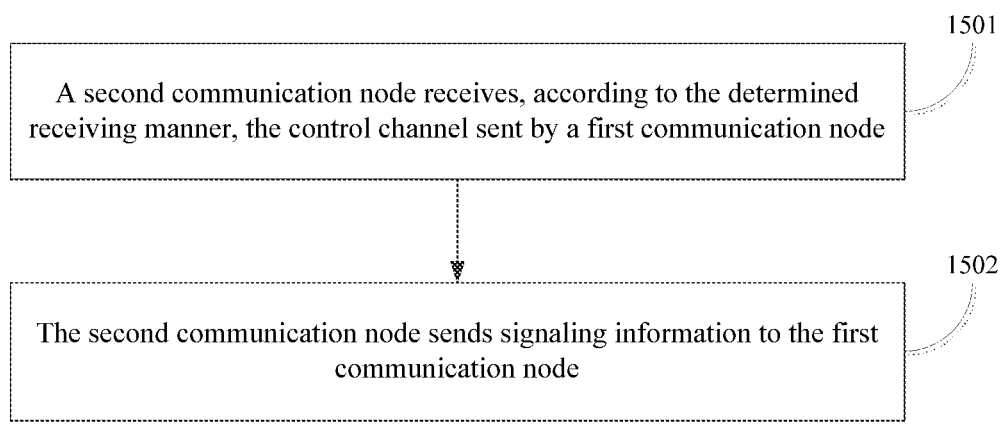
FIG. 15 is a flowchart of a method for determining a receiving manner of a control channel according to an embodiment.

FIG. 15 is a flowchart of a method for determining a receiving manner of a control channel according to an embodiment. As shown in FIG. 15, the method for determining a receiving manner of a control channel includes the steps described below.

In step 1501, a second communication node receives, according to the determined receiving manner, the control channel sent by a first communication node.

The determined receiving manner is determined according to a receiving manner used to receive a data channel sent by the first communication node or according to a receiving manner used to receive a fourth type of control channel sent by the first communication node.

In an embodiment, the determined receiving manner is distinguished from another by at least one of the following features: a frequency-domain resource on which a reference signal is located, a time-domain resource on which the reference signal is located, a sequence resource used by the reference signal, a beam resource used by the reference signal, a precoding matrix resource used by the reference signal, an index of the reference signal resource on which the reference signal is located, or a quasi-co-location relationship between reference signals.

The reference signal is sent by the first communication node or the reference signal is received by the first communication node, or the reference signal is sent and received by the first communication node.

In an embodiment, the determined receiving manner satisfies at least one of the following features: determining the receiving manner of the control channel according to the receiving manner of the data channel when a sending time interval between the control channel and the data channel is less than a predetermined threshold; keeping the receiving manner of the control channel unchanged until a new notification signaling is received after changing the receiving manner of the control channel according to the receiving manner of the data channel; determining the receiving manner of the control channel according to the receiving manner of a fourth type of control channel when a sending time interval between the control channel and the fourth type of control channel is less than a predetermined threshold;

keeping the receiving manner of the control channel unchanged until a new notification signaling is received after changing the receiving manner of the control channel according to the receiving manner of the fourth type of control channel; changing the receiving manner of the control channel according to the receiving manner of the data channel when the control channel belongs to a first type of control channel; changing the receiving manner of the control channel according to the receiving manner of the data channel when the control channel belongs to a third type of control channel; or not changing the receiving manner of the control channel according to the receiving manner of the data channel when the control channel belongs to a second type of control channel.

In an embodiment, different types of control channels are distinguished from each other by at least one of the following features: a type of control information carried by the control channel; the number of time-domain symbols occupied by the control channel; the number of frequency-domain resources used by the control channel; the number of sending manners used by the control channel; or the number of sending manner sets used by the control channel.

In step 1502, the second communication node sends signaling information to the first communication node.

The signaling information includes at least one of the following information: information about whether the receiving manner of the control channel changes according to the receiving manner of the data channel; information about whether the receiving manner of the control channel changes according to the receiving manner of the fourth type of control channel; information about whether the sending manner of the control channel changes according to the sending manner of the data channel; or information about whether the sending manner of the control channel changes according to the sending manner of the fourth type of control channel.

The receiving manner of the control channel changes according to the receiving manner of the data channel or the receiving manner of the fourth type of control channel in only one time window and restores the receiving manner of the control channel to an original receiving manner outside the time window.

Embodiment Twenty

In the embodiment, the sending manner used by the terminal to send the control channel is determined according to the following information: the sending manner used by the terminal to send the data channel. Different sending manners are distinguished from each other by at least one of the following information: a transmitting beam, port information of a measurement reference signal, a time-domain resource where the measurement reference signal is located, a frequency-domain resource where the measurement reference signal is located, a sequence resource used by the measurement reference signal, or a beam resource used by the measurement reference signal. For example, the sending manners are logically numbered by at least one of the above information. In the embodiment, the sending manner may also be determined by establishing of a quasi-co-location (QCL) relationship between different reference signals. For example, it is indicated that the sending manner used by the terminal is determined according to a port of a measurement reference signal, that is, it is established that a demodulation reference signal of the control channel and the measurement reference signal have a quasi-co-location relationship. The measurement reference signal may be a downlink measurement reference signal, then a reciprocity is used to obtain a transmitting beam of the control channel. The measurement reference signal may also be an uplink measurement reference signal, then the transmitting beam of the control channel is obtained according to a transmit beam of the uplink measurement reference signal or a receiving beam of the downlink reference signal.

The sending manner used by the data channel may be notified to the terminal in at least one of the following manners: the base station notifies, in first control information, codebook index information used by the data channel; the base station notifies, in the first control information, port information of a first reference signal (where the port information of the first reference signal may also be at least one of resource information of the first reference signal or first reference signal set information) and the terminal obtains information about the sending manner for sending the data channel according to the port information of the first reference signal; in the first control information, it is notified that the demodulation reference signal of the data channel and a port of a second reference signal (where the port of the second reference signal may also be at least one of a port set of the second reference signal or a resource of the second reference signal) have a quasi-co-location relationship. The quasi-co-location relationship can be interpreted as: if two reference signals satisfy the quasi-co-location relationship, the channel characteristic parameters of one reference signal may be obtained from the channel characteristic parameters of the other reference signals. The channel characteristic parameters include at least one of the following parameters: delay spread, Doppler spread, Doppler shift, average delay, average gain, average vertical angle of transmission, average horizontal angle of transmission, average vertical angle of arrival, average horizontal angle of arrival, central vertical angle of transmission, central horizontal angle of transmission, central vertical angle of arrival, or central horizontal angle of arrival.

A first reference signal and a second reference signal satisfy one of the following:

the first reference signal and the second reference signal are sent by the terminal to a second communication node before (that is, the first reference signal and the second reference signal are sent to the second communication node before a first communication node receives at least one of the first control information or first parameter information), and the first reference signal and the second reference signal are sent by the base station to the first communication node before (that is, the first reference signal and the second reference signal are sent to the first communication node before the second communication node sends at least one of the first control information or the first parameter information).

Embodiment Twenty-One

In the embodiment, the terminal determines the sending manner of the first type of control channel according to the sending manner of the data channel, but the sending manner of the second type of control channel does not change according to the sending manner of the data channel.

The distinction between the first type of control channel and the second type of control channel includes at least one of the following features: the types of the carried second control information are different (for example, ACK/NACK, CSI, beam recovery request, resource request, and for example, carrying ACK/NACK in the second type of control channel and carrying CSI in the first type of control channel); or the numbers of sending manners (or sending manner sets) of the control channel are different. For example, the number of sending manner sets of the first type of control channel is 1, and the number of sending manners of the first type of control channel is greater than 1. For example, the base station notifies, in the third signaling information, that the sending manner used by the first type of control channel is manner 1 (explicit or implicit as transmitting beam 1), and the base station further notifies the terminal, in the fourth signaling information, that the sending manner of the data channel is manner 2 (explicit or implicit as transmitting beam 2), then the sending manner used by the terminal to send the first type of control channel is manner 2. In an exemplary embodiment, the sending time of the third signaling information is not later than the sending time of the fourth signaling information.

The time interval between the first type of control channel and the data channel sent by the terminal is not greater than a predetermined threshold, where the predetermined threshold may be zero. When the sending time interval between the first type of control channel and the data channel is greater than the predetermined threshold, the sending manner of the first type of control channel is restored to an original sending manner of the first type of control channel. For example, the third signaling information is valid in slot n, and the fourth signaling information is valid in slot n+k, where k is an integer. The data channel is sent in slot n+k, then, if the first type of control channel falls into slot n+k−offset to slot n+k+offset (where offset is an integer, or falls into slot n+k to slot n+k+offset), then the sending manner of the first type of control channel is the manner 2 (the sending manner notified by the data channel). Moreover, if the first type of control channel falls outside slot n+k−offset to slot n+k+offset, then the sending manner of the first type of control channel is the manner 1 (the original sending manner of the first type of control channel). In the embodiment, the example region uses the level of slot. The example region may also use the level of the time-domain symbol.

Alternatively, after the sending manner of the first type of control channel changes according to the sending manner of the data channel, the sending manner does not change to the original sending manner of the control channel until a new signaling notification is received.

Different sending manners are distinguished from each other according to at least one of the following information: a transmitting beam or first reference signal information corresponding to a demodulation reference signal of the control channel. The demodulation reference signal of the control channel and the first reference signal satisfy a quasi-co-location relationship with respect to a channel characteristic parameter. The first reference signal includes at least one of the following information of the first reference signal: port set information of the first reference signal, resource index information of the first reference signal, time-domain information of the first reference signal, frequency-domain information of the first reference signal, or sequence information of the first reference signal. When a port set of the first reference signal includes only one reference signal port, the port information of the first reference signal is directly notified.

Embodiment Twenty-Two

In the embodiment, the sending manner of the third type of control channel is determined according to the sending manner of the fourth type of control channel.

Different types of control channels are distinguished from each other by at least one of the following features: the types of the carried second control information are different (for example, ACK/NACK, CSI, beam recovery request, resource request, and for example, carrying ACK/NACK in the fourth type of control channel and carrying CSI in the third type of control channel); or the numbers of sending manners (or sending manner sets) of the control channel are different. For example, the number of sending manner sets of the third type of control channel is 1, and the number of sending manners of the fourth type of control channel is greater than 1. For example, the base station notifies, in the third signaling information, that the sending manner used by the third type of control channel is manner 1 (explicit or implicit as transmitting beam 1), and the base station further notifies the terminal, in the fourth signaling information, that the sending manner for sending the fourth type of control channel is manner 2 (explicit or implicit as transmitting beam 2), then the sending manner used by the terminal to send the third type of control channel is manner 2. In an exemplary embodiment, the sending time of the third signaling information is not later than the sending time of the fourth signaling information.

Similar to embodiment twenty-one, one manner is that only if the sending region of the third type of control channel falls within the agreed region, the sending manner of the third type of control channel changes according to the fourth type of control channel, and if the sending region of the third type of control channel is outside the agreed region, the sending manner of the third type of control channel is updated to the original sending manner of the third type of control channel.

Another sending manner is that: after changing according to the sending manner of the fourth type of control channel, the sending manner of the third type of control channel keeps unchanged until a new signaling notification is received.

Different sending manners are distinguished from each other according to at least one of the following information: a transmitting beam or first reference signal information corresponding to a demodulation reference signal of the control channel. The demodulation reference signal of the control channel and the first reference signal satisfy a quasi-co-location relationship with respect to a channel characteristic parameter. The first reference signal includes at least one of the following information of the first reference signal: port set information of the first reference signal, resource index information of the first reference signal, time-domain information of the first reference signal, frequency-domain information of the first reference signal, or sequence information of the first reference signal. When a port set of the first reference signal includes only one reference signal port, port information of the first reference signal is directly notified.

The sending manner of the uplink control channel in the above embodiments may also be used to send the downlink control channel.

Figure 16:
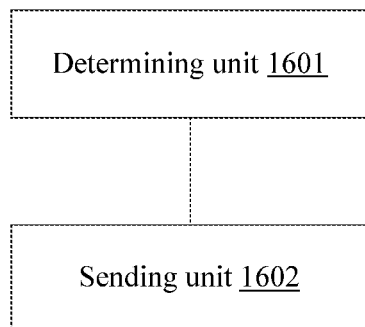
FIG. 16 is a structure diagram of a first determining device for determining a sending manner of a control channel according to an embodiment.

FIG. 16 is a structure diagram of a first determining device for determining a sending manner of a control channel according to an embodiment. The device is applied to a first communication node. As shown in FIG. 16, the first determining device includes: a determining unit 1601 and a sending unit 1602.

The determining unit 1601 is configured to determine the sending manner of the control channel according to a sending manner of a data channel or determine a sending manner of a third type of control channel according to a sending manner of a fourth type of control channel.

The sending unit 1602 is configured to send the control channel to a second communication node according to the determined sending manner or send the third type of control channel to the second communication node according to the determined sending manner.

In an embodiment, the sending manner is distinguished from another by at least one of the following features: a frequency-domain resource on which a reference signal is located, a time-domain resource on which the reference signal is located, a sequence resource used by the reference signal, a beam resource used by the reference signal, a precoding matrix resource used by the reference signal, an index of the reference signal resource on which the reference signal is located, or a quasi-co-location relationship between reference signals.

The reference signal is sent by the first communication node or the reference signal is received by the first communication node, or the reference signal is sent and received by the first communication node.

In an embodiment, determining the sending manner of the control channel satisfies at least one of the following features: determining the sending manner of the control channel according to the sending manner of the data channel when a sending time interval between the control channel and the data channel is less than a predetermined threshold; keeping the sending manner of the control channel unchanged until a new notification signaling is received after changing the sending manner of the control channel according to the sending manner of the data channel; determining the sending manner of a third type of control channel according to the sending manner of a fourth type of control channel when a sending time interval between the third type of control channel and the fourth type of control channel is less than a predetermined threshold; keeping the sending manner of the third type of control channel unchanged until a new notification signaling is received after changing the sending manner of the third type of control channel according to the sending manner of the fourth type of control channel; changing the sending manner of the control channel according to the sending manner of the data channel when the control channel belongs to a first type of control channel; not changing the sending manner of the control channel according to the sending manner of the data channel when the control channel belongs to a second type of control channel; receiving signaling information sent by the second communication node, and determining, according to the signaling information, whether the sending manner of the control channel changes according to the sending manner of the data channel; receiving the signaling information sent by the second communication node, and determining, according to the signaling information, whether the sending manner of the third type of control channel changes according to the sending manner of the fourth type of control channel; or changing in only one time window the sending manner of the control channel according to the sending manner of the data channel or the sending manner of the fourth type of control channel, and restoring the sending manner of the control channel to an original sending manner outside the time window.

In an embodiment, different types of control channels are distinguished from each other by at least one of the following features: a type of control information carried by the control channel; the number of time-domain symbols occupied by the control channel; the number of frequency-domain resources used by the control channel; the number of sending manners used by the control channel; or the number of sending manner sets used by the control channel.

Figure 17:
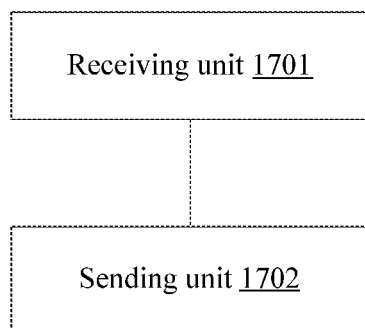
FIG. 17 is a structure diagram of a second determining device for determining a receiving manner of a control channel according to an embodiment.

FIG. 17 is a structure diagram of a second determining device for determining a receiving manner of a control channel according to an embodiment. The device is applied to a second communication node. As shown in FIG. 17, the second determining device includes: a receiving unit 1701.

The receiving unit 1701 is configured to receive, according to the determined receiving manner, the control channel sent by a first communication node. The determined receiving manner is determined according to a receiving manner used to receive a data channel sent by the first communication node or according to a receiving manner used to receive a fourth type of control channel sent by the first communication node.

In an embodiment, the determined receiving manner is distinguished from another by at least one of the following features: a frequency-domain resource on which a reference signal is located, a time-domain resource on which the reference signal is located, a sequence resource used by the reference signal, a beam resource used by the reference signal, a precoding matrix resource used by the reference signal, an index of the reference signal resource on which the reference signal is located, or a quasi-co-location relationship between reference signals.

The reference signal is sent by the first communication node or the reference signal is received by the first communication node, or the reference signal is sent and received by the first communication node.

In an embodiment, the determined receiving manner satisfies at least one of the following features: determining the receiving manner of the control channel according to the receiving manner of the data channel when a sending time interval between the control channel and the data channel is less than a predetermined threshold; keeping the receiving manner of the control channel unchanged until a new notification signaling is received after changing the receiving manner of the control channel according to the receiving manner of the data channel; determining the receiving manner of the control channel according to the receiving manner of a fourth type of control channel when a sending time interval between the control channel and the fourth type of control channel is less than a predetermined threshold; keeping the receiving manner of the control channel unchanged until a new notification signaling is received after changing the receiving manner of the control channel according to the receiving manner of the fourth type of control channel; changing the receiving manner of the control channel according to the receiving manner of the data channel when the control channel belongs to a first type of control channel; changing the receiving manner of the control channel according to the receiving manner of the data channel when the control channel belongs to a third type of control channel; or not changing the receiving manner of the control channel according to the receiving manner of the data channel when the control channel belongs to a second type of control channel.

In an embodiment, different types of control channels are distinguished from each other by at least one of the following features: a type of control information carried by the control channel; the number of time-domain symbols occupied by the control channel; the number of frequency-domain resources used by the control channel; the number of sending manners used by the control channel; or the number of sending manner sets used by the control channel.

In an embodiment, the second determining device further includes: a sending unit 1702.

The sending unit 1702 is configured to send signaling information to the first communication node. The signaling information includes at least one of the following information: information about whether the receiving manner of the control channel changes according to the receiving manner of the data channel; information about whether the receiving manner of the control channel changes according to the receiving manner of the fourth type of control channel; information about whether the sending manner of the control channel changes according to the sending manner of the data channel; or information about whether the sending manner of the control channel changes according to the sending manner of the fourth type of control channel.

The receiving manner of the control channel changes according to the receiving manner of the data channel or the receiving manner of the fourth type of control channel in only one time window and restores the receiving manner of the control channel to an original receiving manner outside the time window.

The above described embodiments may be provided as a method, a system, or a computer program product. The preceding embodiments may be implemented by software, hardware or a combination of the two. The preceding embodiments may take the form of a computer program product implemented in one or more computer-usable storage media (including a disk memory and an optical memory) that includes computer-usable program codes.

Computer program instructions can be used to implement each flow in the flowcharts or each block in the block diagrams, or a combination of the flows and blocks in the flowcharts and block diagrams. These computer program instructions may be provided into the processor of a general-purpose computer, special purpose computer, embedded processor or another programmable data processing device to produce a machine, so as to enable instructions executed by the processor of a computer or the other programmable data processing device to generate a device for implementing at least one of one or more flows in the flowcharts and one or more blocks in the block diagrams.

The computer program instructions may also be stored in a computer-readable memory that can direct a computer or the other programmable data processing device to operate in a particular manner, so that the instructions stored in the computer-readable memory produce an article of manufacture including an instruction device. The instruction device implements at least one of one or more flows in the flowcharts and one or more blocks in the block diagrams, where the block includes functions specified in the one or more blocks.

These computer program instructions may also be loaded onto a computer or the other programmable data processing device, so that a series of operating steps are performed on a computer or the other programmable device to carry out processing implemented by the computer, and the instructions executed on the computer or the other programmable device provide steps for implementing the functions specified in at least one of the flows or blocks.

An embodiment provides a computer-readable storage medium configured to store computer-executable instructions for executing the method in any above embodiment.

Figure 18:
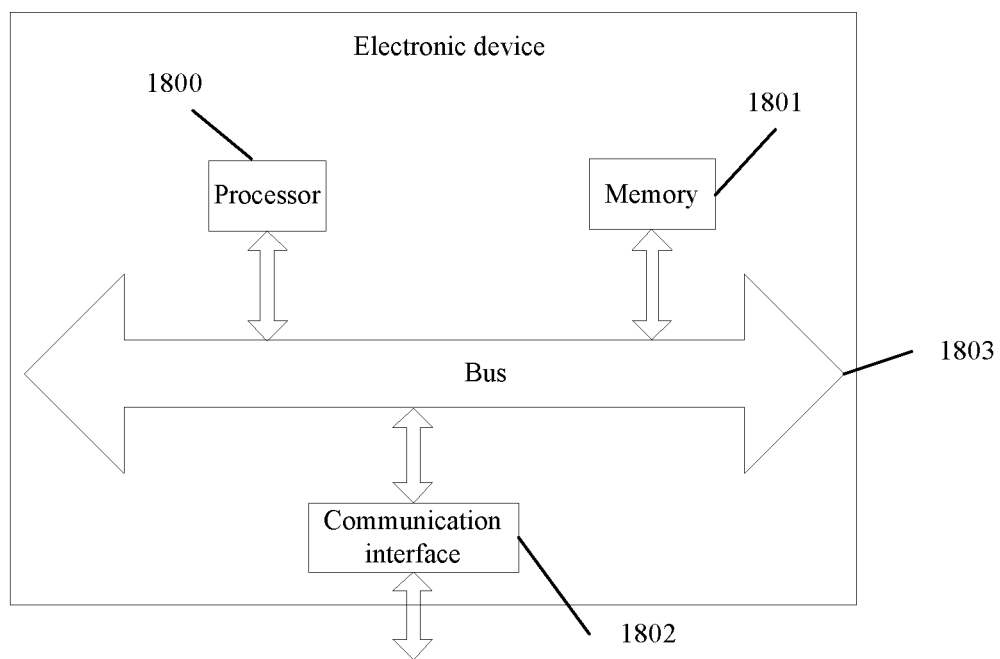
FIG. 18 is a schematic diagram illustrating a hardware structure of an electronic device according to an embodiment.

An embodiment provides a schematic diagram illustrating a hardware structure of an electronic device. Referring to FIG. 18, the electronic device includes: at least one processor 1800 (FIG. 18 shows one processor 1800 by way of example) and a memory 1801; and may further include a communication interface 1802 and a bus 1803. The processor 1800, the memory 1801 and the communication interface 1802 may communicate with each other through the bus 1803. The processor 1800 may call logic instructions in the memory 1801 to perform the method in any preceding embodiment.

In addition, the logic instructions in the memory 1801 may be implemented in the form of a software function unit and, when sold or used as an independent product, may be stored in a computer-readable storage medium.

As a computer-readable storage medium, the memory 1801 may be used for storing software programs and computer-executable programs, such as program instructions or modules corresponding to the method in any preceding embodiment. The processor 1800 runs the software programs, instructions or modules stored in the memory 1801 to perform function applications and data processing, that is, to implement the method in any preceding embodiment.

The memory 1801 may include a program storage region and a data storage region, where the program storage region may store an operating system and an application program required by at least one function while the data storage region may store data created depending on use of a terminal device. In addition, the memory 1801 may include a high-speed random-access memory and may further include a non-volatile memory.

The preceding technical solutions may be embodied in the form of a software product that is stored in a storage medium and includes one or more instructions for enabling a computer device (which may be a personal computer, server, or network device, etc.) to perform all or part of the steps of the method in any preceding embodiment. The preceding storage medium may be a non-transient storage medium, such as a U disk, mobile hard disk, read only memory (ROM), random access memory (RAM), magnetic disk, optical disk or another medium that can store program codes, or may be a transient storage medium.

What is claimed is:

1. A method for sending a control channel, comprising:

determining, by a first communication node, second transmission parameter information about the control channel according to first parameter information and sending the control channel to a second communication node according to the second transmission parameter information;

wherein the first parameter information comprises at least one of the following information: an information length of second control information transmitted on the control channel, or index information of a time-domain symbol at which first control information corresponding to the control channel is located, and wherein the first control information is sent by the second communication node to the first communication node, the second control information is sent by the first communication node to the second communication node, and the second control information is on the control channel;

wherein the second transmission parameter information comprises at least one of the following information: information about a control channel region, information about frequency-domain resources occupied by the control channel, information about demodulation reference signals of the control channel, or information about code-domain resources occupied by the control channel;

wherein the information about the control channel region comprises: a number of sub-regions comprised in the control channel region, information about frequency-domain resources of each of the sub-regions, information about a number of time-domain symbols of each of the sub-regions, and time-domain symbol position information of each of the sub-regions; and wherein a resource occupied by the control channel is a resource occupied by one sub-region.

2. The method for sending a control channel according to claim 1, wherein indication information which is in the first control information and indicates information about a number of time-domain symbols of the control channel comprises at least one of the following information:
   whether a duration of the control channel is a long duration or a short duration;
   a starting symbol index of the control channel;
   an ending symbol index of the control channel;
   the number of the time-domain symbols of the control channel; or
   an index of the number of the time-domain symbols of the control channel in an agreed set of numbers of time-domain symbols.

3. The method for sending a control channel according to claim 1, further comprising at least one of:
   determining information about a number of time-domain symbols occupied by the control channel or information about a number of frequency domain resources occupied by the control channel according to a type of the second control information transmitted on the control channel, wherein different types of second control information are distinguished from each other by at least one of the following information: wherein the second control information is CSI information or ACK/NACK information, an information length of the second control information, or a service type of the data corresponding to the second control information; or
   transmitting the second control information across the multiple time sub-units repeatedly, wherein each time sub-unit of the multiple time sub-units comprised in the control channel comprises a demodulation reference signal, and each time sub-unit comprises one or more time-domain symbols.

4. The method for sending a control channel according to claim 1, wherein
   multiple pieces of second control information of a same type are sent on one control channel,
   wherein different types of second control information are distinguished from each other by at least one of the following information: whether the control information second control information is CSI information or ACK/NACK information, an information length of the second control information, or a service type of the data corresponding to the second control information; and
   the multiple pieces of second control information are multiple pieces of second control information needed to be fed back in a current time unit.

5. The method for sending a control channel according to claim 1, further comprising
   when multiple pieces of second control information needed to be fed back in a current time unit are sent on one control channel, obtaining resource information of the control channel according to first control information corresponding to a highest time unit index among multiple pieces of first control information related to the multiple pieces of second control information.

6. The method for sending a control channel according to claim 1, wherein a time-frequency-domain position of a demodulation reference signal of the control channel is obtained in one of the following manners:
   whether frequency-domain resources occupied by the demodulation reference signal in one time-domain symbol are continuous or discrete is obtained according to the first control information;
   parameters related to the demodulation reference signal are determined according to information about a number of time-domain symbols of the control channel;
   the parameters related to the demodulation reference signal are determined according to a number of sending beam sets; and
   the parameters related to the demodulation reference signal are determined according to a sending mode of the control channel, wherein the sending mode comprises a single-layer transmission, a transmission diversity mode and a repeated transmission;
   wherein a sending beam of the sending beam sets is indicated by at least one of the following information: information about a resource index of the first reference signal, or time-domain information corresponding to the first reference signal;
   wherein the first reference signal is a reference signal sent by the first communication node or the first reference signal is a reference signal received by the first communication node.

7. The method for sending a control channel according to claim 1, wherein the first parameter information further comprises at least one of the following information:
   index information of a time unit at which the first control information is located; or
   index information of a time-domain symbol at which the time-domain ending position of the first control information is located.

8. The method for sending a control channel according to claim 1, wherein determining, by the first communication node, the second transmission parameter information about the control channel according to the first parameter information comprises:
   determining, by the first communication node, the second transmission parameter information about the control channel according to the first parameter information and the first control information, wherein the first control information satisfies at least one of the following:
   the first control information is common control information;
   the first control information comprises information that notifies a control channel resource set of a current time unit;
   the first control information comprises information that notifies a sending sequence of multiple sending beams used by the first communication node to send the control channel;
   the first control information comprises information that notifies a correspondence between time-domain regions of the control channel and the multiple sending beams or sending beam sets used to send the control channel;
   the first control information comprises at least one of information for notifying time-domain resource corresponding to each sending beam in the multiple sending beams or information for notifying frequency-domain resource corresponding to each sending beam in the multiple sending beams, wherein the multiple sending beams are used by the first communication node to send the control channel;
   the first control information comprises at least one of information for notifying time-domain resource corresponding to each sending beam set in the multiple sending beam sets or information for notifying frequency-domain resource corresponding to each sending beam set in the multiple sending beam sets, wherein the multiple sending beam sets are used by the first communication node to send the control channel;

the first control information comprises information that notifies a sending beam used by the first communication node to send the control channel;

the first control information comprises information that notifies a modulation manner used by the first communication node to send the control channel; or the first control information comprises information that notifies a coding rate used by the first communication node to send the control channel;

wherein a sending beam of the sending beam sets is indicated by at least one of the following information: information about a resource index of the first reference signal, or time-domain information corresponding to the first reference signal;

wherein the first reference signal is a reference signal sent by the first communication node or the first reference signal is a reference signal received by the first communication node.

9. The method for sending a control channel according to claim 8, further comprising at least one of:

selecting, by the first communication node, one or more control channel resources from the control channel resource set according to a predetermined rule and sending the control channel on the one or more control channel resources;

determining, by the first communication node, one or more control channel resources from the control channel resource set and sending at least one of the following information on the one or more selected control channel resources: beam failure request information, or resource request information;

transmitting the second control information in multiple time sub-units repeatedly, wherein time sub-unit of the multiple time sub-units comprised in the control channel comprises a demodulation reference signal, and each time sub-unit comprises one or more time-domain symbols.

10. The method for sending a control channel according to claim 1, wherein determining, by the first communication node, the second transmission parameter information about the control channel according to the first parameter information comprises:

determining, by the first communication node, the second transmission parameter information about the control channel according to the first parameter information a type of the second control information, wherein different types of second control information are distinguished from each other by at least one of the following information: whether the control information second control information is CSI information or ACK/NACK information, or a service type of the data corresponding to the second control information.

11. A method for receiving a control channel, comprising:

sending first control information to a first communication node;

determining second transmission parameter information of the control channel according to first parameter information, wherein the first parameter information comprises at least one of the following information: an information length of second control information transmitted on the control channel, or index information of a time-domain symbol at which the first control information corresponding to the control channel is located; and receiving, according to the determined second transmission parameter information, the control channel sent by the first communication node;

wherein the first control information is received by the first communication node and the second control information is sent by the first communication node, wherein the second control information is on the control channel;

wherein the second transmission parameter information comprises at least one of the following information: information about a control channel region, information about frequency-domain resources occupied by the control channel, information about demodulation reference signals of the control channel, or information about code-domain resources occupied by the control channel;

wherein the information about the control channel region comprises: a number of sub-regions comprised in the control channel region, information about frequency-domain resources of each of the sub-regions, information about a number of time-domain symbols of each of the sub-regions, and time-domain symbol position information of each of the sub-regions; and wherein a resource occupied by the control channel is a resource occupied by one sub-region.

12. The method for receiving a control channel according to claim 11, wherein indication information which is in the first control information and indicates information about a number of time-domain symbols of the control channel comprises at least one of the following information:

whether a duration of the control channel is a long duration or a short duration;

a starting symbol index of the control channel;

an ending symbol index of the control channel;

the number of the time-domain symbols of the control channel; or an index of the number of the time-domain symbols of the control channel in an agreed set of numbers of time-domain symbols.

13. The method for receiving a control channel according to claim 11, further comprising at least one of:

determining information about a number of time-domain symbols occupied by the control channel or information about a number of frequency domain resources occupied by the control channel according to a type of the second control information transmitted on the control channel;

determining the information about the number of the time-domain symbols of the control channel or the information about the number of the frequency domain resources of the control channel according to a capability level of the first communication node;

when multiple pieces of second control information needed to be fed back in a current time unit are sent on one control channel, obtaining resource information of the control channel according to first control information corresponding to a highest time unit index among multiple pieces of first control information related to the multiple pieces of second control information; or receiving multiple pieces of second control information of a same type on one control channel, wherein the multiple pieces of second control information are the multiple pieces of second control information needed to be received from the first communication node in a current time unit;

wherein different types of second control information are distinguished from each other by at least one of the following information: whether the second control information is CSI information or ACK/NACK information, an information length of the second control information, or a service type of the data corresponding to the second control information.

14. The method for receiving a control channel according to claim 11, wherein a time-frequency-domain position of a demodulation reference signal of the control channel is determined in one of the following manners:

whether frequency-domain resources occupied by the demodulation reference signal in one time-domain symbol are continuous or discrete is indicated according to the first control information;

parameters related to the demodulation reference signal are determined according to information about a number of time-domain symbols of the control channel;

the parameters related to the demodulation reference signal are determined according to a number of sending beam sets; or the parameters related to the demodulation reference signal are determined according to a sending mode of the control channel, wherein the sending mode comprises a single-layer transmission, a transmission diversity mode and a repeated transmission;

wherein the sending beam is indicated by at least one of the following information: information about a resource index of the first reference signal, or time-domain information corresponding to the first reference signal;

wherein the first reference signal is a reference signal sent by the first communication node or the first reference signal is a reference signal received by the first communication node.

15. The method for receiving a control channel according to claim 11, wherein the first control information satisfies at least one of the following:

the first control information is common control information;

the first control information comprises information that notifies a control channel resource set of a current time unit;

the first control information comprises information that notifies a sending sequence of multiple sending beams used by the first communication node to send the control channel; or the first control information comprises information that notifies a correspondence between time-domain regions of the control channel and the multiple sending beams or sending beam sets used to send the control channel;

the first control information comprises at least one of information for notifying time-domain resource corresponding to each sending beam in the multiple sending beams or information for notifying frequency-domain resource corresponding to each sending beam in the multiple sending beams, wherein the multiple sending beams are used by the first communication node to send the control channel;

the first control information comprises at least one of information for notifying time-domain resource corresponding to each sending beam set in the multiple sending beam sets or information for notifying frequency-domain resource corresponding to each sending beam set in the multiple sending beam sets, wherein the multiple sending beam sets are used by the first communication node to send the control channel;

the first control information comprises information that notifies a sending beam used by the first communication node to send the control channel;

the first control information comprises information that notifies a modulation manner used by the first communication node to send the control channel; and the first control information comprises information that notifies a coding rate used by the first communication node to send the control channel;

wherein a sending beam of the sending beam sets is indicated by at least one of the following information: information about a resource index of the first reference signal, or time-domain information corresponding to the first reference signal;

wherein the first reference signal is a reference signal sent by the first communication node or the first reference signal is a reference signal received by the first communication node.

16. A device for sending a control channel, comprising:

a receiving unit, which is configured to receive first control information sent by the second communication node;

a determining unit, which is configured to determine second transmission parameter information about the control channel according to first parameter information, wherein the first parameter information comprises at least one of the following information: an information length of a second control information transmitted on the control channel, or index information of a time-domain symbol at which the first control information corresponding to the control channel is located; and a sending unit, which is configured to send the control channel to a second communication node according to the second transmission parameter information;

wherein the second transmission parameter information comprises at least one of the following information: information about a control channel region, information about frequency-domain resources occupied by the control channel, information about demodulation reference signals of the control channel, or information about code-domain resources occupied by the control channel;

wherein the information about the control channel region comprises: a number of sub-regions comprised in the control channel region, information about frequency-domain resources of each of the sub-regions, information about a number of time-domain symbols of each of the sub-regions, and time-domain symbol position information of each of the sub-regions; and wherein a resource occupied by the control channel is a resource occupied by one sub-region.

17. The device for receiving a control channel according to claim 16, wherein information about a number of time-domain symbols occupied by the control channel or information about a number of frequency domain resources occupied by the control channel is determined according to a type of the second control information transmitted on the control channel;

the information about the number of the time-domain symbols occupied by the control channel or the information about the number of the frequency domains of the control channel is determined according to a capability level information of the first communication node;

when multiple pieces of second control information needed to be fed back in a current time unit are sent on one control channel, resource information of the control channel is obtained according to first control information corresponding to a highest time unit index among multiple pieces of first control information related to the multiple pieces of second control information; or multiple pieces of second control information of a same type are sent on the one control channel, wherein the multiple pieces of second control information are multiple pieces of second control information needed to be fed back in the current time unit;

wherein different types of the second control information are distinguished from each other by at least one of the following information: whether the second control information is CSI information or ACK/NACK information, an information length of the second control information, or a service type of the data corresponding to the second control information.

18. A device for receiving a control channel, comprising: a processor and a storage device, wherein the storage device stores processor-executable programs for executing the method according to claim 11.

\* \* \* \* \*

UNITED STATES PATENT AND TRADEMARK OFFICE
CERTIFICATE OF CORRECTION

PATENT NO. : 11,064,475 B2
APPLICATION NO. : 16/347685
DATED : July 13, 2021
INVENTOR(S) : Shujuan Zhang et al.

It is certified that error appears in the above-identified patent and that said Letters Patent is hereby corrected as shown below:

In the Drawings

Sheet 12 of 21, FIG. 5b, Lines 3-4 (approx.), delete "UECC2" and insert -- UCCE2 --.

Sheet 14 of 21, FIG. 7a, Line 3, delete "UCC3" and insert -- UCCE3 --.

Sheet 15 of 21, FIG. 7b, Line 1, delete "UCC3" and insert -- UCCE3 --.

In the Specification

Column 4, Line 22 (approx.), delete "2I" and insert -- 2i --.

Column 11, Line 33, delete "or nd" and insert -- or/and --.

Column 16, Line 9, delete "REG" and insert -- REG. --.

Column 20, Line 54, delete "2I," and insert -- 2i, --.

Columns 28-29, Lines 47-67 and Lines 1-8, below "channel." delete "In the embodiment, the demodulation reference..................................reference signal are the same.".

Column 31, Line 2, after "signal" insert -- are the same --.

Column 31, Line 33, delete "time-sub-unit." and insert -- time sub-unit. --.

Column 31, Line 63, delete "12a~12b." and insert -- 12a-12b. --.

Column 32, Line 3, delete "12a~12b" and insert -- 12a-12b --.

Column 32, Line 56, delete "PRB s." and insert -- PRBs. --.

Signed and Sealed this
Twenty-sixth Day of April, 2022

Katherine Kelly Vidal
*Director of the United States Patent and Trademark Office*

CERTIFICATE OF CORRECTION (continued)
U.S. Pat. No. 11,064,475 B2

Column 41, Line 30, delete "REG" and insert -- REG. --.

Column 47, Line 47, delete "REG" and insert -- REG. --.

Column 54, Line 29, delete "signals." and insert -- signal. --.

In the Claims

Column 61, Line 30, Claim 3, delete "wherein" and insert -- whether --.

Column 63, Line 37, Claim 9, after "information;" insert -- or --.

Column 63, Line 39, Claim 9, after "wherein" insert -- each --.

Column 63, Line 51, Claim 10, after "information" insert -- and --.

Column 66, Line 32, Claim 16, after "of" delete "a".